(12) United States Patent
Kasahara

(10) Patent No.: US 7,830,766 B2
(45) Date of Patent: Nov. 9, 2010

(54) DATA REPRODUCTION METHOD AND APPARATUS, DISK, AND RECORDING/REPRODUCTION APPARATUS, USING PRML METHOD

(75) Inventor: Ryosuke Kasahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 884 days.

(21) Appl. No.: 11/717,633

(22) Filed: Mar. 14, 2007

(65) Prior Publication Data

US 2007/0237059 A1 Oct. 11, 2007

(30) Foreign Application Priority Data

| Mar. 14, 2006 | (JP) | ............................. 2006-068595 |
| Apr. 11, 2006 | (JP) | ............................. 2006-108184 |
| Apr. 21, 2006 | (JP) | ............................. 2006-118438 |
| May 30, 2006 | (JP) | ............................. 2006-149448 |
| Jul. 21, 2006 | (JP) | ............................. 2006-198865 |
| Dec. 18, 2006 | (JP) | ............................. 2006-339587 |

(51) Int. Cl.
 *G11B 20/10* (2006.01)
(52) U.S. Cl. ................................. 369/59.22; 369/47.35
(58) Field of Classification Search ........................ None
 See application file for complete search history.

(56) References Cited

U.S. PATENT DOCUMENTS

| 5,796,693 | A | * | 8/1998 | Taguchi et al. | ............ | 369/59.22 |
| 2004/0208106 | A1 | * | 10/2004 | Minemura | ................. | 369/59.22 |
| 2009/0052595 | A1 | * | 2/2009 | Minemura | .................... | 375/341 |

FOREIGN PATENT DOCUMENTS

| CN | 1289120 A | 3/2001 |
| JP | 06-183152 | 7/1994 |
| JP | 08-221839 | 8/1996 |
| JP | 11-250493 | 9/1999 |
| JP | 2001-126394 | 5/2001 |
| JP | 2001-250274 | 9/2001 |
| JP | 2001-283523 | 10/2001 |

(Continued)

OTHER PUBLICATIONS

Naoki Ide, "Adaptive Partial-Response Maximum-Likelihood Detection in Optical Recording Media," ISOM2002, pp. 269-271.

(Continued)

*Primary Examiner*—Paul Huber
(74) *Attorney, Agent, or Firm*—Dickstein Shapiro LLP

(57) ABSTRACT

A data reproduction apparatus for reproducing recorded data from an optical disk by using a PRML detection method is disclosed that includes an optical head including a light source, an optical system having an objective lens for condensing light emitted from the light source to the optical disk, and a photodetector for receiving light reflected from the optical disk, a signal generation circuit for generating an RF signal from a signal output from the photodetector, a phase correction circuit for correcting phase distortion of the RF signal when the recorded data are recorded in recording marks arranged with a pitch less than a diffraction limit, a clock extraction circuit for extracting a clock from the corrected RF signal, and a decoding circuit for decoding the recorded data from the RF signal in synchronization with the clock extracted by the clock extraction circuit.

14 Claims, 64 Drawing Sheets

FOREIGN PATENT DOCUMENTS

| | | |
|---|---|---|
| JP | 2002-032919 | 1/2002 |
| JP | 2002-319137 | 10/2002 |
| JP | 2003-016733 | 1/2003 |
| JP | 05-205314 | 8/2003 |
| JP | 2004-326839 | 11/2004 |

OTHER PUBLICATIONS

Tanabe, T. et al., "Super-Resolution Optical Readout System with Partial Response Maximum Likelihood Detection", Japanese Journal of Applied Physics, vol. 37, 1998, pp. 2226-2230.

* cited by examiner

FIG.10

| COEFFICIENT SETTING CONDITION | TYPE OF RECORDING MEDIUM | RECORDING POWER (mW) | LINEAR SPEED (m/s) | MINIMUM PIT LENGTH (μm) |
|---|---|---|---|---|
| 1 | A | 2.5 | 4.30 | 0.193 |
| 2 | A | 2.1 | 4.30 | 0.193 |
| 3 | B | 2.7 | 4.30 | 0.193 |
| 4 | B | 2.7 | 4.30 | 0.130 |
| 5 | A | 2.7 | 3.00 | 0.193 |

FIG.22
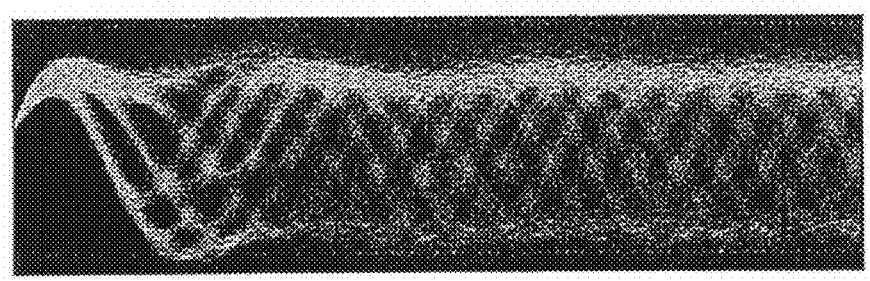
FIG.23
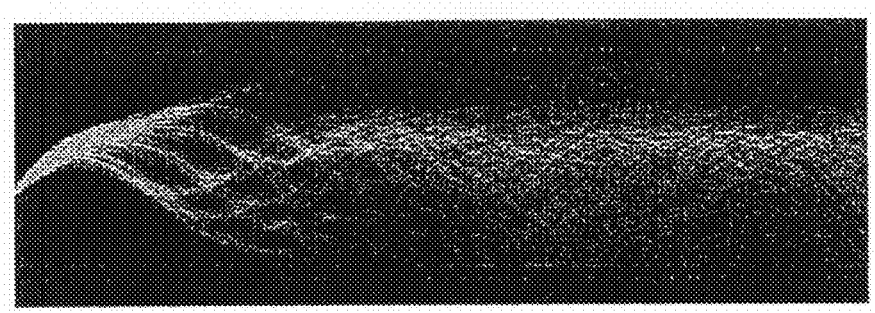
FIG.24
| | BIT ERROR RATE |
|---|---|
| WITH ASYMMETRIC FIR FILTER | 0.0020 |
| WITHOUT ASYMMETRIC FIR FILTER | 0.4986 |

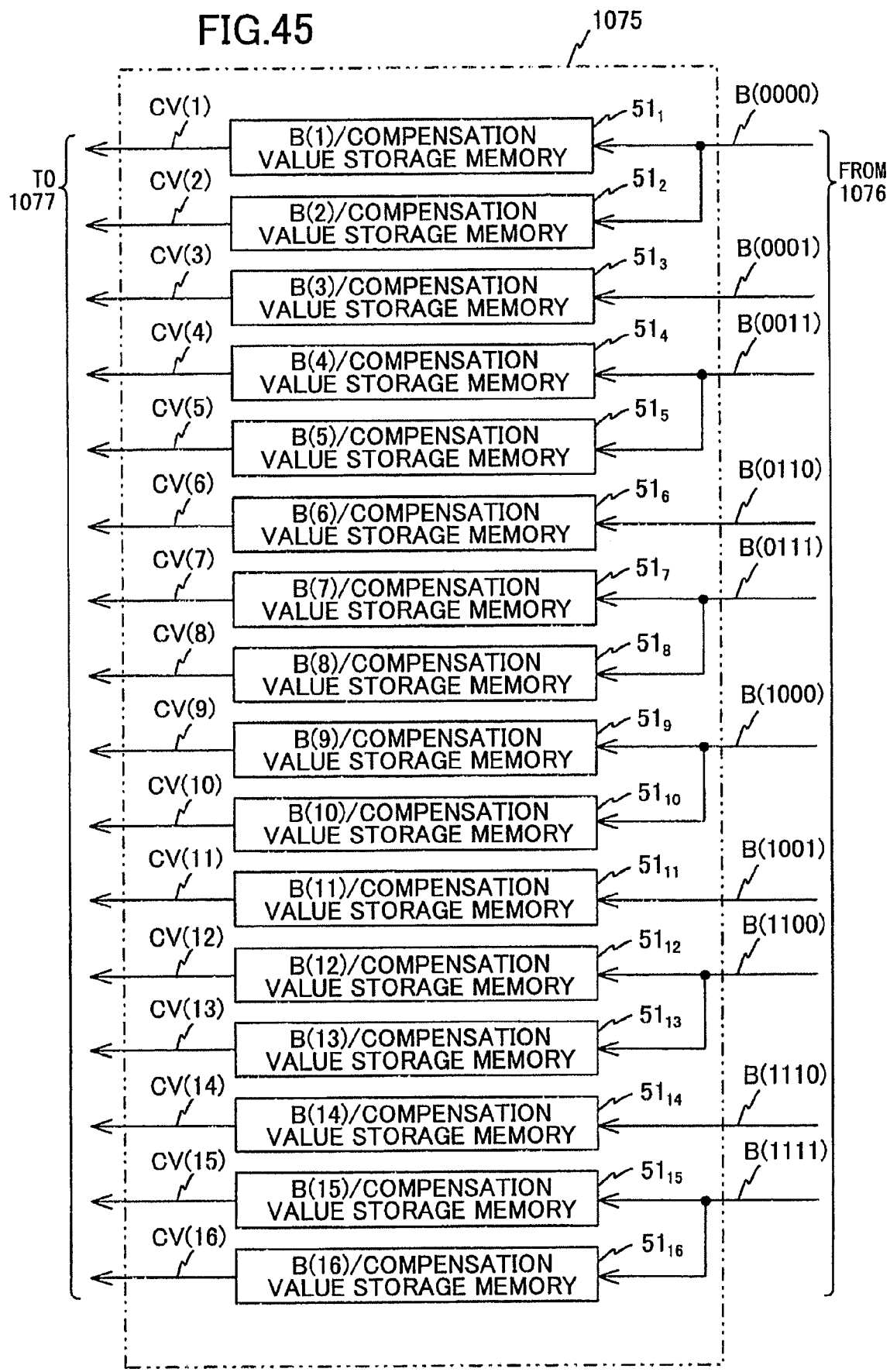

FIG.46A

B(1)/COMPENSATION VALUE STORAGE MEMORY

| B(0000) | COMPENSATION VALUE CV(1) |
|---|---|
| 000 | 0.10 |
| 011 | 0.22 |
| <u>110</u> | −0.11 |
| 100 | −0.04 |
| 111 | 0.04 |

FIG.46B

B(6)/COMPENSATION VALUE STORAGE MEMORY

| B(0110) | COMPENSATION VALUE CV(6) |
|---|---|
| <u>000</u> | −0.01 |
| 100 | 0.02 |
| 110 | 0.11 |

FIG.46C

B(12)/COMPENSATION VALUE STORAGE MEMORY

| B(1100) | COMPENSATION VALUE CV(12) |
|---|---|
| 000 | −0.04 |
| 001 | 0.05 |
| 011 | 0.32 |
| 100 | −0.16 |
| <u>111</u> | −0.08 |

FIG.52A
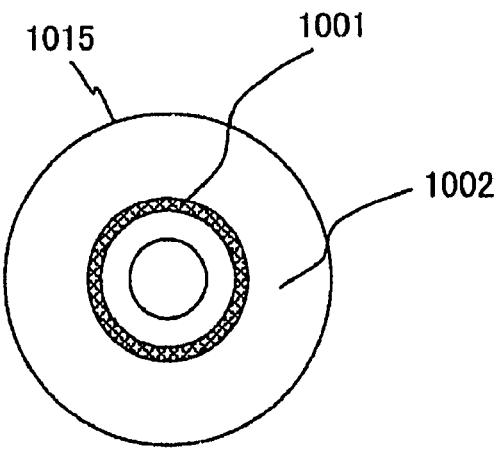
FIG.52B
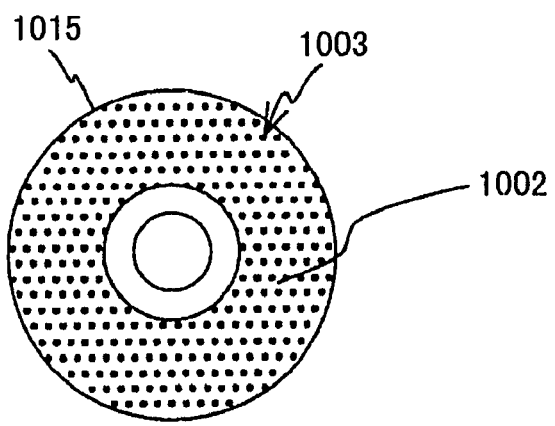
FIG.53
B(6)/COMPENSATION VALUE STORAGE MEMORY
| B(0110) | COMPENSATION VALUE CV (6) | VARIANCE VALUE VV (6) |
|---------|---------------------------|------------------------|
| 000 | −0.01 | 0.12 |
| 100 | 0.02 | 0.04 |
| 110 | 0.11 | 0.06 |

FIG.62

$$R(k) = \sum_{t=0}^{N} x(t+k) \cdot y(t) \quad\quad\quad k = \text{INTEGER}$$

THIRD BIT

LOW ← BER → HIGH

FOURTH BIT

LOW ← BER → HIGH

FIFTH BIT

DATA REPRODUCTION METHOD AND APPARATUS, DISK, AND RECORDING/REPRODUCTION APPARATUS, USING PRML METHOD

BACKGROUND OF THE INVENTION

1. Field of the Invention

The present invention relates to a data reproduction method, a data reproduction apparatus, an optical disk, and a data recording/reproduction apparatus, and more particularly to a data reproduction method, a data reproduction apparatus, an optical disk, and a data recording/reproduction apparatus for reproducing data recorded in an optical disk.

2. Description of the Related Art

Along with the advances in digital technology and data compression technology, optical disks such as DVDs (Digital Versatile Disc) are gaining greater attention as media for recording data, such as music, movies, photographs, and computer software. Thus, as optical disks become less expensive, optical disk apparatuses (information reproducing apparatuses) for reproducing data recorded in the optical disks have become widely used.

In an optical disk apparatus, a light beam for reproduction purpose (reproduction light beam) is condensed to an optical disk, to thereby reproduce information based on the light reflected from the optical disk (See, for example, Japanese Laid-Open Patent Application No. 2002-319137).

In recent years, there has been proposed an optical disk (hereinafter referred to as "super resolution optical disk") that allows reproduction of data from recording marks having a pitch smaller than a diffraction limit (hereinafter referred to as "super resolution reproduction") (see, for example, Japanese Laid-Open Patent Application Nos. 6-183152, 5-205314, 11-250493, and 2001-250174). The super-resolution optical disk has, for example, a layer (hereinafter referred to as "super-resolution layer") containing a material whose optical constant (e.g., refraction index real part n and refraction index imaginary part k) changes when light is condensed thereto.

Accordingly, when a reproduction light beam is condensed to the super-resolution layer, a fine mask area or a fine aperture area is formed inside the beam spot of the reproduction light beam in accordance with the change of the optical constant, to thereby achieve high resolution reproduction of data.

However, in a case of attempting to reproduce data recorded in the super-resolution optical disk by using the optical disk apparatus shown in Japanese Laid-Open Patent Application No. 2002-319137, phase distortion tends to occur in an RF signal obtained from reflected light. This causes reproduction error to occur frequently.

Accordingly, Japanese Laid-Open Patent Application No. 1996-221839 discloses a method using a waveform equalizer in a reproduction system using a slicer for performing phase correction. With this method, asymmetry of reproduction signals due to super-resolution reproduction of a magneto-optical disk can be corrected.

However, since the method disclosed in Japanese Laid-Open Patent Application No. 1996-221839 does not use a PRML (Partial Response Maximum Likelihood) method which improves performance of decoding recording marks of small pitch, it is difficult to achieve high density even where super-resolution reproduction is used.

Optical aberration from tangential tilt may cause phase distortion of reproduction signals also for ordinary optical disks. Accordingly, Japanese Laid-Open Patent Application No. 2002-32919 discloses a method of using a PR (Partial Response) filter in a PRML method for phase correction.

More specifically, Japanese Laid-Open Patent Application No. 2002-32919 disclosed a method of using an adaptive PR filter as a PR (Partial Response) filter that provides a predetermined intersymbol interference.

This adaptive PR filter includes a FIR filter having a digital configuration. In order to achieve high precision of waveform equalization, reproduction signals are provided to the adaptive PR filter at clock timings after clock extraction of the reproduction signals. Accordingly, phase correction can be performed without being affected by, for example, rotation inconsistency. Thus, waveform equalization can be performed with accurate PR characteristics.

However, compared to the super-resolution method using magnetic transfer of a magneto-optical disk or asymmetry of a beam spot caused by tangential tilt, super-resolution reproduction causes a considerable phase distortion. Therefore, it is difficult for adaptive signals to have clocks extracted beforehand for achieving the function of phase correction.

Furthermore, from another aspect, in recent years and continuing, there is a growing demand for an optical disk with greater data capacity along with the advances in digital technology and improvement of data compression technology. As for methods of satisfying such demand, there are, for example, a method of reducing the beam spot diameter of a laser beam used for data reproduction and improving the resolution of an optical system.

For example, in an optical disk apparatus used for reproducing and recording data with an optical disk (e.g., Blu-ray Disc) having greater data capacity than a DVD (Digital Versatile Disc), data can be read out and recorded with a recording mark having, for example, a diameter no greater than 0.160 µm-0.138 µm by condensing a laser beam having a wavelength of approximately 390 nm-420 nm to an objective lens having a numeric aperture of approximately 0.70-0.90 and focusing the laser beam on a recording layer of the optical disk with a beam spot diameter of approximately 0.48 µm.

However, due to factors such as transparency of the polycarbonate material used in the optical disk, it is becoming more difficult to provide a laser beam with shorter wavelength or an objective lens with higher numeric aperture. Therefore, in recent years, there has been proposed an optical disk (super resolution optical disk) that allows reproduction (super resolution reproduction) of data from recording marks having a pitch smaller than a diffraction limit (see, for example, Japanese Laid-Open Patent Application Nos. 6-183152 (Patent Document 1), 5-205314 (Patent Document 2), 11-250493 (Patent Document 3), and 2001-250174 (Patent Document 4)). The super-resolution optical disk has, for example, a super-resolution layer containing a material whose optical constant changes when a laser beam is condensed thereto. Accordingly, when a laser beam for data reproduction (reproduction laser beam) is condensed to the super-resolution layer, a fine mask area or a fine aperture area is formed inside the beam spot of the reproduction laser beam in accordance with the change of the optical constant, to thereby achieve high resolution reproduction of data.

However, in a case of attempting to reproduce data recorded in the super-resolution optical disk by using the optical disk apparatuses shown in Patent Documents 1-4, phase distortion tends to occur in an RF signal obtained from reflected light. This causes reproduction error to occur frequently. Hence, it is difficult to increase data capacity with the optical disk apparatuses shown in Patent Documents 1-4.

In recent years, there has also been wide use of an optical disk apparatus having a digital data reproduction apparatus using a PR (Partial Response) method. The use of such optical disk apparatus is due to the growing difficulty of reading a single bit of digital data without encountering interference of a neighboring bit (intersymbol interference) along with the increase of recording density of the optical disk (recording medium) to which the digital data are recorded.

The partial response method is used to prevent deterioration of signal characteristics during a equalization decoding process by actively generating predetermined linear waveform interference. Recently, a PRML (Partial Response Maximum Likelihood) method, which is a combination of the partial response method and a ML (Maximum Likelihood) method, has been used for performing high precision signal processing.

However, the reading system for reading data from the optical disk has a non-linear property owing to the principle of reading out signals by using light diffraction. Thus, an RF signal has an asymmetric property caused by the non-linear property of the reading system. Furthermore, the RF signal also includes a non-linear component created by changes in the position of a recording mark of a recording pattern. Such change in the position of the recording mark is caused by temperature interference during a data recording operation. The asymmetric property and the non-linear component of the RF signal make it difficult to increase the density of recording data to the optical disk.

Accordingly, Non-Patent Document 1 ("Adaptive Partial-Response Maximum-Likelihood Detection in Optical Recording Media", Naoki Ide, ISOM2002) proposes a maximum likelihood method using a non-linear compensation table with consideration of intersymbol interference of the non-linear component. However, since the maximum likelihood estimate bit length and the non-linear compensation length is the same in the method disclosed in the Non-Patent Document 1, the non-linear compensation effect is limited in a case where the non-linear compensation length is short with respect to the length of the beam spot on the optical disk (recording medium) (i.e. in a case of high density recording). Particularly, the non-linear compensation effect is insufficient during reproduction of data from a high resolution optical disk in which data are recorded with a density greater than the diffraction limit of the optical system or during generation of aberration (e.g., coma-aberration, astigmatism) where the beam spot diameter is increased.

Accordingly, as shown in, for example, Patent Document 5 (Japanese Laid-Open Patent Application No. 2004-326839), there is a method of performing non-linear compensation and maximum likelihood estimation by anticipating linear intersymbol interference of a predetermined bit length and using a non-linear compensation table with a longer bit length. However, since the method disclosed in Patent Document 5 requires the maximum likelihood estimation to be performed with the same range as the non-linear compensation bit length, the circuit size becomes considerably large as the non-linear compensation range is increased. In order to perform maximum likelihood estimation with this method, the status number is to be doubled whenever the bit length is increased by a single bit. Thereby, the circuit size is doubled. Furthermore, in a case where the number of pattern compensation bits is added three bits at a time, the circuit size becomes ten times greater or more. This causes the reproduction apparatus to become expensive.

Furthermore, Patent Document 6 (Japanese Laid-Open Patent Application No. 2001-126394) discloses a method of performing non-linear compensation on a long range bit string without increasing the circuit size by using results of previous (past) provisional determination results. However, the increase of recording density by using the non-linear compensation is small (10%-20%). Therefore, this method is insufficient for achieving a significant increase of data capacity.

Furthermore, from yet another aspect, in using the partial response method, noise can be reduced and bit error rates can be improved by selecting a partial response characteristic matching with the characteristic of the reproduction system being used. For example, Patent Document 7 (Japanese Registered Patent No. 3696130) discloses a signal processing apparatus having partial response characteristics that have a symmetric shape where the origin (0) is the center (e.g., PR (a, a), PR (a, b, a), PR (a, b, b, a), PR (a, b, c, b, a), PR (a, b, b, b, a), PR (a, a, b, a, a) in a case where the PR characteristics can be expressed with 5 bits ("a", "b" "c" each being a given real number)). However, the symmetrically shaped partial response characteristics of Patent Document 7 are far from matching with the characteristics of the analog reproduction signals read out by irradiating an asymmetric beam spot to the super resolution optical disks disclosed in Patent Document 1-4. This results in a problem of inconsistency (mismatch) between the characteristics of the reproduction system and the partial response characteristics. This leads to increase of bit error rate.

SUMMARY OF THE INVENTION

The present invention may provide a data reproduction method, a data reproduction apparatus, an optical disk, and a data recording/reproduction apparatus that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data reproduction method, a data reproduction apparatus, an optical disk, and a data recording/reproduction apparatus particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data reproduction apparatus for reproducing recorded data from an optical disk by using a PRML detection method, the data reproduction apparatus including: an optical head including a light source, an optical system having an objective lens for condensing light emitted from the light source to the optical disk, and a photodetector for receiving light reflected from the optical disk; a signal generation circuit for generating an RF signal from a signal output from the photodetector; a phase correction circuit for correcting phase distortion of the RF signal when the recorded data are recorded in recording marks arranged with a pitch less than a diffraction limit; a clock extraction circuit for extracting a clock from the corrected RF signal; and a decoding circuit for decoding the recorded data from the RF signal in synchronization with the clock extracted by the clock extraction circuit.

Furthermore, another embodiment of the present invention provides a data reproduction method using a data reproduction apparatus for reproducing recorded data from an optical disk by using a PRML detection method, the data reproduction method including the steps of: a) irradiating a light beam to the optical disk; b) receiving light reflected from the optical disk; c) generating an RF signal according to the received light; d) correcting phase distortion of the RF signal when the recorded data are recorded in recording marks arranged with a pitch less than a diffraction limit; e) extracting a clock from the corrected RF signal; and f) decoding the recorded data from the RF signal in synchronization with the clock extracted in step e).

Furthermore, another embodiment of the present invention provides an optical disk including: a recording mark area including recording marks arranged with a pitch less than a diffraction limit; and a first data area including equalizing coefficient data suitable for reproducing data recorded in the recording marks.

Furthermore, another embodiment of the present invention provides a data reproduction apparatus for reproducing recorded data from an optical disk by using a PRML method, the recorded data of the optical disk being recorded in recording marks arranged with a pitch less than a diffraction limit, the data reproduction apparatus including: an optical head including a light source, an optical system having an objective lens for condensing light emitted from the light source to the optical disk, and a photodetector for receiving light reflected from the optical disk; a signal generation circuit for generating an RF signal from a signal output from the photodetector; a waveform equalizer for equalizing a waveform of the RF signal to a waveform having a predetermined partial response characteristic of the PRML method in a case where the recorded data are recorded in recording marks arranged with a pitch less than a diffraction limit; a pattern compensation memory for storing a plurality of compensation values corresponding to bit patterns of the recording marks; a path memory for storing past determination results corresponding to a plurality of states according to the PRML method; and a branch metric calculator for calculating likelihood of the equalized RF signal by using one of the plural compensation values in accordance with the past determination results stored in the path memory.

Furthermore, another embodiment of the present invention provides a data reproduction method for reproducing data by using a PRML method, the data reproduction method including the steps of: a) reading an RF signal from an optical disk having the data recorded in recording marks arranged with a pitch less than a diffraction limit; b) equalizing a waveform of the RF signal to a waveform having a predetermined partial response characteristic of the PRML method; c) calculating a compensation value corresponding to a bit pattern of the equalized RF signal; and d) calculating likelihood of the equalized RF signal by using the compensation value in accordance with past determination results corresponding to a plurality of states according to the PRML method.

Furthermore, another embodiment of the present invention provides an optical disk used for the data reproduction apparatus according to an embodiment of the present invention, the optical disk including: a recording mark area including recording marks arranged with a pitch less than a diffraction limit; a first data area including first data indicative of at least one of recording density, reproduction power, linear speed, and waveform of the light source; and a second data area including second data indicative of at least one of an average of a waveform equalization error amount of the bit pattern of the RF signal and a variance value of the waveform equalization error amount of the bit pattern of the RF signal.

Furthermore, another embodiment of the present invention provides a data recording/reproduction apparatus for recording and reproducing data with respect to an optical disk, the data recording/reproduction apparatus including: the data reproduction apparatus according to an embodiment of the present invention; and a data recording apparatus for recording data to the optical disk with recording marks arranged with a pitch less than a diffraction limit.

Other objects and further features of the present invention will be apparent from the following detailed description when read in conjunction with the accompanying drawings.

BRIEF DESCRIPTION OF THE DRAWINGS

FIG. 10 is a table for describing coefficient setting conditions 1-5 according to an embodiment of the present invention;

FIG. 22 is a schematic diagram for describing an eye pattern in a case where phase distortion is corrected;

FIG. 23 is a schematic diagram for describing an eye pattern in a case where phase distortion is not corrected;

FIG. 24 is a table for describing a relationship of a bit error rate and an asymmetric FIR filter according to an embodiment of the present invention;

FIG. 45 is a block diagram showing a pattern compensation memory according to an embodiment of the present invention;

FIGS. 46A-46C are tables for describing a method of determining a compensation value $CV(n)$ according to an embodiment of the present invention;

FIGS. 52A-52B are schematic diagrams for describing respective areas in an optical disk according to an embodiment of the present invention;

FIG. 53 is a table for describing $B(6)$/compensation value storage memory $51_6$ including a variance value according to an embodiment of the present invention;

FIG. 62 shows a formula for calculating cross-correlation according to an embodiment of the present invention;

DESCRIPTION OF THE PREFERRED EMBODIMENTS

In the following, embodiments of the present invention are described with reference to the accompanying drawings.

[Section 1]

Figure 1:
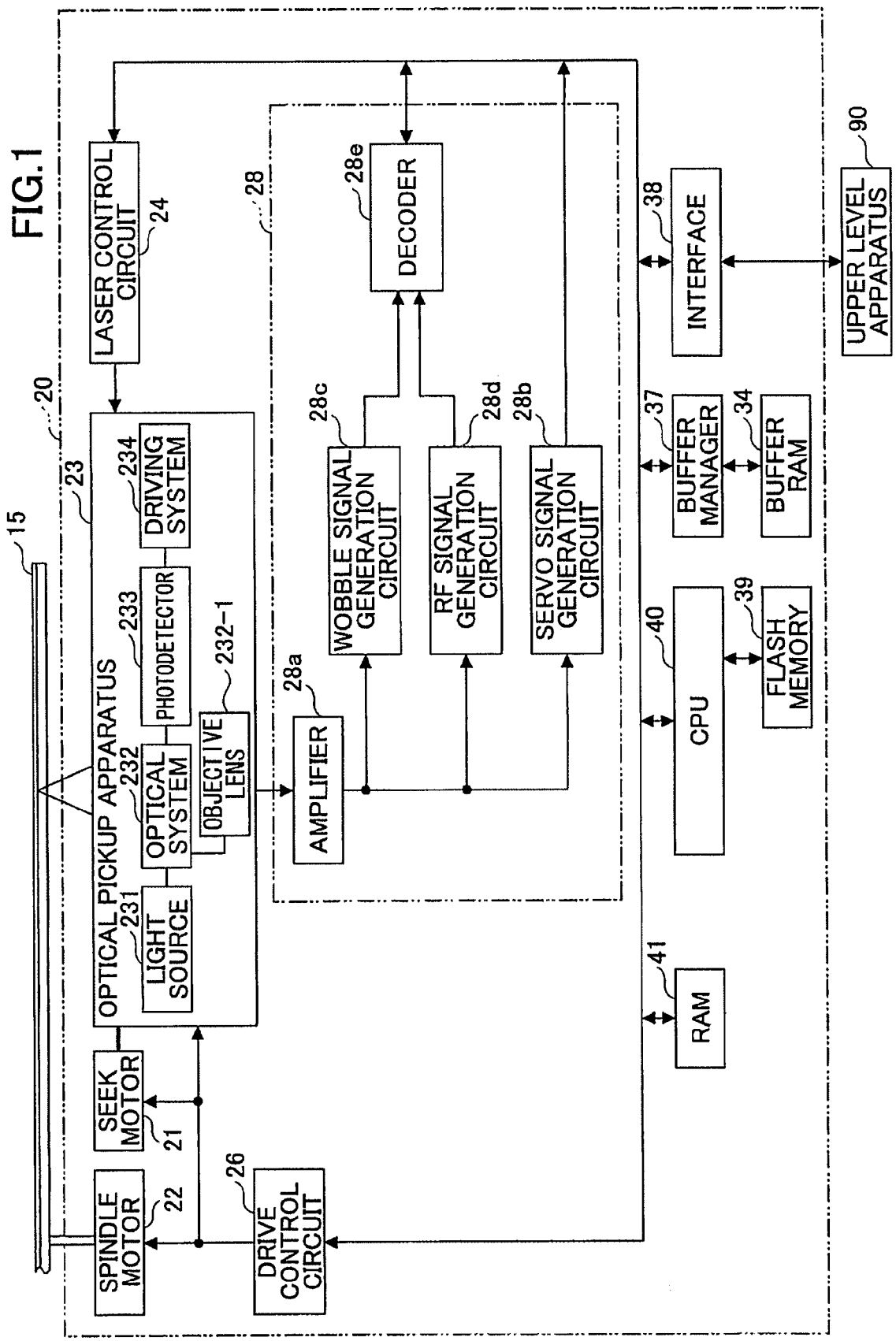
FIG. 1 is a block diagram showing an optical disk apparatus according to an embodiment of the present invention.

FIG. 1 is a schematic diagram showing an optical disk apparatus 20 according to an embodiment of the present invention.

In FIG. 1, the optical disk apparatus 20 includes, for example, a spindle motor 22 for rotating an optical disk 15, an optical pickup apparatus 23, a seek motor 21 for driving the optical pickup apparatus 23 in a radial direction, a laser control circuit 24, a drive control circuit 26, a reproduction signal processing circuit 28, a buffer RAM 34, a buffer manager 37, an interface 38, a flash memory 39, a CPU 40, and a RAM 41. It is to be noted that the arrows illustrated in FIG. 1 indicate the flow of representative signals and data and do not indicate the entire connection relationship of each of the blocks. The optical disk 15 according to an embodiment of the present invention is a super-resolution optical disk for enabling super-resolution reproduction. The optical disk 15 has a configuration including a recording layer 151, a reflection layer 152, and a super-resolution layer 153 which are sandwiched by transparent substrates 154. The recording layer 151 is for having data recorded thereto. The reflection layer 152 is for reflecting a laser beam irradiated to the optical disk 15. The super-resolution layer 153 contains a material whose optical constant (e.g., refraction index real part n and refraction index imaginary part k) changes according to temperature.

The optical pickup apparatus 23 is for irradiating a laser beam to the optical disk 15 and for receiving light reflected from the optical disk 15. The optical pickup apparatus 23 includes, for example, a light source 231 for irradiating a laser beam having a wavelength corresponding to the optical disk 15, an optical system 232 including an objective lens 232-1 for condensing the laser beam from the light source 231 to the optical disk 15 and guiding the light reflected from the optical disk 15 to a predetermined area(s) via the objective lens 232-1, a photodetector 233 having a photodetecting area(s) (light receiving area(s)) positioned at the predetermined area (s) for receiving the reflected light, and a driving system 234 for making fine adjustment of the drive of the objective lens 232-1. Each light receiving area of the photodetector 233 outputs a signal corresponding to the amount of light received (light reception amount) to a reproduction signal processing circuit 28. The driving system 234 includes a focusing actuator (not shown) for driving the objective lens 232-1 in a focus direction and a tracking actuator (not shown) for driving the objective lens 232-1 in a tracking direction. As one example, the wavelength of the laser beam emitted from the light source 231 (hereinafter also referred to as "light source wavelength") is 635 nm, and the numerical aperture (NA) of the objective lens 232-1 is 0.6. In this example, the diffraction limit is approximately 530 nm (≈light source wavelength/2 NA).

Figure 3:
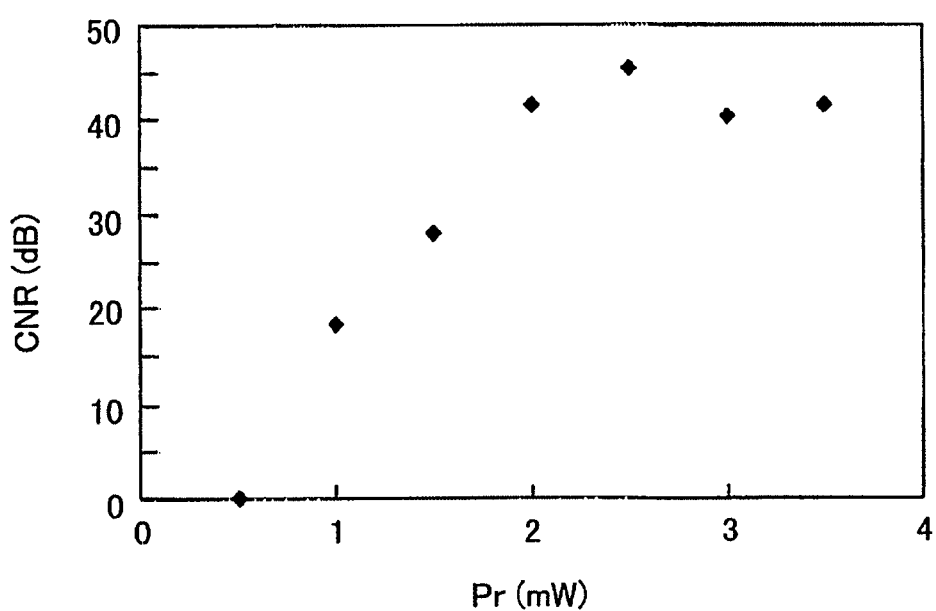
FIG. 3 is a graph for describing a relationship between reproduction power and CNR for a super resolution optical disk according to an embodiment of the present invention.

FIG. 3 is a graph showing an example of a relationship between carrier/noise ratio (CNR) and reproduction power (Pr) in a case where the optical pickup apparatus 23 reproduces data from the optical disk 15 having pits (pit length=200 nm) formed with a pitch of 400 nm. As shown in FIG. 3, CNR is over 30 dB when the reproduction power Pr is 2 mW or more, thus showing that super-resolution reproduction can be performed. It is to be noted that the reproduction power for enabling super-resolution reproduction is hereinafter also referred to as "super-resolution reproduction power".

When a laser beam having super-resolution reproduction power is condensed to the optical disk 15, the temperature rises at the area where the laser beam is condensed, to thereby form a fine aperture area or a fine mask area in the beam spot of the laser beam, as shown in FIGS. 4A and 4B, respectively. Both the fine aperture area and the fine mask area have a tail part formed trailing in a direction opposite of the traveling direction of the beam spot of the laser beam. It is to be noted that whether a fine aperture area or a fine mask area is formed in the super-resolution layer 153 of the optical disk 15 depends on, for example, the material of the super-resolution layer 153 or the configuration of the layers of the optical disk 15.

Accordingly, in a case where a fine aperture area is formed, the amount of reflected light changes significantly depending on whether a pit(s) is situated in the fine aperture area. Furthermore, in a case where a fine mask area is formed, the amount of reflected light changes significantly depending on whether a pit(s) is masked by the fine mask area.

Figure 5:
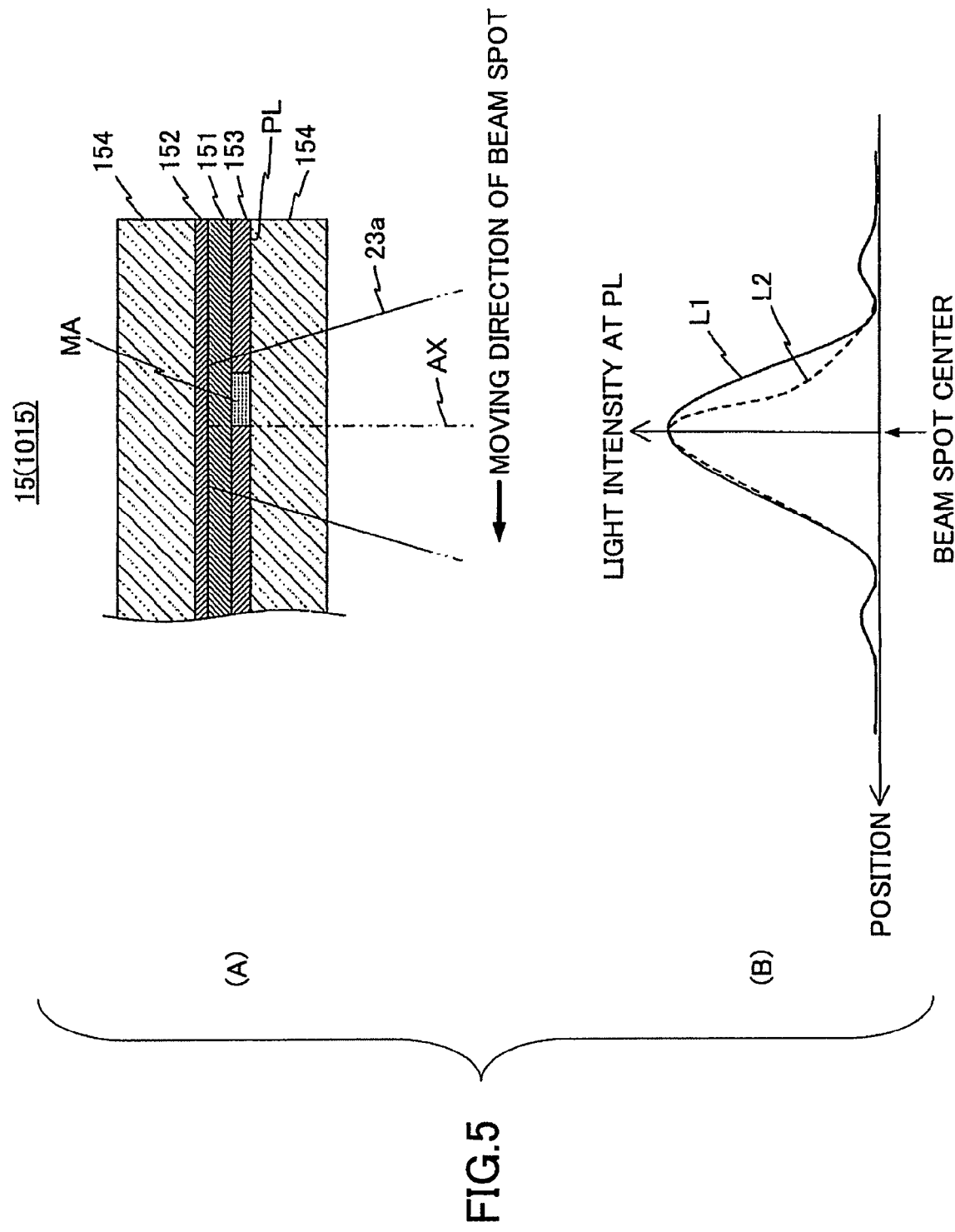
FIG. 5 is a schematic diagram for describing the effect of a fine mask area of an optical disk according to an embodiment of the present invention.

For example, as shown in (A) of FIG. 5, in a case where a fine mask area is formed, the optical constant of the super-resolution layer changes at the area heated by the beam spot of the laser beam, to thereby reduce the reflectivity at the rear part of the beam spot (with respect to the beam spot traveling direction). Accordingly, as shown in (B) of FIG. 5, from the aspect of light intensity distribution at the surface of the incident (ingoing) side of the super-resolution layer 153 (PL surface), the light incident to the PL surface forms a beam spot having a symmetrical shape. Meanwhile, the light reflected at the PL surface forms a beam spot having an asymmetrical shape (status). This causes phase distortion of a RF signal since data in the recording layer 151 are read out according to the asymmetrically shaped beam spot.

Figure 6:
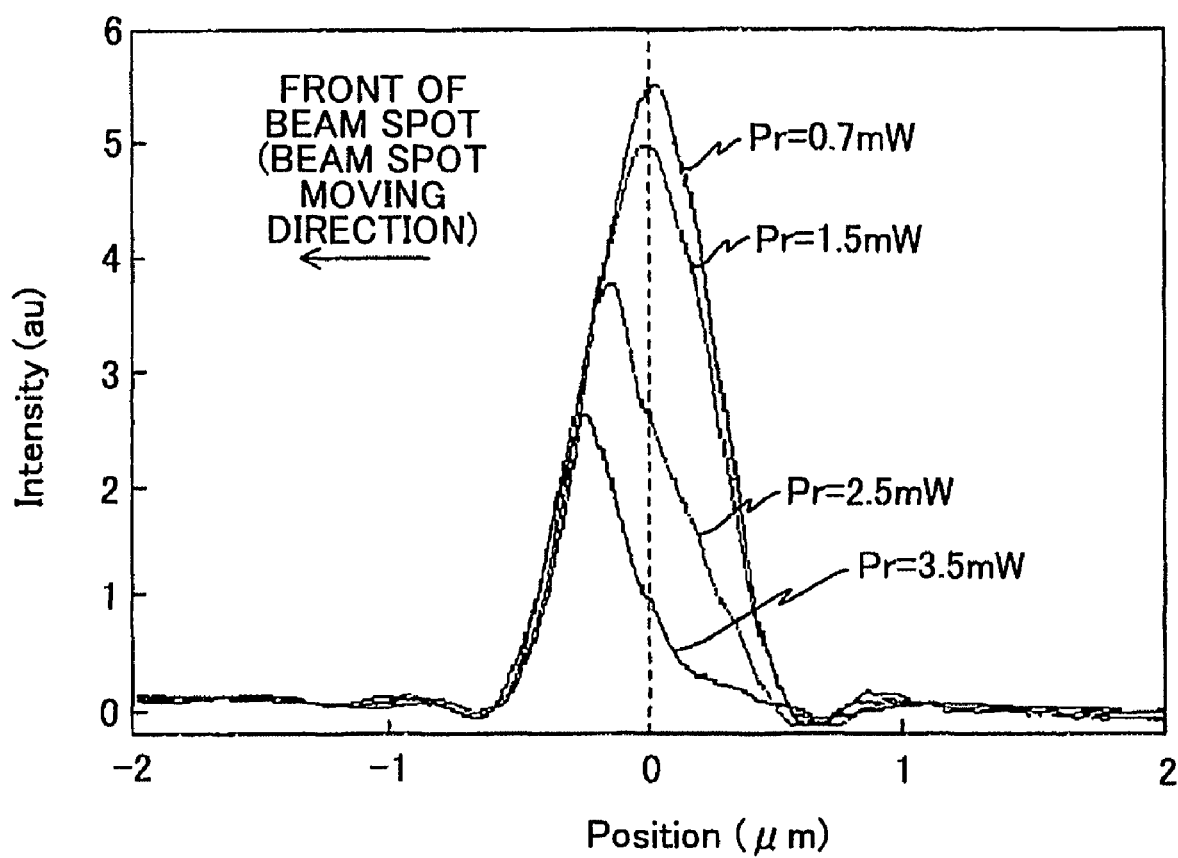
FIG. 6 is a graph for describing a relationship between light intensity distribution of reflected light and reproduction power for a super resolution optical disk according to an embodiment of the present invention.

FIG. 6 is an exemplary graph for describing dependency of light intensity distribution of reflected light with respect to reproduction power. According to this graph, in a case where reproduction power Pr is raised to super-resolution power, the rear part of the beam spot becomes masked and the light intensity distribution of the reflected light is reduced at its rear portion, thus showing the light intensity distribution of the reflected light having a cut off area at its rear portion. In this example, the benchmark (origin) shown in FIG. 6 indicates the center position of the beam spot.

Figure 7:
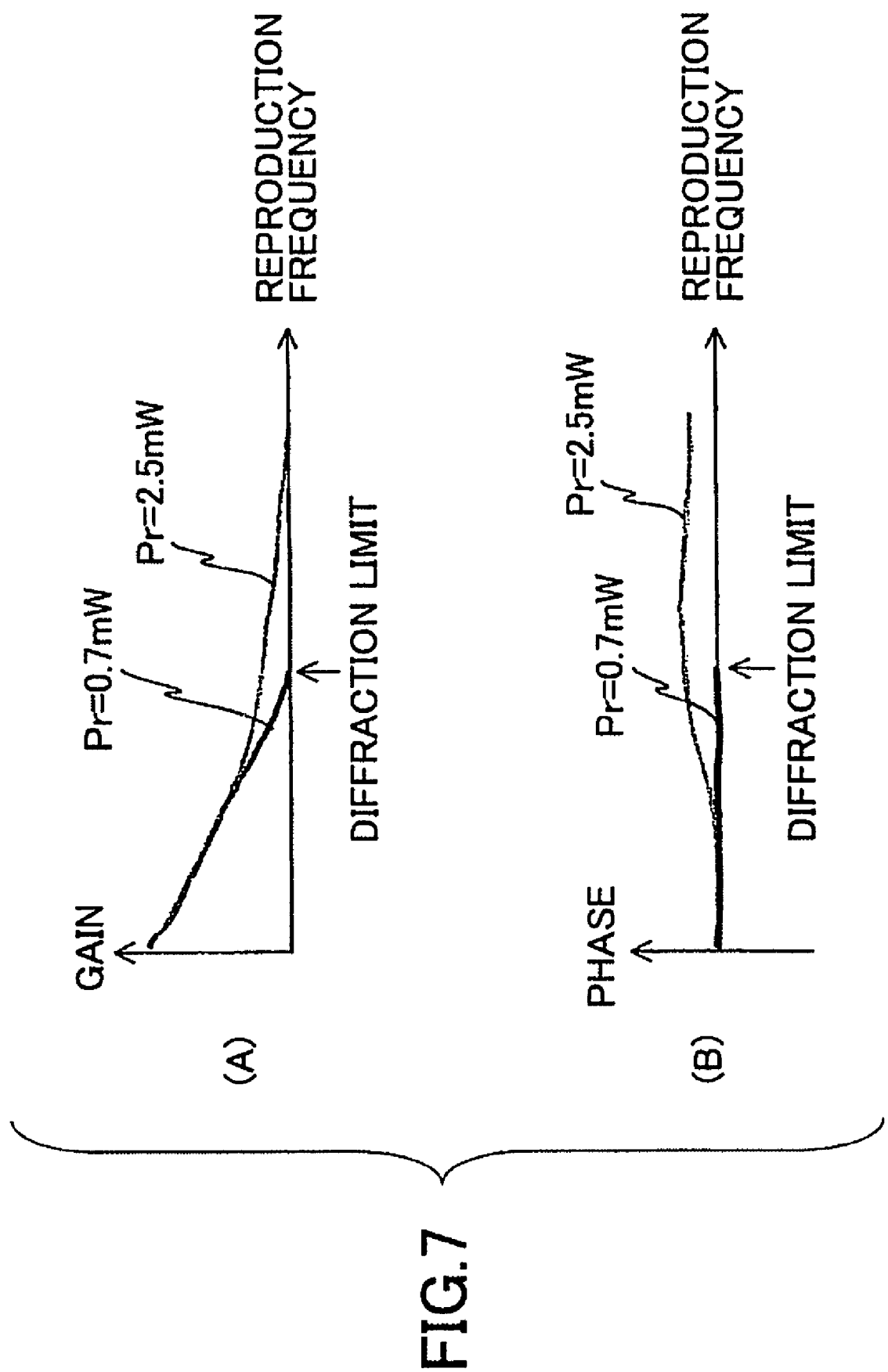
FIG. 7 shows Bode diagrams for describing frequency characteristic with respect to gain and frequency characteristic with respect to phase according to an embodiment of the present invention.

The reading system (including optical disk) of the optical system 232 obtained by performing Fourier transformation on the light intensity distribution shown in FIG. 6 is illustrated in the Bode diagrams (A) and (B) of FIG. 7. In a case where reproduction power Pr is 2.5 mW, although gain is maintained at a high frequency area above the diffraction limit (as shown in (A) of FIG. 7), phase distortion occurs at a frequency lower than the diffraction limit (as shown in (B) of FIG. 7). This phase distortion causes phase distortion of the RF signal and adversely affects decoding of data contained in the RF signal.

Returning to FIG. 1, the reproduction signal processing circuit 28 includes, for example, an amplifier 28a, a servo signal generation circuit 28b, a wobble signal generation circuit 28c, an RF signal generation circuit 28d, and a decoder 28e.

The amplifier 28a is for converting plural photoelectric conversion signals from the photodetector 233 of the optical pickup apparatus 23 to voltage signals and amplifying the signals with a predetermined gain.

The servo signal generation circuit 28b is for generating servo signals (focus error signal, tracking error signals) based on the signals output from the amplifier 28a. The generated servo signals are output to the drive control circuit 26.

The wobble signal generation circuit 28c is for generating wobble signals based on the signals output from the amplifier 28a.

The RF signal generation circuit 28d is for generating RF signals based on the signals output from the amplifier 28a.

The decoder 28e is for extracting, for example, address data and synchronization signals from the wobble signals. The extracted address data are output to the CPU 40 and the extracted synchronization signals are output to the drive control circuit 26.

Figure 8:
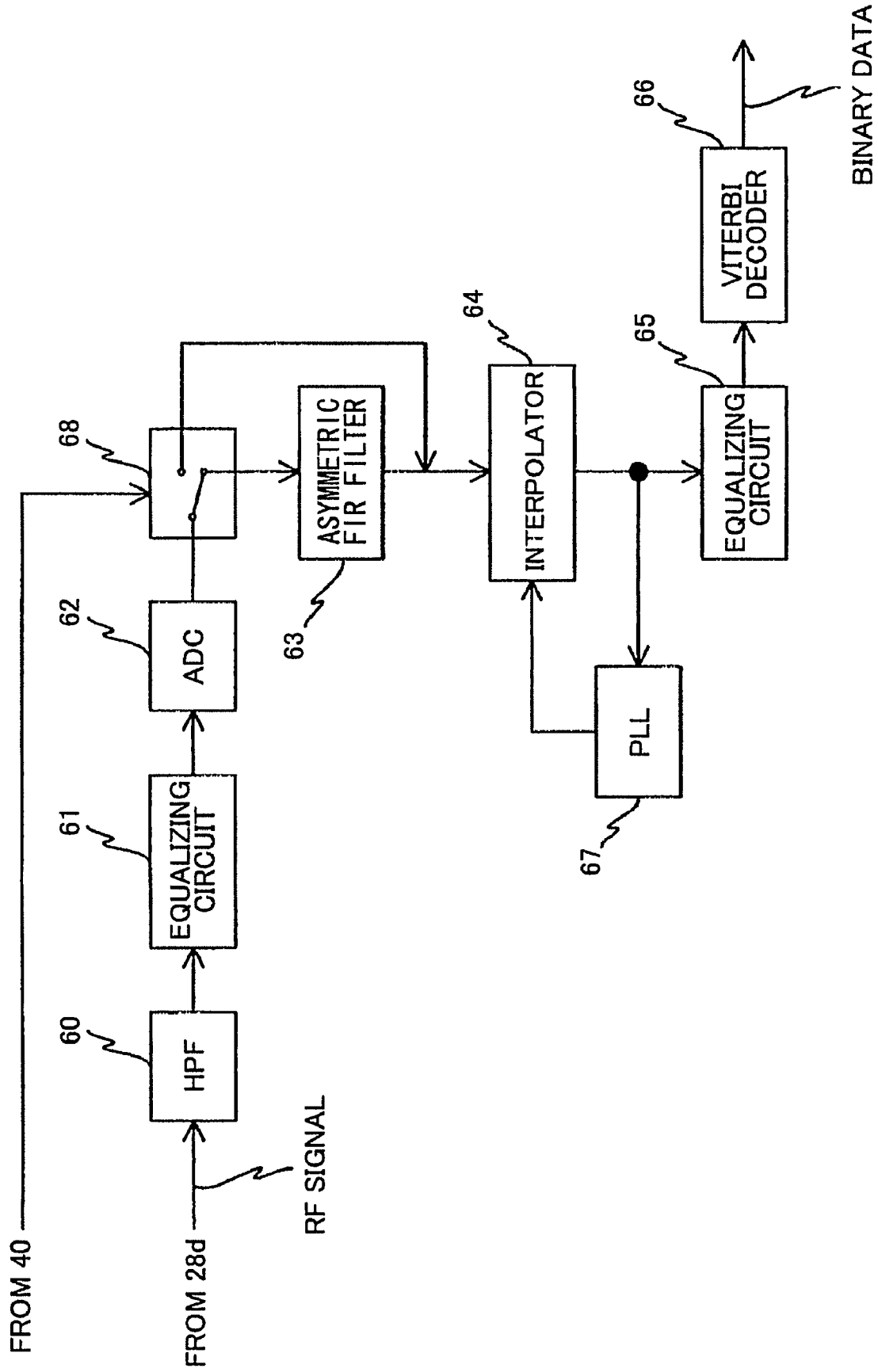
FIG. 8 is a schematic diagram for describing a decoder (binary data obtaining circuit) shown in FIG. 1.

The decoder 28e performs, for example, a decoding process and an error detection process on the RF signals. In a case where the decoder detects an error in the RF signals, the decoder 28e performs an error correction process on the RF signals. Then, the processed RF signals are output from the decoder 28 as reproduction data and stored in the buffer RAM 34 via the buffer manager 37. The decoder 28e is configured as a binary data obtaining circuit for obtaining binary data from the RF signals output from the RF signal generation circuit 28d. In this example, the binary data obtaining circuit (decoder) 28e includes a high pass filter (HPF) 60, an equalizing circuit 61, an AD converter (ADC) 62, a phase correction circuit 900 including an asymmetric FIR filter 63, an interpolator 64, another equalizing circuit 65, a Viterbi decoder 66, a PLL 67, and a switch circuit 68 as shown in FIG. 8.

The HPF 60 is for removing low frequency noise in the RF signal. The equalizing circuit 61 that is provided after the HPF 60 is for enhancing high pass components attenuated by the decrease of MTF (Modulation Transfer Function) of the optical system 232 and reducing intersymbol interference. It is to be noted that the equalizing circuit 61 also serves as a low pass filter (LPF) for cutting off high frequency components for preventing aliasing noise during AD conversion at the ADC 62.

The ADC 62 that is provided after the equalizing circuit 61 is for converting the signal output from the equalizing circuit 61 to a digital signal (AD conversion). The switch circuit 68 provided after the ADC 62 is for switching the output of the digital signal from the ADC 62 either to the asymmetric FIR filter 63 or the interpolator 64 in accordance with the instructions from the CPU 49.

The phase correction circuit 900 including the asymmetric FIR filter 63 is for performing a filtering process on the digital signal output from the ADC 62 for correcting the phase distortion of the RF signal. The configuration of the phase correction circuit 900 including the asymmetric FIR filter 63 is described in detail below.

The interpolator 64 is for performing an interpolation process on the signals output from the ADC 62 or the signals output from the asymmetric FIR filter 63, that is, interpolating a sample value of a clock timing according to sample values of two or more prior and subsequent timings (before and after).

The PLL 67 is for reproducing clocks (hereinafter also referred to as "recording clocks") of recording signals recorded in the optical disk 15 from the signals output from the interpolator 64 and instructing the clock timing to the interpolator 64. That is, the sampling operation synchronizing with the reproduction clocks is conducted by the combination of the interpolator 64 and the PLL 67. In this example, the period of the recording clock is hereinafter indicated as "1T".

The equalizing circuit 65 that is provided after the interpolator 64 is for performing waveform equalization on the signals output from the interpolator 64 so that the signals becomes a response signal corresponding to a desired PR (Partial Response) characteristic. The desired PR characteristic may be, for example, (1, 2, 2, 2, 1).

The Viterbi decoder 66 that is provided after the equalizing circuit 65 is for performing a decoding process using maximum likelihood (Viterbi decoding process) on the signals output from the equalizing circuit 65, to thereby output binary data. That is, in this example, a PRML (Partial Response Maximum Likelihood) signal processing method is used.

Returning to FIG. 1, the drive control circuit 26 generates drive signals for driving the driving system 234 of the optical pickup apparatus 23 according to the servo signals from the reproduction signal processing circuit 28 for correcting the deviation of the position of the objective lens 232-1. Thereby, tracking control and focus control is according to the drive signals. The drive control circuit 26 also generates drive signals for driving the seek motor 21 and drive signals for driving the spindle motor 22 according to the instructions from the CPU 40. The drive control circuit 26 outputs corresponding drive signals to the seek motor 21 and the spindle motor 22.

The buffer RAM 34 is for temporarily storing, for example, data reproduced from the optical disk 15 (reproduction data). The input and output of data to and from the buffer RAM 34 are managed by the buffer manager 37.

The laser control circuit 24 is for controlling the irradiation power of the light source 231 in the optical pickup apparatus 23.

The interface 38 is an interface for performing two-way communications with respect to an upper level apparatus 90 (e.g., personal computer). The interface 38 includes standard interfaces such as ATAPI (AT Attachment Packet Interface), SCSI (Small Computer System Interface), and USB (Universal Serial Bus).

The flash memory 39 is for storing, for example, various programs written in codes readable by the CPU 40, data regarding the light emission characteristics of the light source 231 of the optical pickup apparatus 23 (light source characteristic data), and data regarding equalizing coefficient (equalizing coefficient data).

The CPU 40 is for controlling operations (processes) of each of the above-described apparatuses, circuits, and parts in accordance with the program(s) stored in the flash memory 39 and for storing various data (e.g., data used for performing the controls) in the RAM 41 and the buffer RAM 34.

<Detail Description of Asymmetric FIR Filter of Phase Correction Circuit>

Next, the asymmetric FIR filter 63 including to the phase correction circuit 900 according to an embodiment of the present invention is described in detail.

Figure 9:
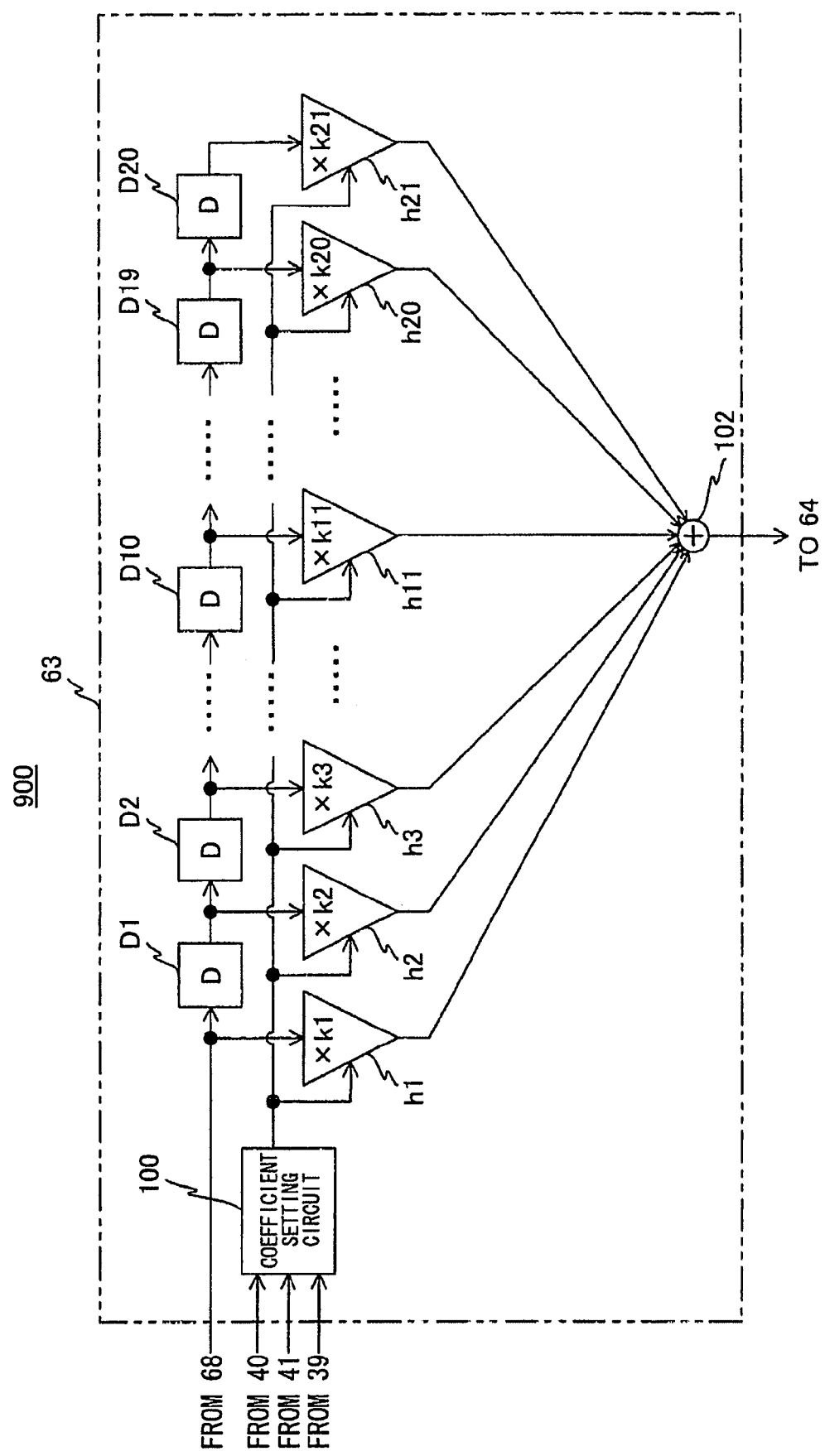
FIG. 9 is a schematic diagram for describing an asymmetric FIR filter shown in FIG. 8.

As shown in FIG. 9, the exemplary configuration of the phase correction circuit 900 includes the asymmetric FIR filter 63 having, for example, 20 delay circuits (D1-D20), 21 multipliers (h1-h21), a coefficient setting circuit 100, and an adder 102. That is, the asymmetric FIR filter 63 includes an FIR filter of 21 taps. The multiplication coefficient (n;n=1-21) of each multiplier h1-h21 is also referred to as "tap coefficient". Furthermore, a combination of multiplication coefficients of each multiplier h1-h21 is also referred to as "equalizing coefficient". For the sake of convenience, a delay device and part of the multipliers are omitted (not shown) in FIG. 9. It is to be noted that the delay time of each delay device is "1T" (a single cycle of the recording clock).

The adder 102 is for adding signals output from each multiplier h1-h21 and outputting the added signals to the interpolator 64.

The coefficient setting circuit 100 is for setting the equalizing coefficient based on, for example, the configuration of the super-resolution layer of the optical disk 15, recording density, recording power, linear speed during reproduction, and the waveform for driving the light source 231 (hereinafter also referred to as "coefficient setting condition"). In this example, suitable equalizing coefficients are obtained beforehand in correspondence with each coefficient setting condition and are stored as equalizing coefficient data in the flash memory 39. Accordingly, the coefficient setting circuit 100 extracts an equalizing coefficient corresponding to a coefficient setting condition from the flash memory 39 and sets the equalizing coefficient to each multiplier h1-h21.

In this example, in order to obtain the equalizing coefficient, a predetermined pit array recorded in the optical disk 15 is reproduced and a difference between a target signal from which a recording clock can be reliably obtained in the PLL 67 and a signal output from the asymmetric FIR filter 63 is obtained by using a least mean square (LMS) algorithm or a recursive least square (RLS) algorithm. The least value of the difference between the target signal and the output signal of the asymmetric FIR filter 63 is set as the suitable equalizing coefficient corresponding to the coefficient setting condition at that time. It is to be noted that the converging of the calculation can be accelerated by using an asymmetric equalizing coefficient value as the initial value.

Next, an example of the equalizing coefficient set by the coefficient setting circuit 100 is described. In this example, as shown in FIG. 10, "coefficient setting condition 1" is set having a recording medium type of "A", a reproduction power of "2.5 mW", a linear speed of "4.30 m/s", and a shortest pit length (also referred to as "shortest mark length") of "0.193 μm"; "coefficient setting condition 2" is set having a recording medium type of "A", a reproduction power of "2.1 mW", a linear speed of "4.30 m/s", and a shortest pitch length of "0.193 μm"; "coefficient setting condition 3" is set having a recording medium type of "B", a reproduction power of "2.7 mW", a linear speed of "4.30 m/s", and a shortest pitch length of "0.193 μm"; "coefficient setting condition 4" is set having a recording medium type of "B", a reproduction power of "2.7 mW", a linear speed of "4.30 m/s", and a shortest pitch length of "0.130 μm"; and a "coefficient setting condition 5" is set having a recording medium type of "A", a reproduction power of "2.7 mW", a linear speed of "3.00 m/s", and a shortest pitch length of "0.193 μm". It is to be noted that the recording medium of type "A" is a super-resolution optical disk in which a fine mask area(s) is formed and the recording medium of type "B" is a super-resolution optical disk in which a fine aperture area(s) is formed.

Figure 11:
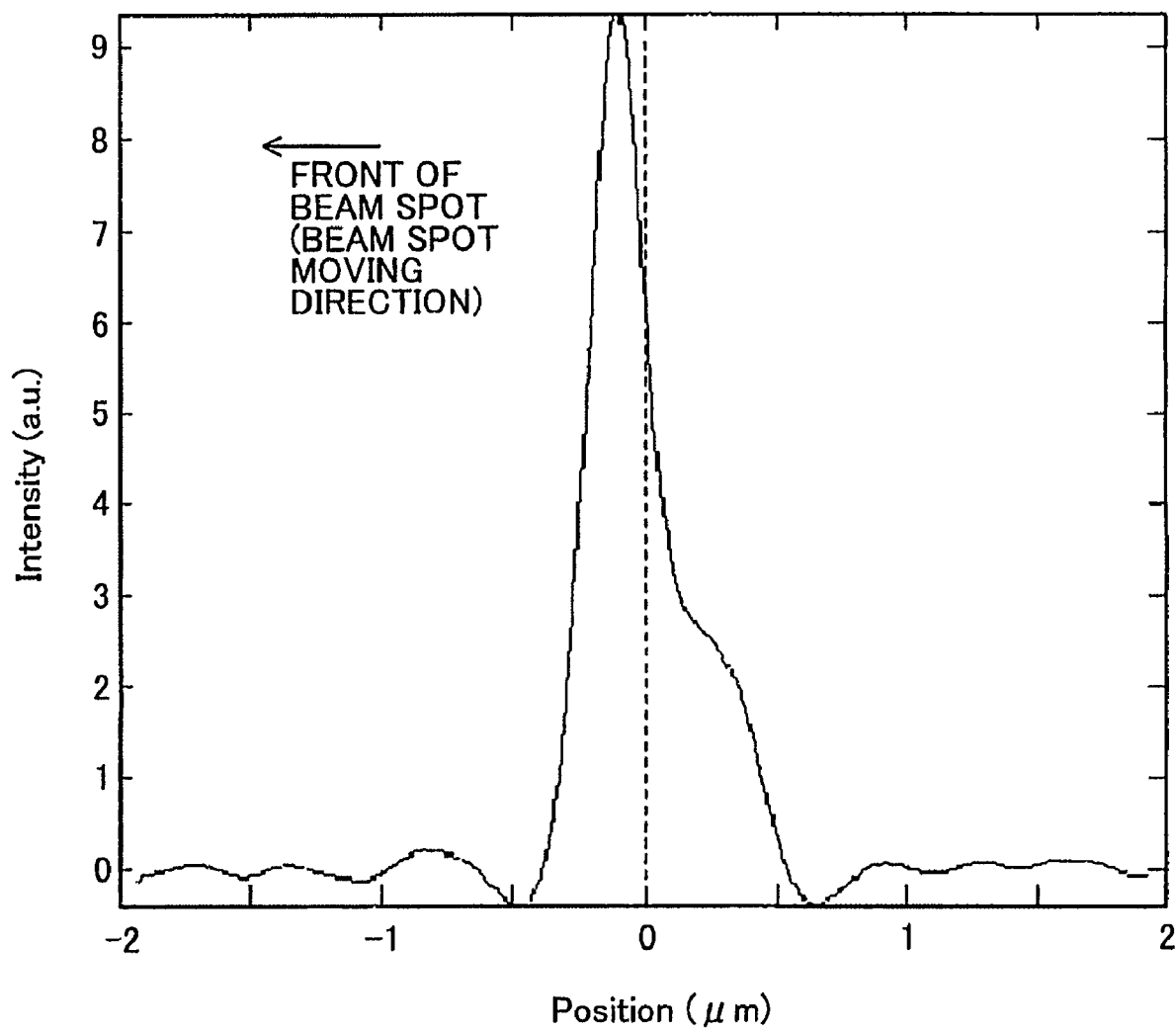
FIG. 11 is a graph for describing light intensity distribution of a reflected light according to a coefficient setting condition 1 according to an embodiment of the present invention.
Figure 12:
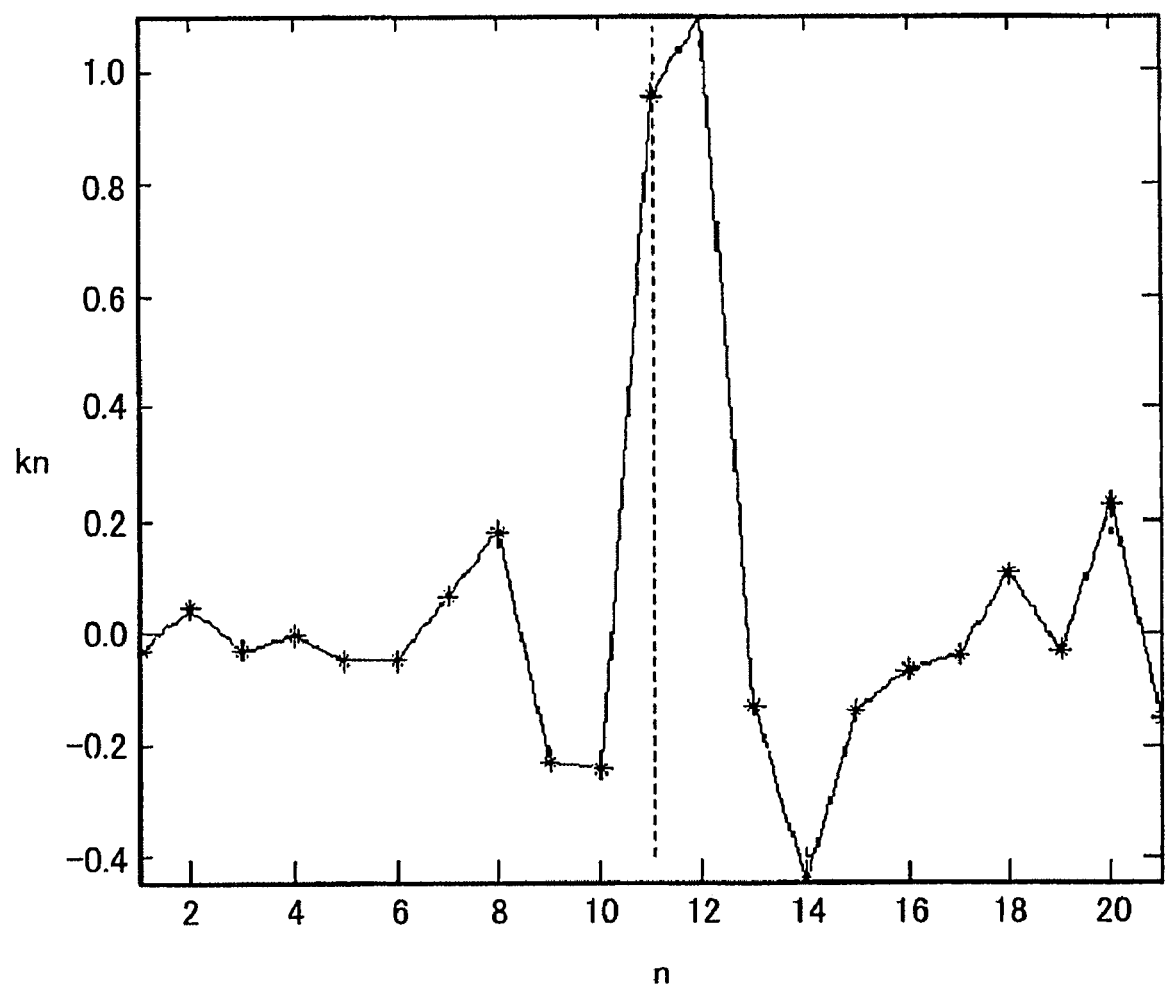
FIG. 12 is a graph for describing equalizing coefficients of an asymmetric FIR filter according to a coefficient setting condition 1 according to an embodiment of the present invention.

FIG. 11 shows a light intensity distribution of reflected light from the PL surface in a case where "coefficient setting condition 1" is selected. FIG. 11 shows that the light intensity of the rear part of the beam spot of the reflected light is reduced by the fine mask area formed in the heated area, thus showing a light intensity distribution having an asymmetric shape. FIG. 12 shows the equalizing coefficient where "coefficient setting condition 1" is selected. FIG. 12 shows that the equalizing coefficient also exhibits an asymmetric shape where the center of the tap coefficient (in this example, k11) is the origin.

Figure 13:
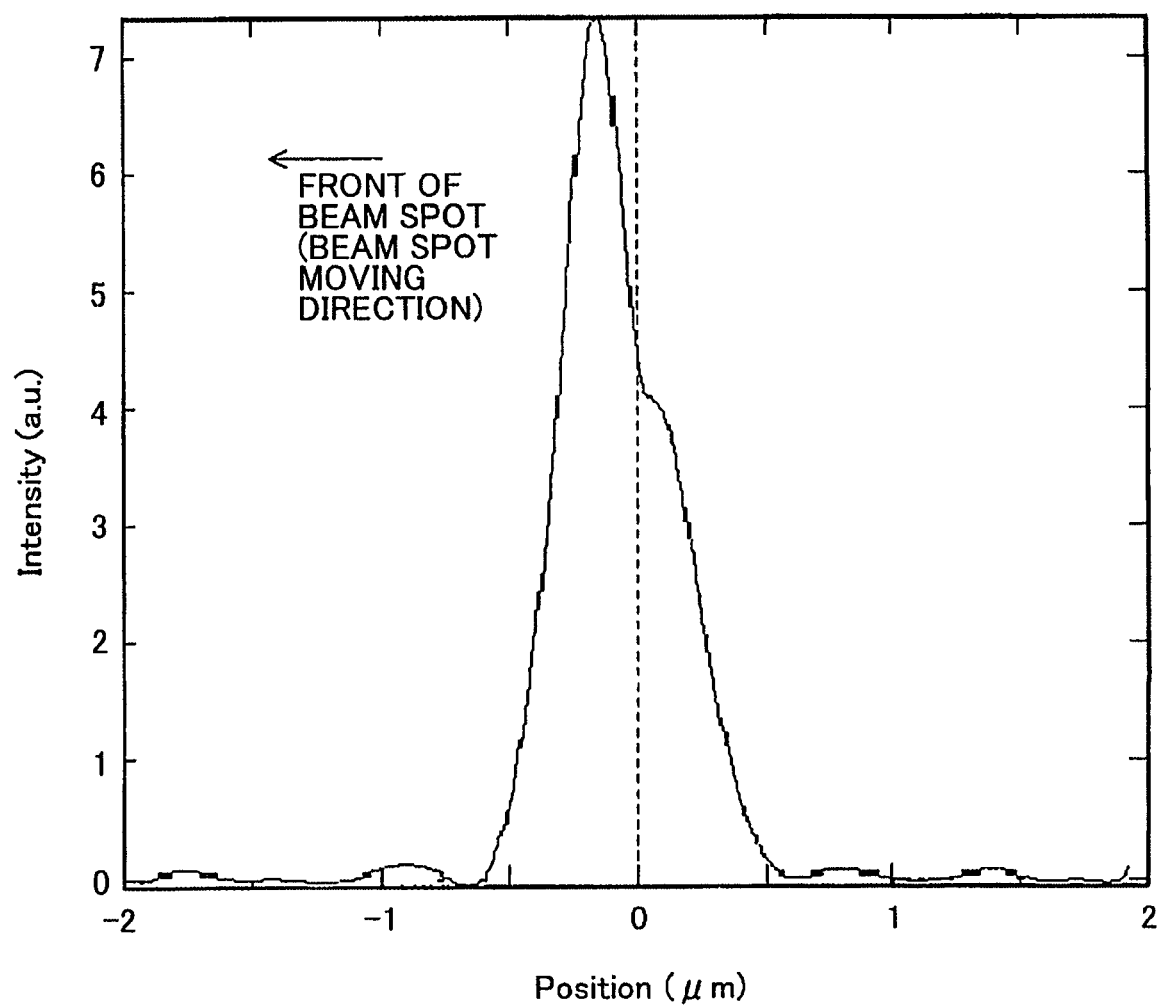
FIG. 13 is a graph for describing light intensity distribution of a reflected light according to a coefficient setting condition 2 according to an embodiment of the present invention.
Figure 14:
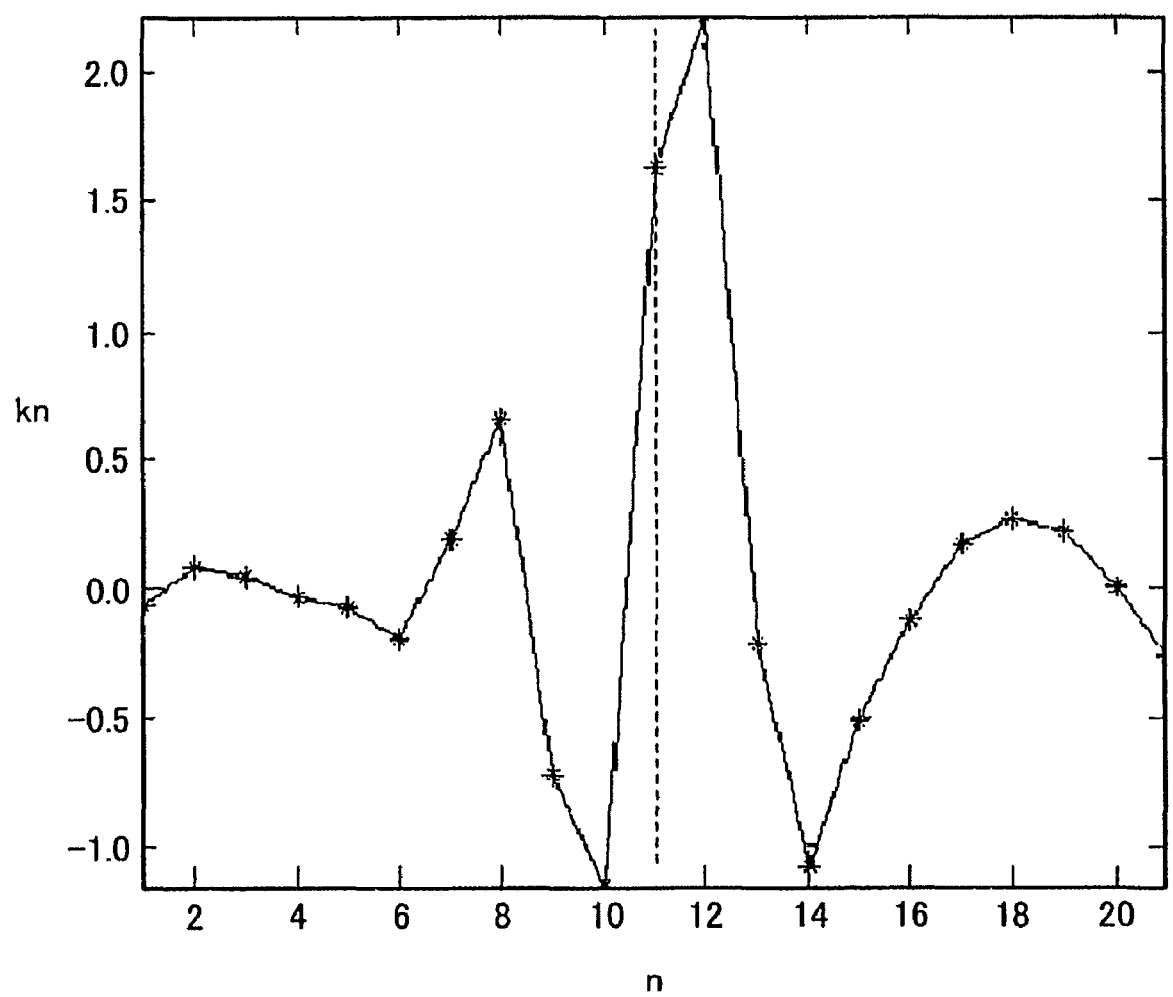
FIG. 14 is a graph for describing equalizing coefficients of an asymmetric FIR filter according to a coefficient setting condition 2 according to an embodiment of the present invention.

FIG. 13 shows a light intensity distribution of reflected light from the PL surface in a case where "coefficient setting condition 2" is selected. FIG. 13 shows that the size (area) of the fine mask area is reduced and the shape of the light intensity distribution is becoming closer to a symmetrical shape. This is due to the reduction of reproduction power compared to the reproduction power of coefficient condition 1. FIG. 14 shows the equalizing coefficient where "coefficient setting condition 2" is selected. Different from the equalizing coefficient shown in FIG. 12, FIG. 14 shows that the equalizing coefficient is to be changed in accordance with reproduction power.

Figure 15:
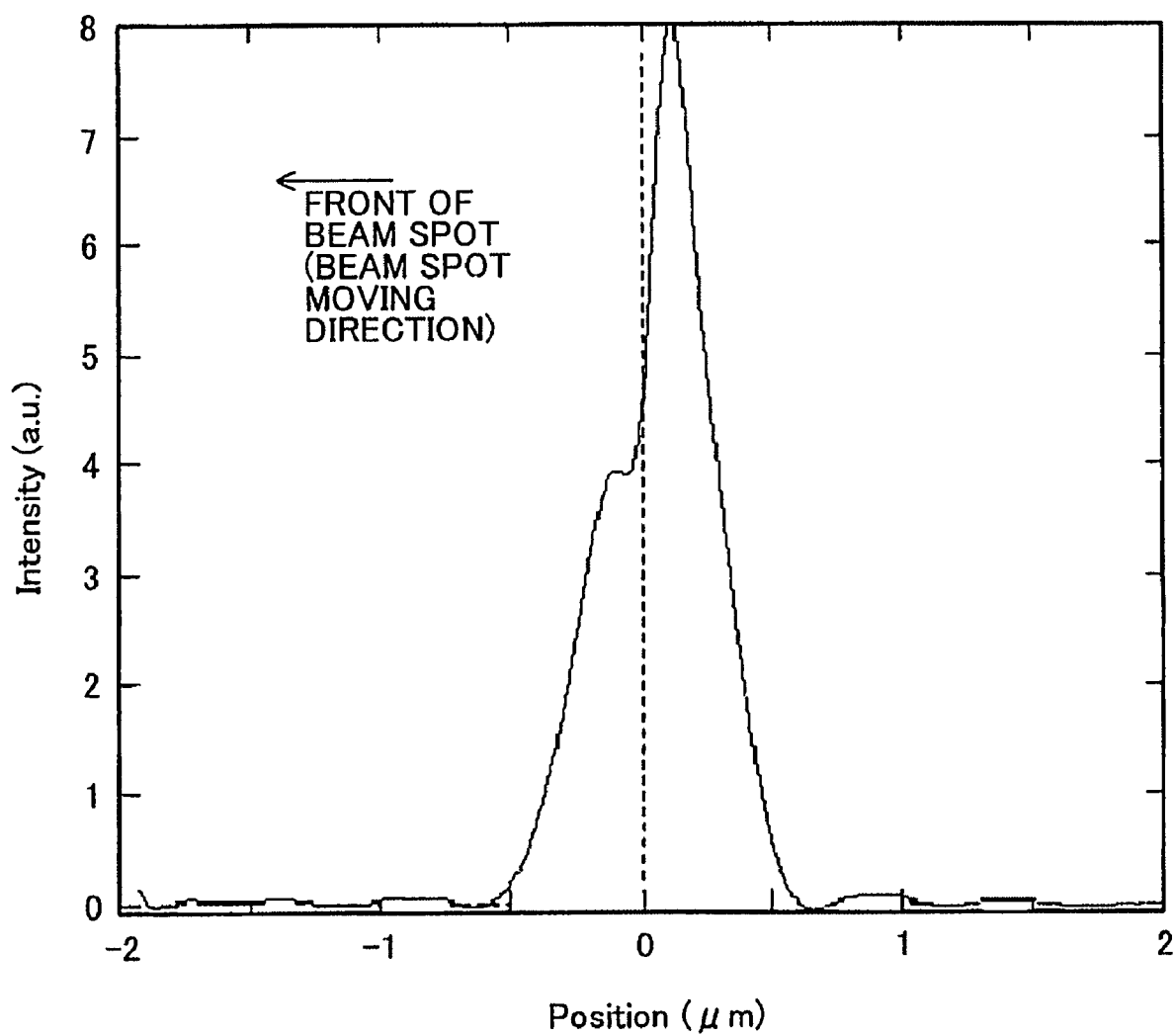
FIG. 15 is a graph for describing light intensity distribution of a reflected light according to a coefficient setting condition 3 according to an embodiment of the present invention.
Figure 16:
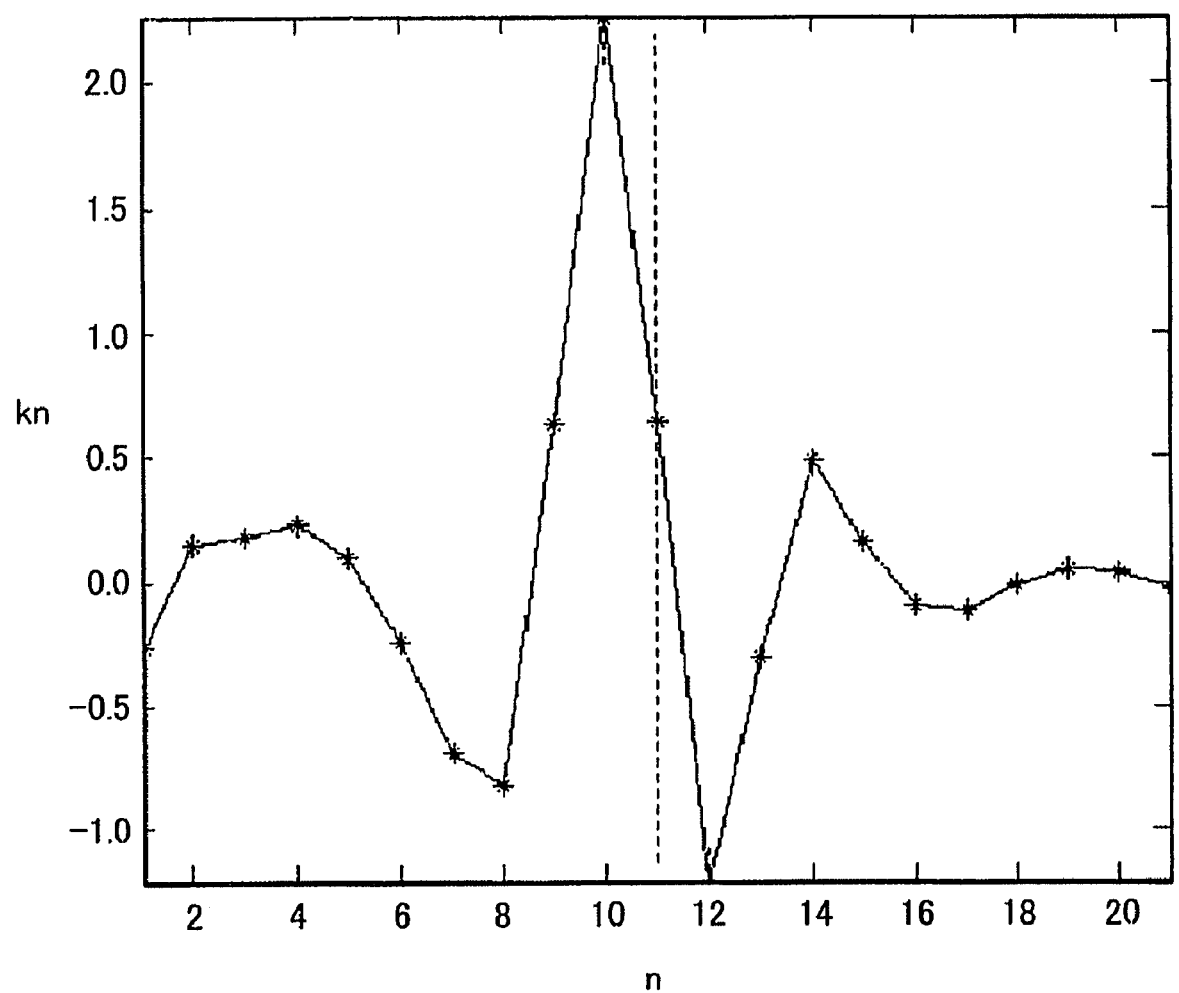
FIG. 16 is a graph for describing equalizing coefficients of an asymmetric FIR filter according to a coefficient setting condition 3 according to an embodiment of the present invention.

FIG. 15 shows a light intensity distribution of reflected light from the PL surface in a case where "coefficient setting condition 3" is selected. FIG. 15 shows that the light intensity of the rear part of the beam spot of the reflected light is increased by the fine aperture area formed in the heated area, thus showing a light intensity distribution having an asymmetric shape. FIG. 16 shows the equalizing coefficient where "coefficient setting condition 3" is selected. Different from the equalizing coefficient shown in FIG. 12, FIG. 16 shows that the equalizing coefficient is to be changed in accordance with the type of optical disk 15 (type of super resolution layer).

Figure 17:
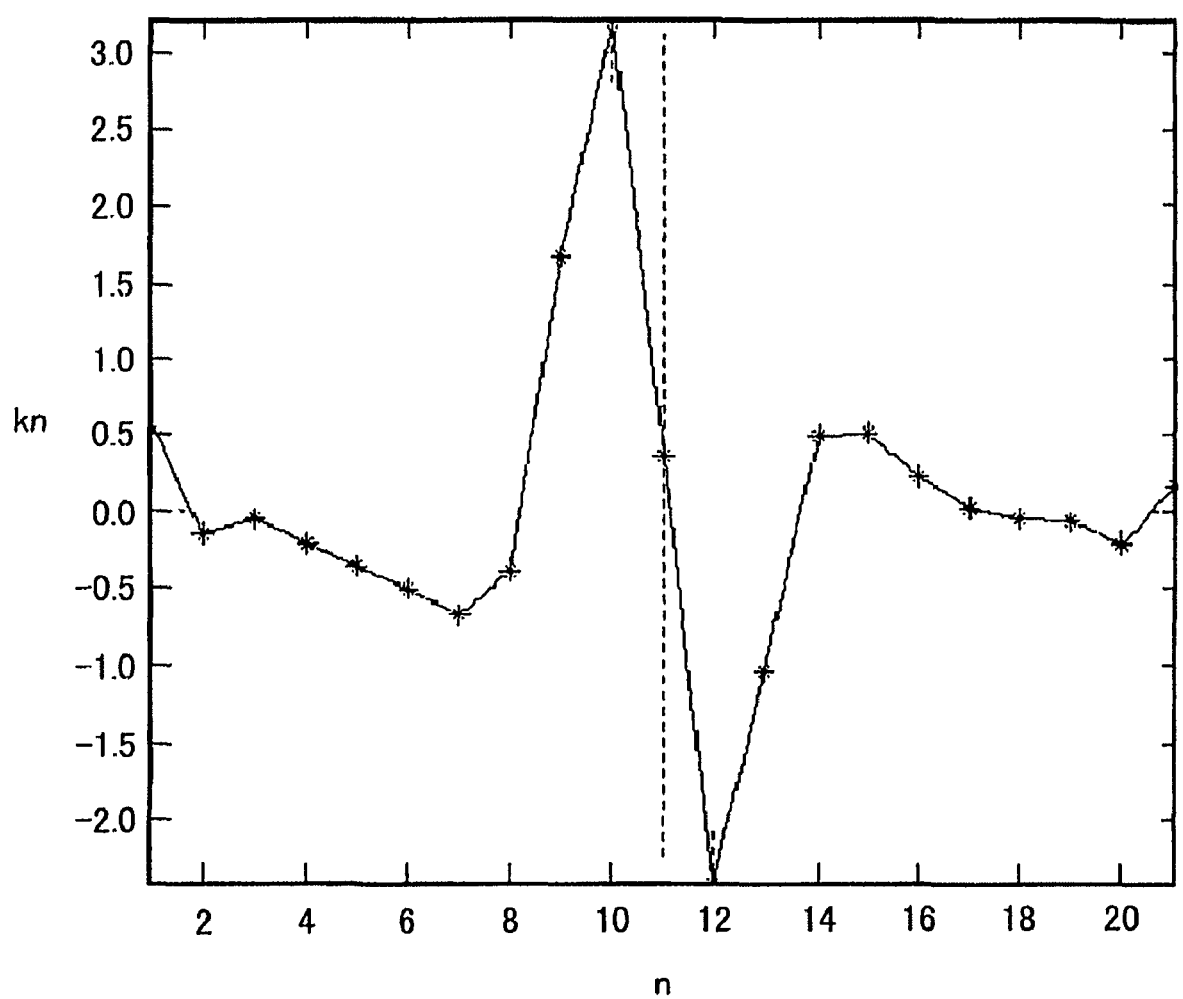
FIG. 17 is a graph for describing equalizing coefficients of an asymmetric FIR filter according to a coefficient setting condition 4 according to an embodiment of the present invention.

FIG. 17 shows the equalizing coefficient where "coefficient setting condition 4" is selected. Different from the equalizing coefficient shown in FIG. 16, FIG. 17 shows that the equalizing coefficient is to be changed in accordance with the shortest mark length (recording density). It is to be noted that the only difference between coefficient setting condition 4 and coefficient setting condition 3 is the shortest mark length (recording density) and that the light intensity distribution of coefficient setting condition 4 is substantially the same as that of coefficient setting condition 3.

Figure 18:
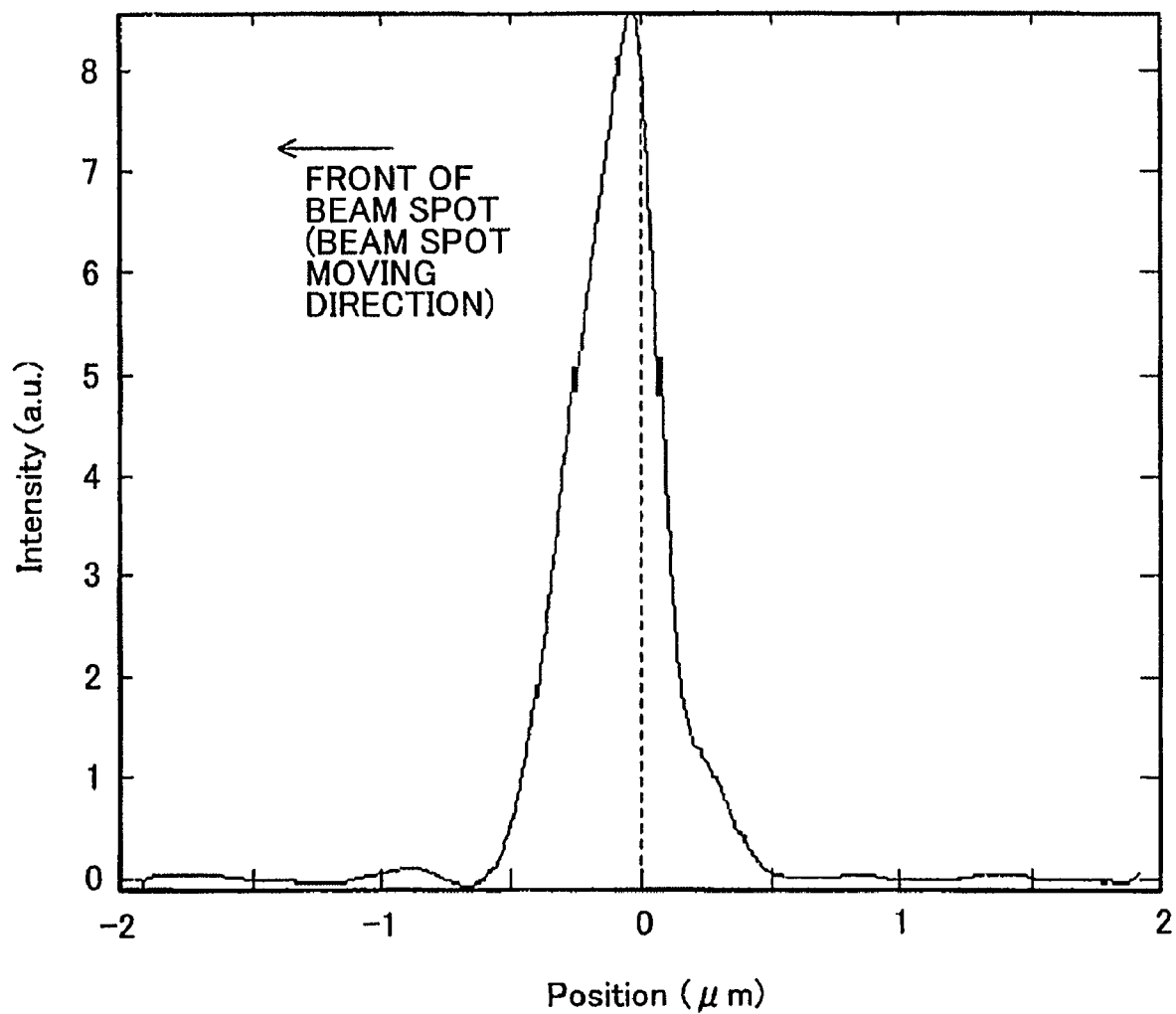
FIG. 18 is a graph for describing light intensity distribution of a reflected light according to a coefficient setting condition 5 according to an embodiment of the present invention.
Figure 19:
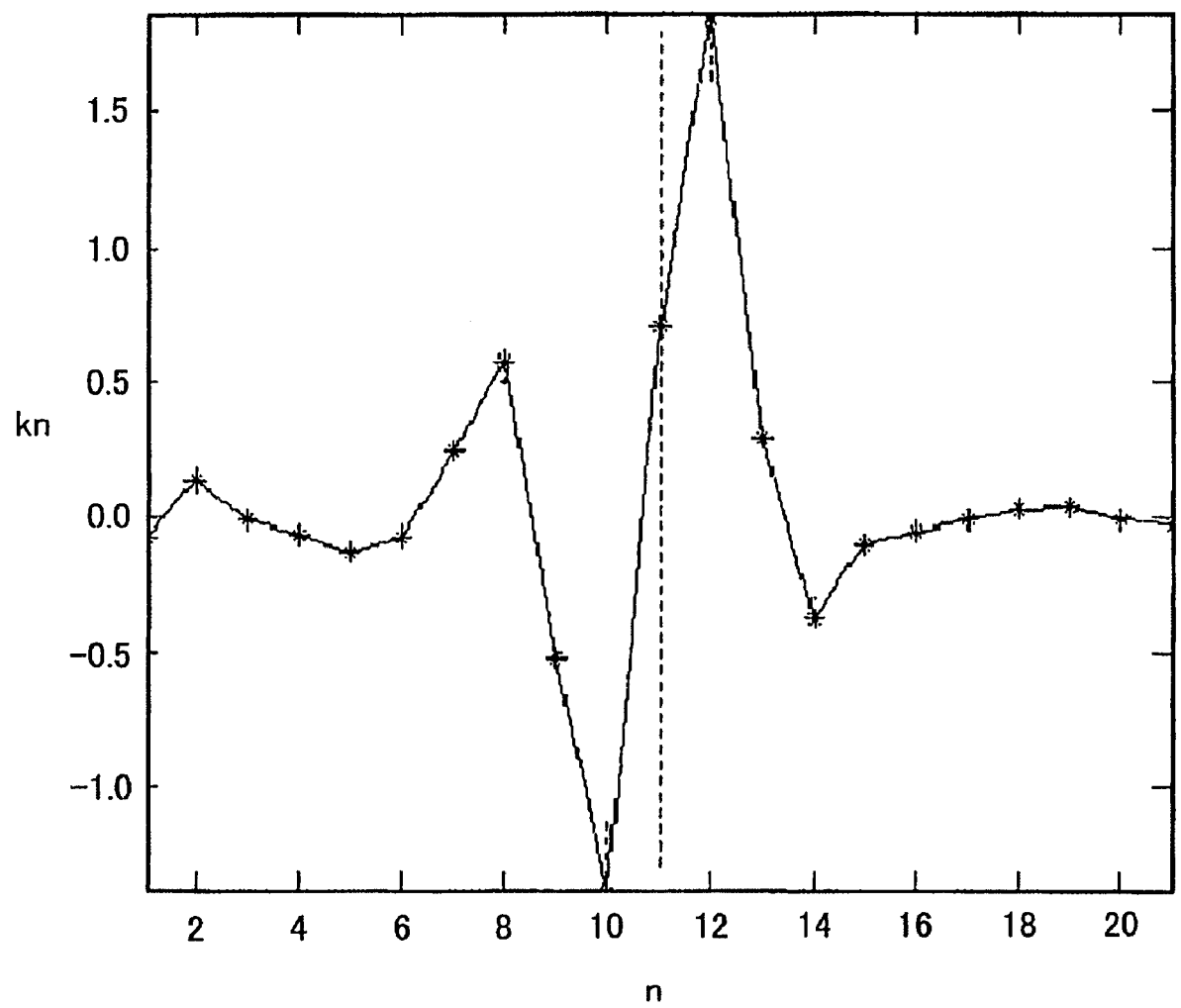
FIG. 19 is a graph for describing equalizing coefficients of an asymmetric FIR filter according to a coefficient setting condition 6 according to an embodiment of the present invention.

FIG. 18 shows a light intensity distribution of reflected light from the PL surface in a case where "coefficient setting condition 5" is selected. Compared to the light intensity distribution of coefficient setting condition 1, the light intensity distribution of coefficient setting condition 5 shows that the light intensity of the rear part of the beam spot of the reflected light is more reduced by the fine mask area formed in the heated area since the super-resolution layer is heated at higher temperature due to the reduction of linear speed. FIG. 19 shows the equalizing coefficient where "coefficient setting condition 5" is selected. Different from the equalizing coefficient shown in FIG. 12, FIG. 19 shows that the equalizing coefficient is to be changed in accordance with linear speed.

Figure 20:
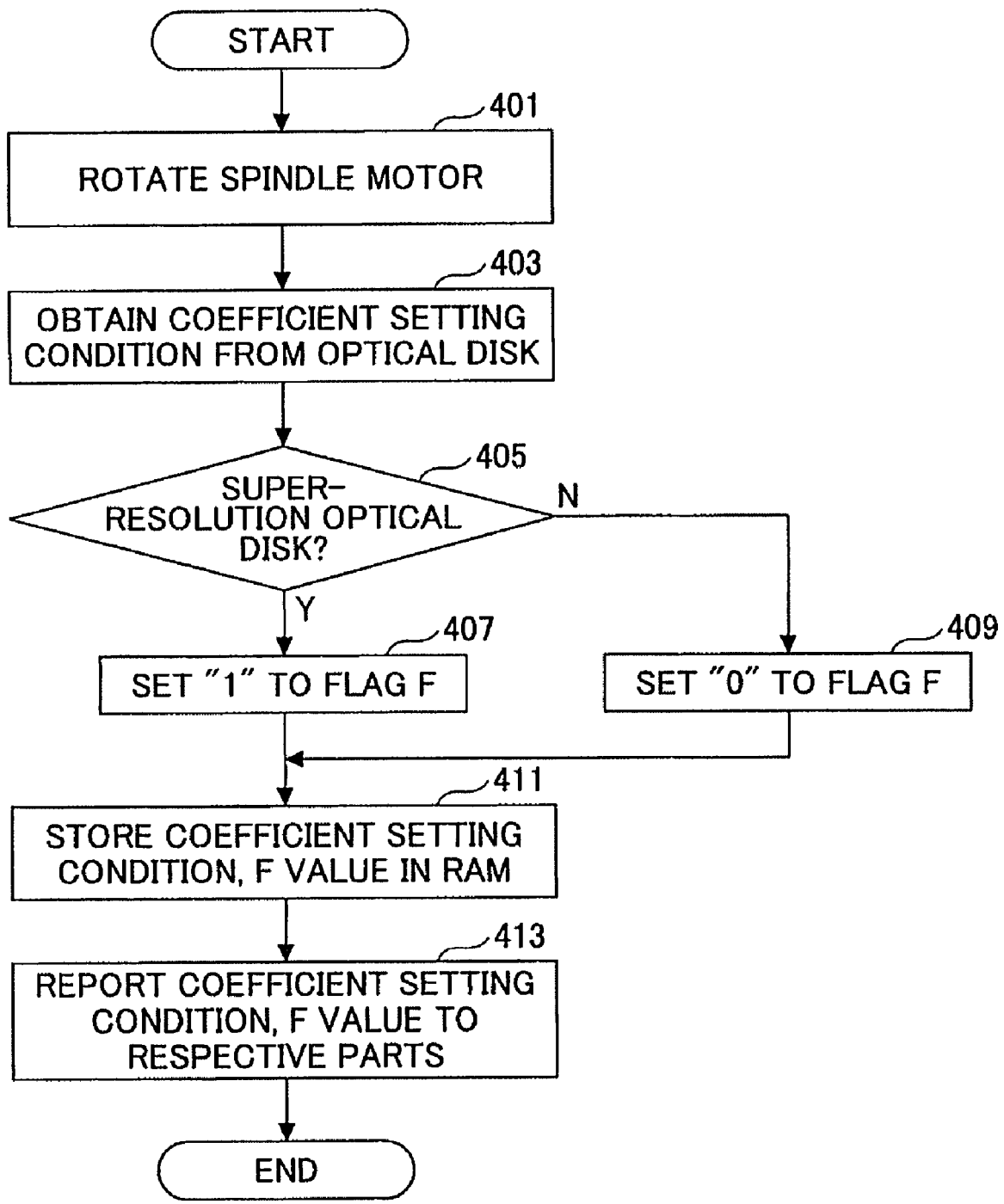
FIG. 20 is a flowchart for describing an operation conducted when an optical disk is loaded to an optical disk apparatus according to an embodiment of the present invention.

Next, an operation where the optical disk 15 is loaded (mounted) to the optical disk apparatus 20 according to an embodiment of the present invention is described with reference to FIG. 20. The flowchart shown in FIG. 20 corresponds to an algorithm having a series of processes executed by the CPU 40.

First, the CPU 40 instructs the drive control circuit 26 to rotate the optical disk 15 with a predetermined linear speed (or an angular speed) (Step S401).

Then, coefficient setting conditions and disk data which are recorded in the optical disk 15 are read out (Step S403).

Then, it is determined whether the optical disk 15 is a super-resolution optical disk based on the disk data read out from the optical disk 15 (Step S405). In this example, it is determined affirmative (Yes in Step S405) since the optical disk 15 is a super-resolution optical disk.

Then, a value of "1" is set to flag F for indicating that the optical disk 15 loaded to the optical disk apparatus 20 is a super-resolution optical disk (Step S407).

Then, various data such as the read out coefficient setting conditions, the disk data, and the value of the flag F (flag value data) are stored in the RAM 41 (Step S411).

Then, the stored data including the coefficient setting conditions and flag value data are sent (reported) to corresponding parts in the optical disk apparatus 20 requiring the data (Step S413). The operation of loading the optical disk 15 to the optical disk apparatus 20 is completed after Step S413 is executed.

In a case where the optical disk 15 is not a super-resolution optical disk, it is determined negative in Step S405 (No in Step S405) and the operation proceeds to Step S409. Then, a value of "0" is set to flag F for indicating that the optical disk 15 loaded to the optical disk apparatus 20 is not a super-resolution optical disk (Step S409). Then, the operation proceeds to Step S411.

<Reproduction Operation>

Figure 21:
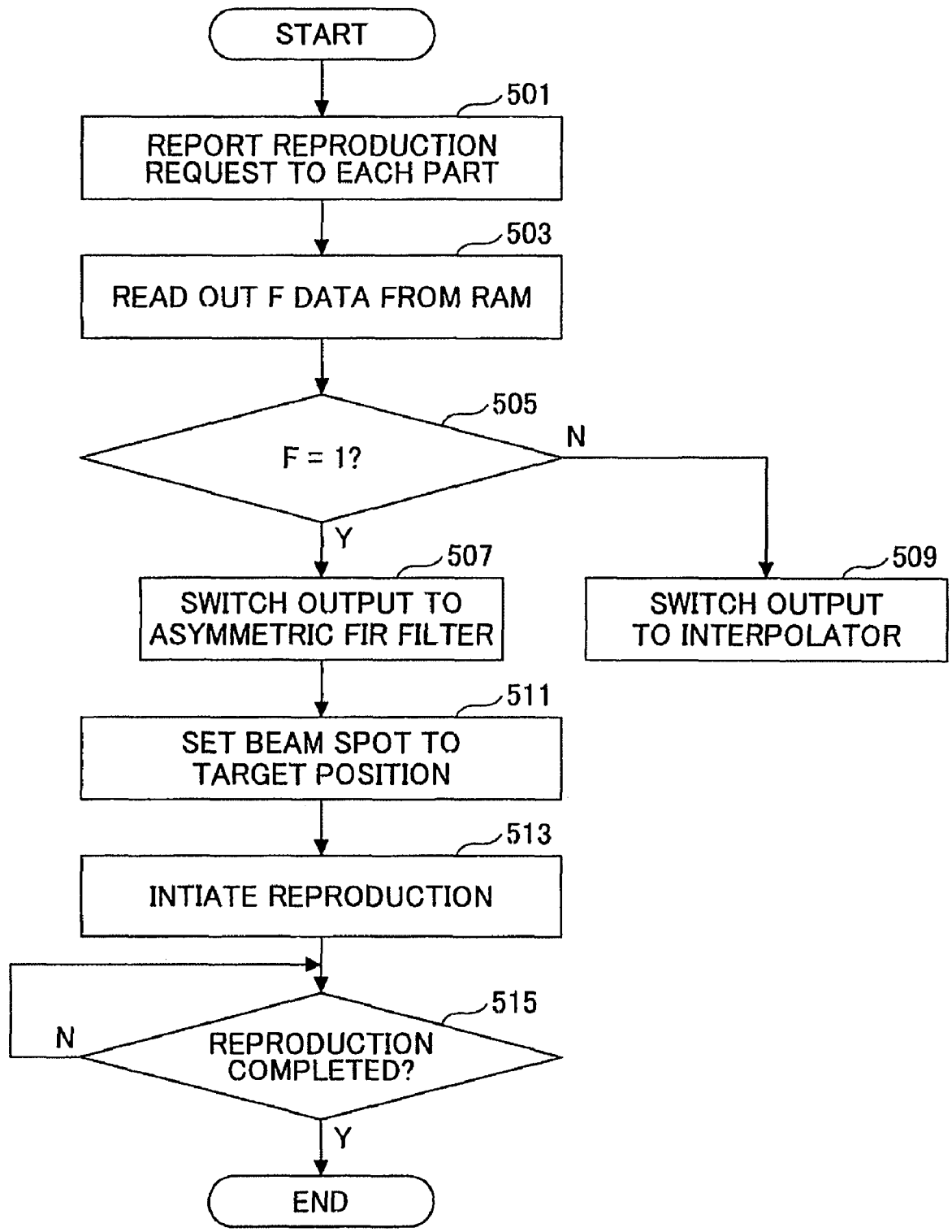
FIG. 21 is a flowchart for describing a reproduction operation according to an embodiment of the present invention.
Figure 25:
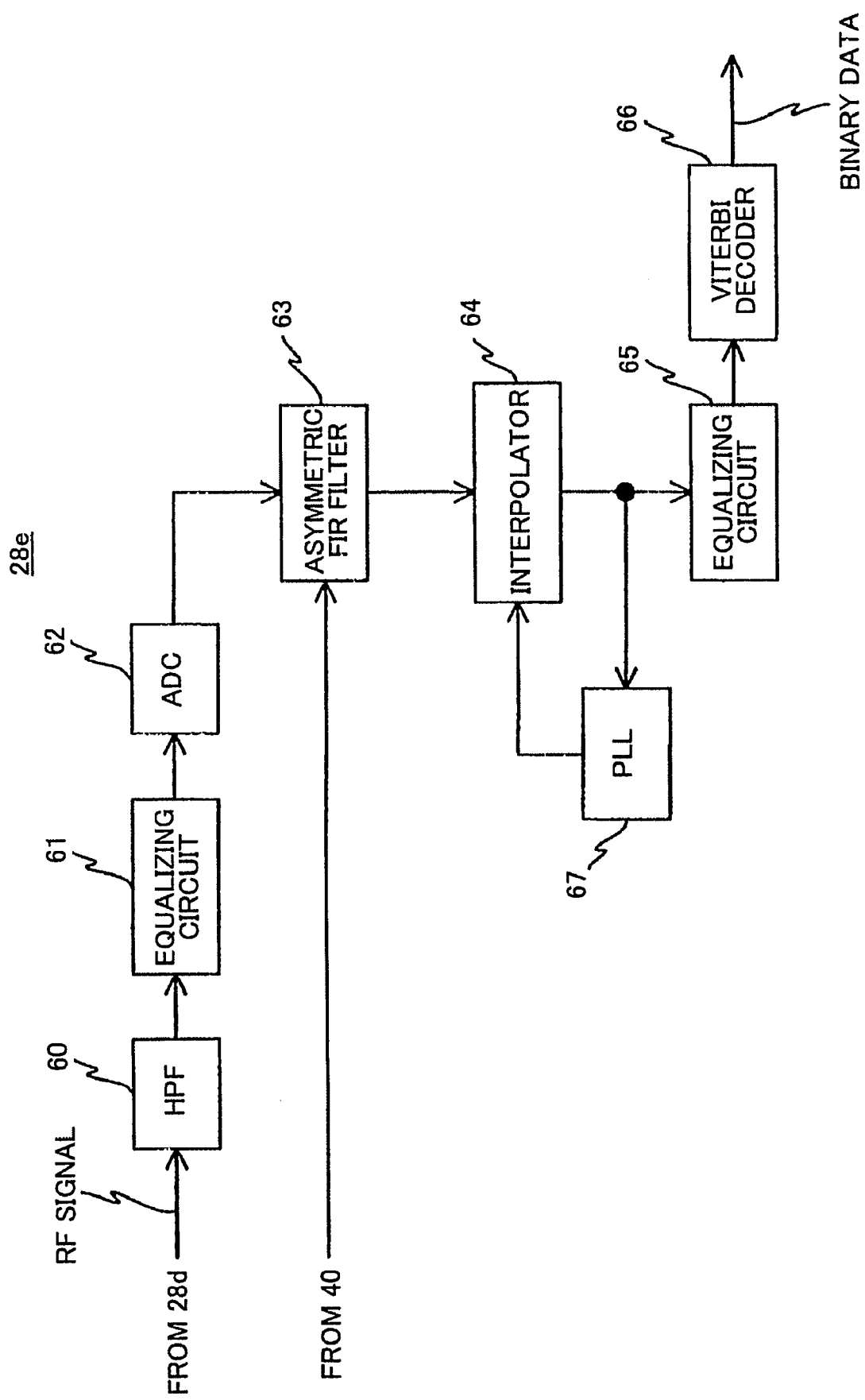
FIG. 25 is a schematic diagram for describing a decoder (binary data obtaining circuit) according to another embodiment of the present invention.

Next, an operation of the optical disk apparatus 20 where an upper level apparatus 90 requests data reproduction of the optical disk 15 (reproduction operation) according to an embodiment of the present invention is described with reference to FIG. 21. The flowchart shown in FIG. 21 corresponds to an algorithm having a series of processes executed by the CPU 40.

First, the CPU 40 reports that a command request data reproduction (reproduction command) has been received from the upper level apparatus 90 to the respective parts (e.g., reproduction signal processing circuit 28, the laser control circuit 24) in the optical disk apparatus 20 (Step S501). Accordingly, the coefficient setting circuit 100 sets the equalizing coefficient in the manner described above based on the equalizing coefficient data stored in the flash memory 39 and the coefficient setting conditions stored in the RAM 41.

Then, the flag value data stored in the RAM 41 is read out (Step S503). Then, it is determined whether the value of the flag data is "1" (Step S505). In this example, since the value of the flag data is "1", it is determined affirmative (Yes in Step S505).

Then, the CPU 40 instructs the switch circuit 68 to switch the signal output of the ADC 62 so that the output signal from the ADC 62 is input to the asymmetric FIR filter 63 (Step S507).

Then, the CPU 40 instructs the drive control circuit 26 so that the beam spot can be positioned in the vicinity of a target position corresponding to a designated address included in the reproduction command (Step S511). Accordingly, the drive control circuit 26 generates drive signals for conducting a seek operation. After the seek operation is completed, the operation proceeds to Step S513. In a case where the seek operation is unnecessary, the processes in Step S511 may be omitted.

Then, a reproduction process is initiated (Step S513).

Then, it is determined whether the reproduction process is completed (Step S515). In a case where the reproduction process is not completed, it is determined negative (No in Step S515) and the determination of Step S515 is conducted again after a predetermined time has elapsed. In a case where the reproduction process is completed, it is determined affirmative, thereby completing the reproduction operation.

In a case where the value of the flag data is "0", it is determined negative (No in Step S505). Then, the CPU 40 instructs the switch circuit 68 to switch the signal output of the ADC 62 so that the output signal from the ADC 62 is input to the interpolator (Step S509). Then, the reproduction operation proceeds to Step S511.

Accordingly, the optical disk apparatus 20 can adaptively perform the reproduction operation for both the super-resolution optical disk and a conventional optical disk (in this example, a DVD).

FIG. 22 shows an example of an eye pattern of a signal input to the interpolator 64 via the asymmetric FIR filter 63 in a case where the above-described reproduction operation is performed. In this example, the eye is open, to thereby enable a recording clock to be accurately extracted in the PLL 67. Particularly, the eye is sufficiently open even for a shortest pit length. Thus, the extraction of the recording clock can be easily performed. FIG. 23 shows a comparative example of an eye pattern of a signal input to the interpolator 64 without the intervention of the asymmetric FIR filter 63. In this comparative example, the eye is not open, thereby making it difficult to extract a recording clock. Particularly, since the eye is not open, the recording clock cannot be extracted for a shortest pit length. In other words, phase distortion of the RF signal is corrected by the asymmetric FIR filter 63.

FIG. 24 is a table showing a bit error rate where the reproduction operation is performed on an optical disk 15 having data recorded in a pit length of 193 nm. Here, the conditions of the reproduction operation are a reproduction power Pr of 2.5 mW and a linear speed (during recording) of 2.5 m/s. The equalizing coefficients of the asymmetric FIR filter 63 used in this example are respective tap coefficients shown in FIG. 12. The reproduction operation performed without the intervention of the asymmetric FIR filter 63 exhibits a bit error rate of approximately 0.5. Therefore, data cannot be decoded without the intervention of the asymmetric FIR filter 63. On the other hand, the reproduction operation performed with the intervention of the asymmetric FIR filter 63 exhibits a significantly reduced bit error rate of approximately 0.0020. Thereby, data can be satisfactorily decoded.

In the above-described optical disk apparatus 20 according to an embodiment of the present invention, an RPF signal has low frequency noise eliminated at the HPF 60. Then, the equalizing circuit 61 reduces intersymbol interference of the RF signal. Then, the ADC 62 converts the RF signal to a digital signal. Then, the ADC 62 outputs the digital signal to the asymmetric FIR filter 63 in a case where the optical disk 15 loaded (mounted) to the optical disk apparatus 20 is a super-resolution optical disk. By obtaining equalizing coefficients corresponding to the coefficient setting conditions of the optical disk 15 from the flash memory 39 and setting the equalizing coefficients to each of the multipliers h1-h21, the asymmetric FIR filter 63 corrects the phase distortion of the RF signal. The output signal of the asymmetric FIR filter 67 is sent to the PLL 67 via the interpolator 64. Since phase distortion of the RF signal is corrected by the asymmetric FIR filter 63, a recording clock can be accurately extracted from the RF signal. Accordingly, the interpolator 64 accurately conducts sampling in synchronization with the recording clock. The output signal of the interpolator 64 is decoded with a PRML signal processing method by the equalizing circuit 65 and the Viterbi decoder 66. Thereby, data recorded in an optical disk formed with recording marks with a pitch less than a diffraction limit can be accurately reproduced.

Figure 26:
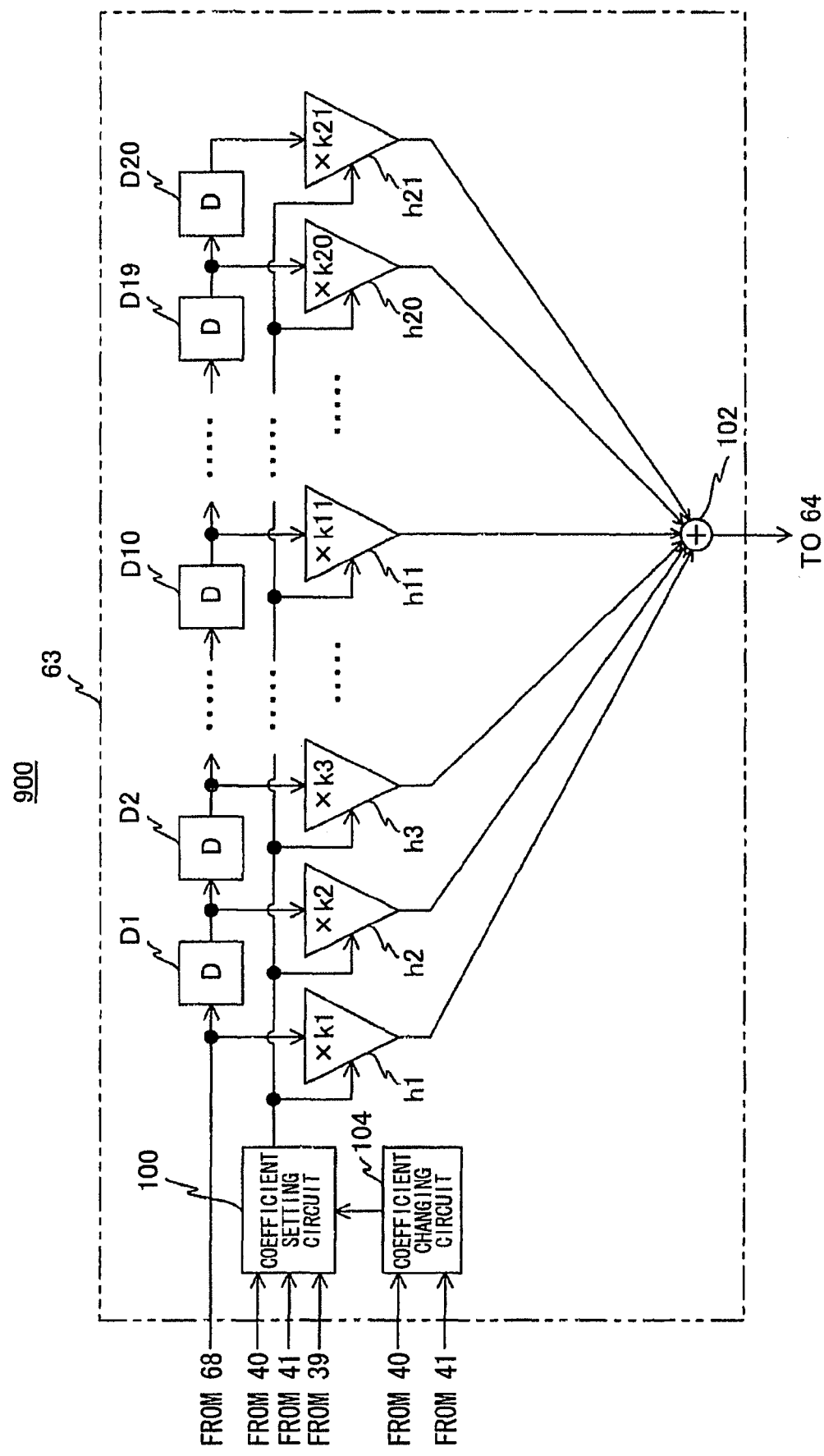
FIG. 26 is a schematic diagram for describing an asymmetric FIR filter shown in FIG. 25.
Figure 27:
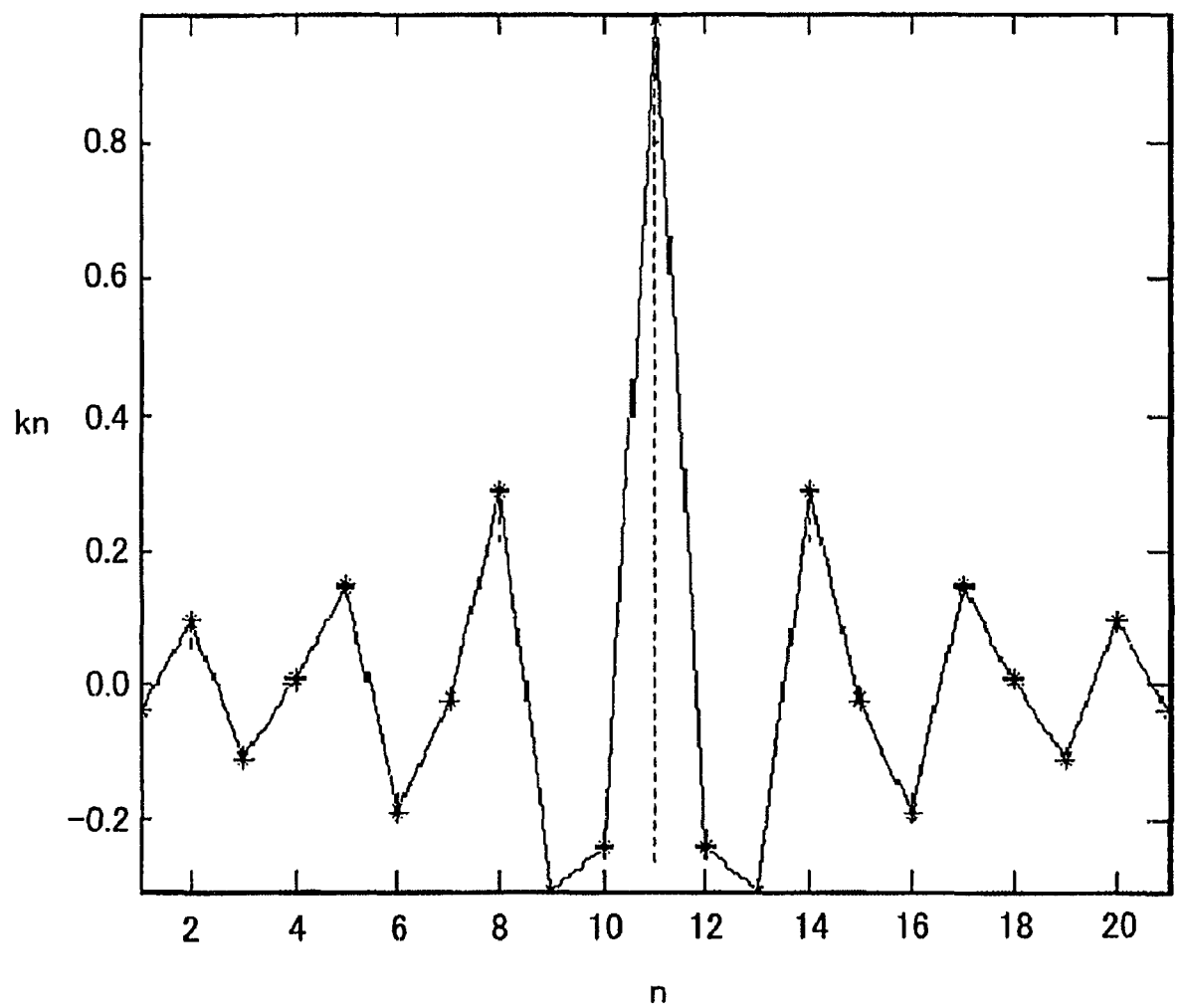
FIG. 27 is a graph for describing equalizing coefficients of the asymmetric FIR filter shown in FIG. 26 in a case where the optical disk is not a super-resolution optical disk.

As shown in FIG. 26, the binary data obtaining circuit 800 according to another embodiment of the present invention may be configured without the switch circuit 68 such that the output digital signal of the ADC 62 is input to the asymmetric FIR filter 63. Accordingly, in the phase correction circuit 900 according to another embodiment of the present invention (See FIG. 26), a coefficient changing circuit 104 may be provided in the asymmetric FIR filter 63 for instructing the coefficient setting circuit 100 to change the equalizing coefficient. In a case where the optical disk 15 is not a super-resolution optical disk, the coefficient changing circuit 104 instructs the coefficient setting circuit 100 that the equalizing coefficient be configured having plural symmetrical tap coefficients where the origin (0) is the center of the tap coefficients (in this example, k11). In this case, the coefficient changing circuit 104 may instruct the coefficient setting circuit 100 to set the equalizing coefficient to a value enabling the asymmetric FIR filter 63 to serve as an FIR filter for reducing or adjusting intersymbol interference (See FIG. 27). Furthermore, in a case where the optical disk 15 is not a super-resolution optical disk, the coefficient changing circuit 104 may instruct the coefficient setting circuit 100 to set the tap coefficient of a given multiplier to "1" and the tap coefficients of the other remaining multipliers to "0" so that the asymmetric FIR filter 63 is cancelled (nullified).

Figure 33:
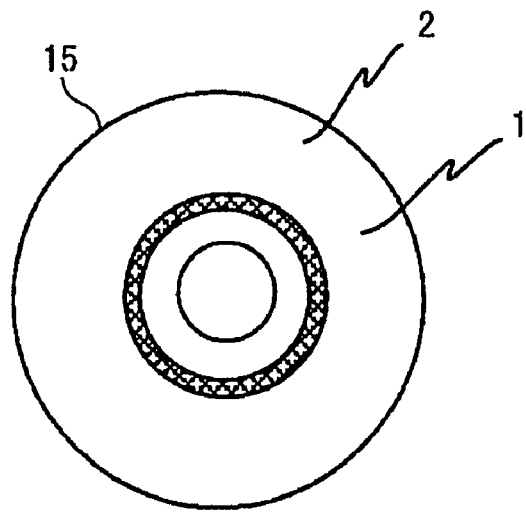
FIG. 33 is a schematic diagram for describing an area in which data regarding equalizing coefficients are stored according to an embodiment of the present invention.
Figure 34:
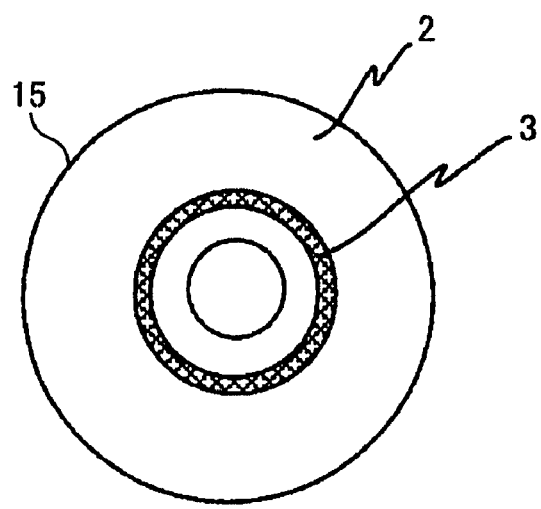
FIG. 34 is a schematic diagram for describing an area in which data regarding equalizing coefficients are stored according to another embodiment of the present invention.

Furthermore, according to yet another embodiment of the present invention, in a case where the optical disk 15 has an area including wobble data of the optical disk 15 (See FIG. 33) or where the optical disk has a TOC (Table of Contents) area including equalizing coefficient data at an inner peripheral part of the optical disk 15 (See FIG. 34), the CPU 40 may read out, for example, the wobble data or the equalizing coefficient data from the optical disk 15 and store the read out data in the RAM 41 in the above-described Step 5403. Accordingly, in a case where a reproduction request command from the upper level apparatus 90 is received, the coefficient setting circuit 100 may set the equalizing coefficient based on the equalizing coefficient data and the coefficient setting conditions stored in the RAM 41.

Figure 28:
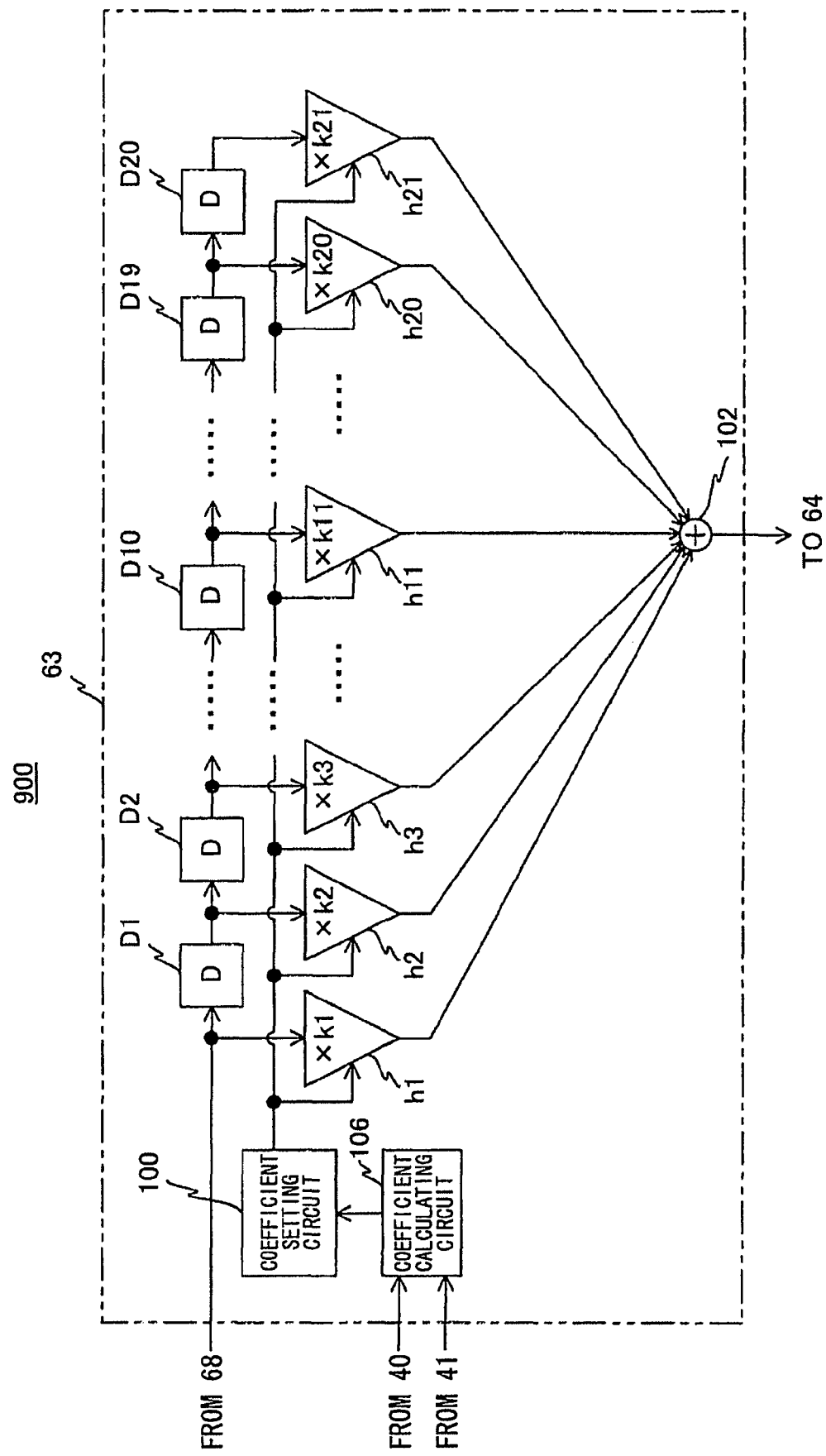
FIG. 28 is a schematic diagram for describing an asymmetric FIR filter having a coefficient calculating circuit according to an embodiment of the present invention.

In this case, as shown in the phase correction circuit 900 (See FIG. 28), a coefficient calculating circuit 106 may be provided in the asymmetric FIR filter 63 for calculating the equalizing coefficient to be set by the coefficient setting circuit 100 in response to the reproduction command based on the equalizing coefficient data recorded in the optical disk 15. For example, in a situation where the equalizing coefficient data recorded in the optical disk 15 are data corresponding to 4×speed reproduction and the reproduction command requests 16×speed reproduction, the coefficient calculating circuit 106 calculates the equalizing coefficient for achieving 16× speed reproduction based on the equalizing coefficient data recorded in the optical disk 15. The equalizing coefficient calculated by the coefficient calculating circuit 106 may be recorded in the RAM 41 or a predetermined area in the optical disk 15 so that the calculated equalizing coefficient can be used again afterwards. Furthermore, the coefficient calculating circuit 106 may use an asymmetric equalizing coefficient as the initial value for accelerating the converging of the calculation.

Although the asymmetric FIR filter 63 according to the above-described embodiment of the present invention is an FIR filter including 21 taps, the asymmetric FIR filter 63 is not limited to such configuration. For example, the asymmetric FIR filter 63 may be an FIR filter including five taps. Furthermore, the number of taps of the asymmetric FIR filter 63 is not limited to an odd number but may also be an even number.

Since the HPF 60 is a linear circuit in a case where the equalizing circuit 61 is a linear circuit according to the above-described embodiment of the present invention, the order of the arrangement of the HPF 60 and the equalizing circuit 61 may be switched.

Figure 29:
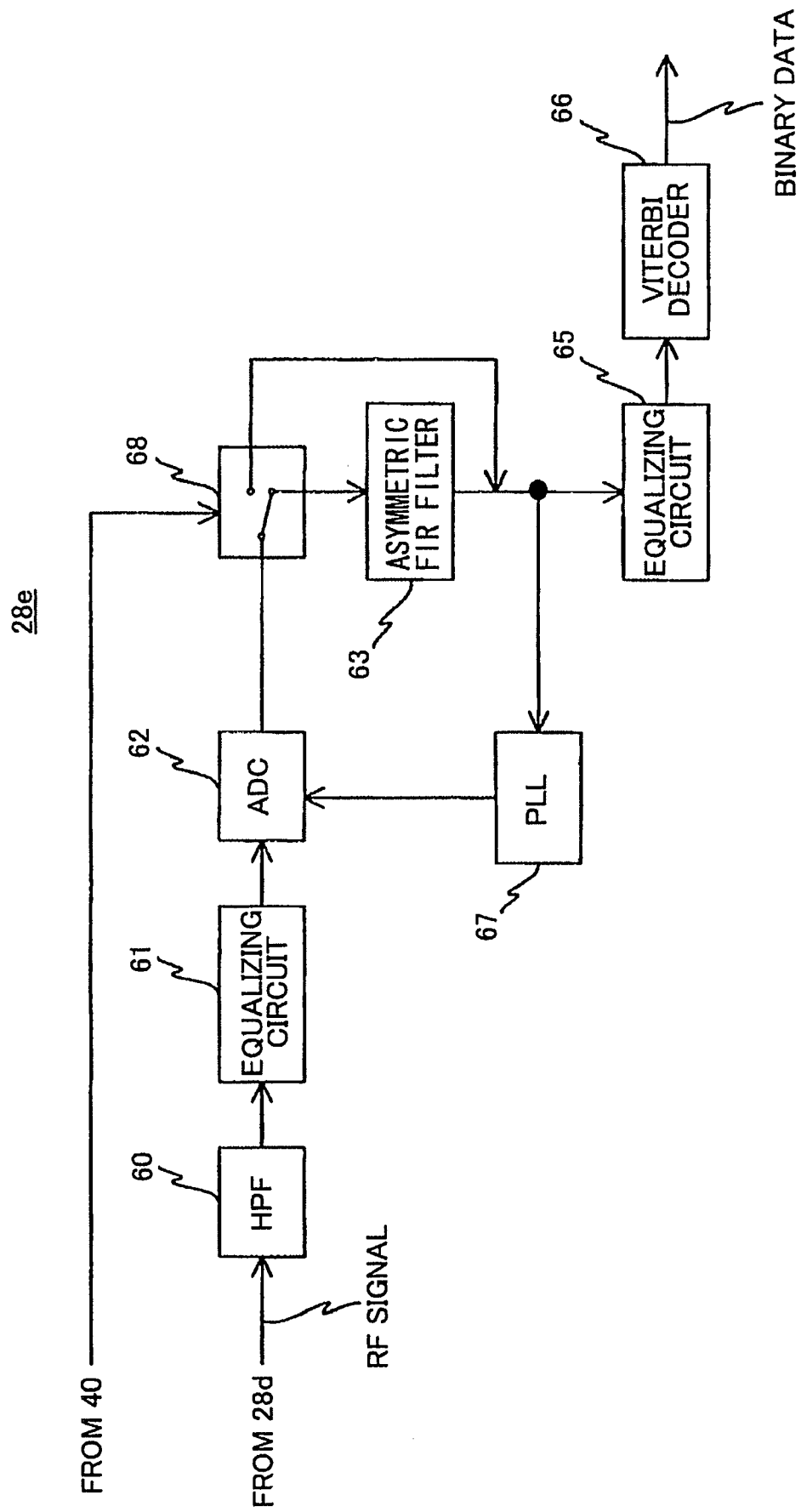
FIG. 29 is a schematic diagram for describing a decoder (binary data obtaining circuit) according to another embodiment of the present invention.

The ADC may perform a sampling operation in synchronization with a recording clock in a case where the binary data obtaining circuit 800 has a configuration shown in FIG. 29. In this case, the recording clock extracted by the PLL 67 is sent to the ADC 62. Therefore, with this configuration, the interpolator 64 is not provided in the binary data obtaining circuit 800.

Figure 30:
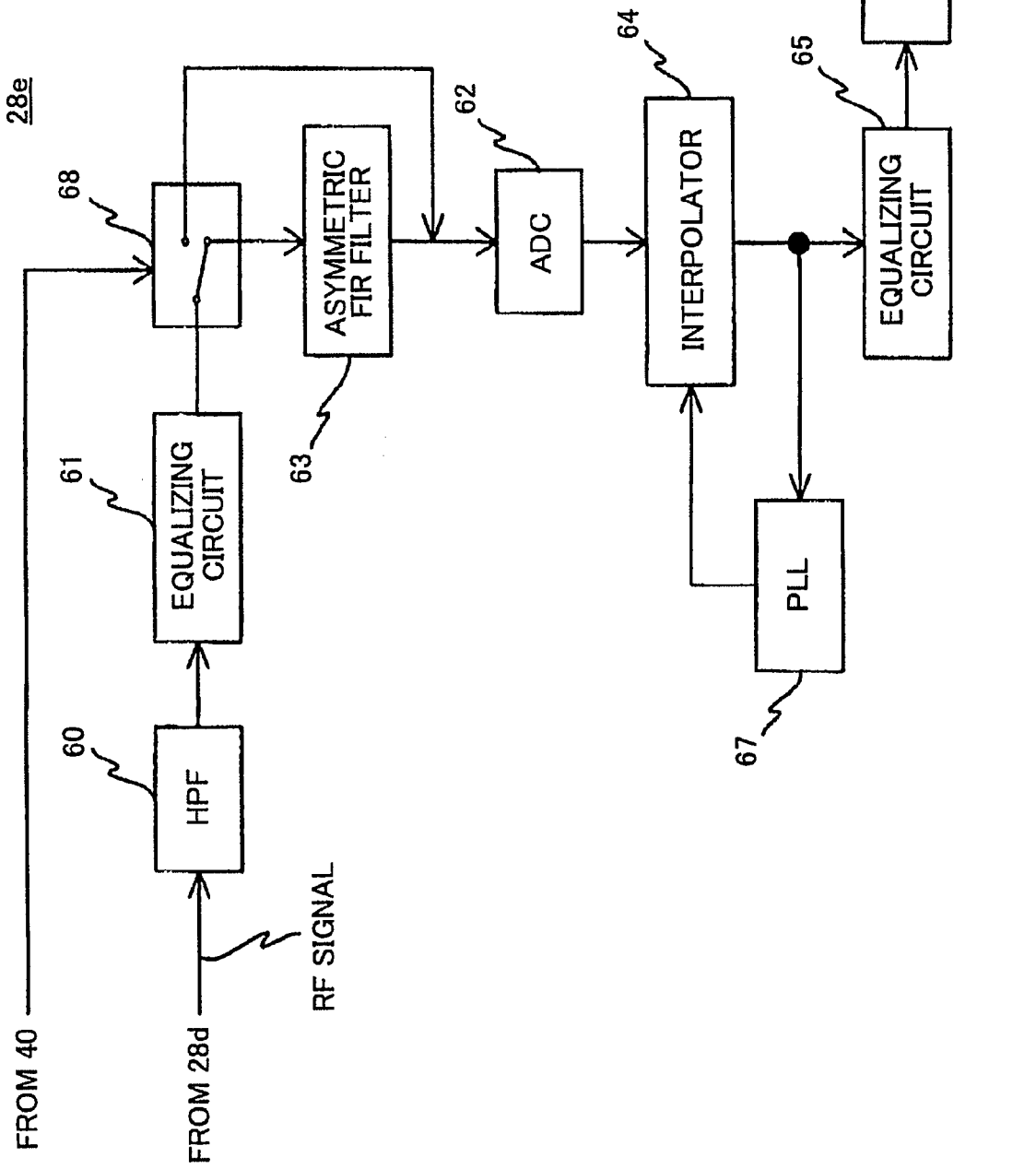
FIG. 30 is a schematic diagram for describing a decoder (binary data obtaining circuit) according to another embodiment of the present invention.

Furthermore, the asymmetric FIR filter 63 according to another embodiment of the present invention may be configured as an analog circuit. In this case, as shown in FIG. 30, the ADC is provided before the interpolator 64 (i.e. after the asymmetric FIR filter 63).

Figure 31:
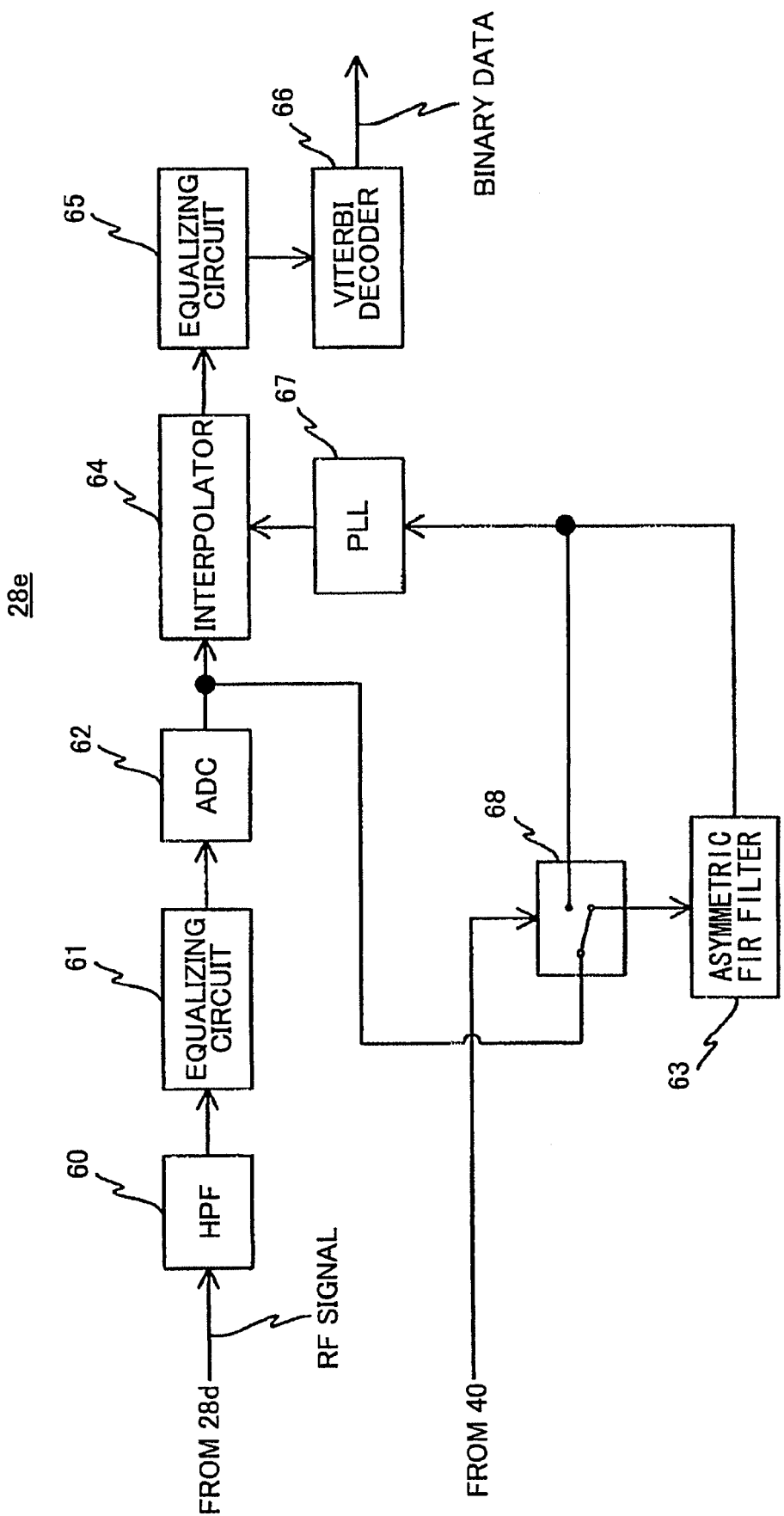
FIG. 31 is a schematic diagram for describing a decoder (binary data obtaining circuit) according to another embodiment of the present invention.

As shown in FIG. 31, the binary data obtaining circuit 800 according to another embodiment of the present invention may have a configuration allowing the output signal of the ADC 62 to be directly input to the interpolator 64 and only the output signal of the asymmetric FIR filter 63 to be input to the PLL 67. With this configuration, a conventional circuit for decoding an RF signal can be used.

Figure 32:
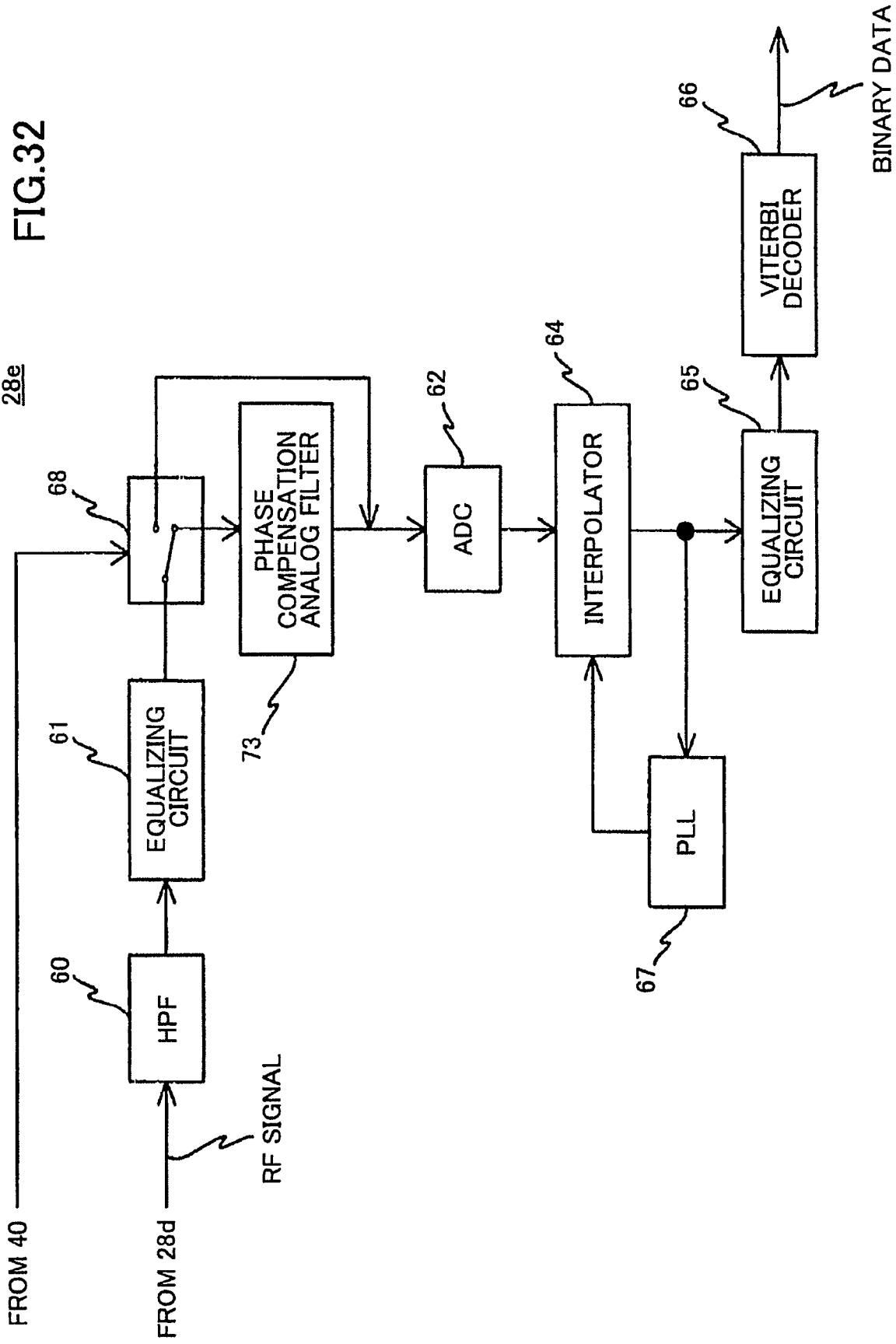
FIG. 32 is a schematic diagram for describing a decoder (binary data obtaining circuit) according to another embodiment of the present invention.

Furthermore, a phase compensation analog filter 73 having an opposite phase characteristic with respect to the phase distortion of the RF signal during super-resolution reproduction (in this example, a reproduction operation with a reproduction power of 2.5 mW) may be used as an alternative of the asymmetric FIR 63 (See FIG. 32), to thereby cancel the phase distortion of the RF signal. In this case, the ADC 62 is provided before the interpolator 64.

Although the optical disk apparatus 20 according to the above-described embodiment of the present invention is described as only having a function of reproducing data from an optical disk, as long as the optical disk apparatus 20 has the function of reproducing data from an optical disk, other optical disk apparatuses 20 having a data recording function, a data erasing function, and/or a data reproducing function may also be used.

Although the optical pickup apparatus 23 according to the above-described embodiment of the present invention is described as having a single light source 231, the optical pickup apparatus 23 may have, for example, plural light sources for irradiating laser beams having different wavelength.

[Section 2]

Figure 35:
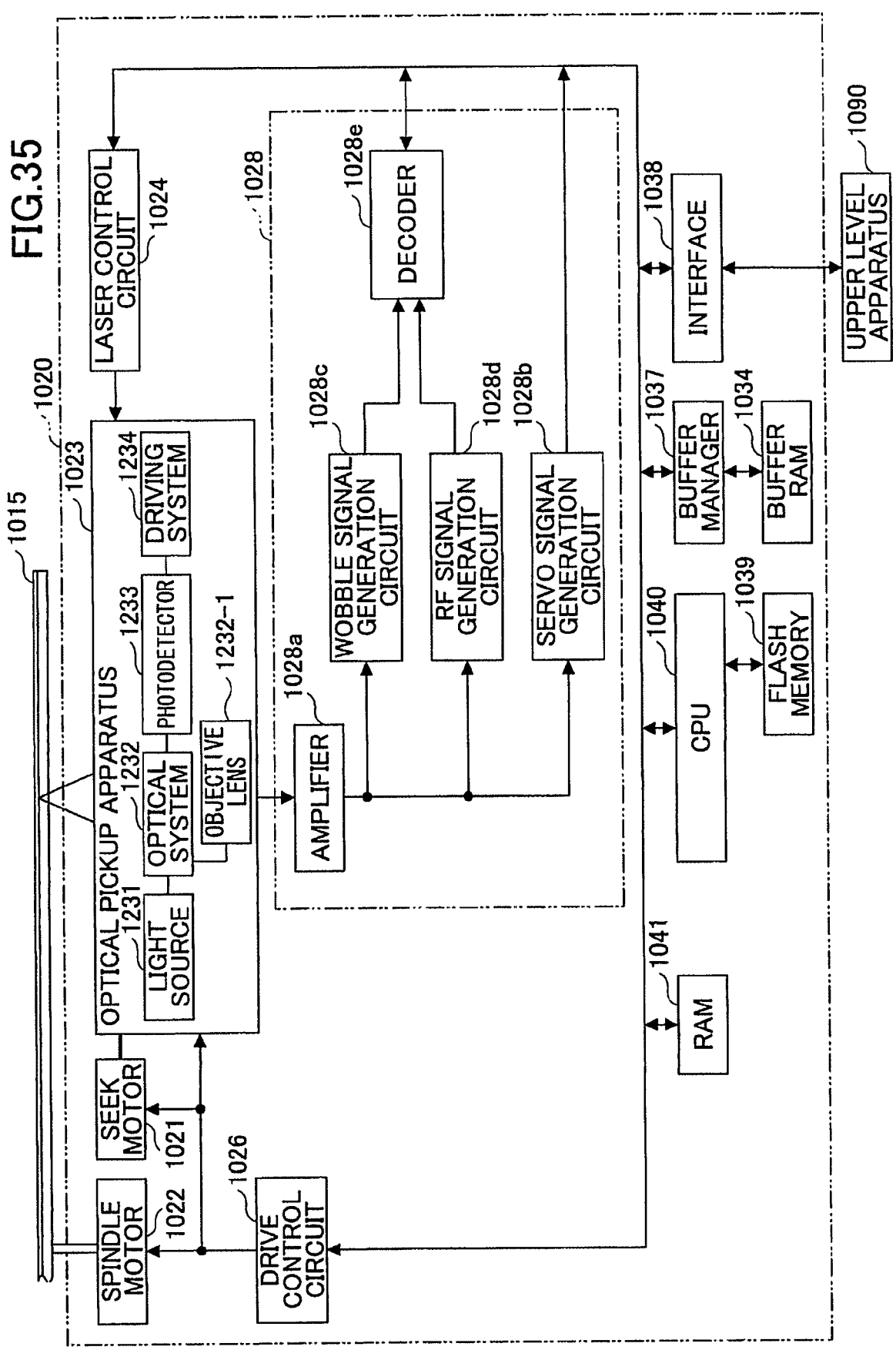
FIG. 35 is a block diagram showing an optical disk apparatus according to another embodiment of the present invention.

FIG. 35 is a schematic diagram showing an optical disk apparatus 1020 according to an embodiment of the present invention. It is to be noted that, through the drawings of the following embodiments of the present invention, like components are denoted by like reference numerals as of the embodiments of the present invention described above in Section 1 and are not further explained.

Figure 2:
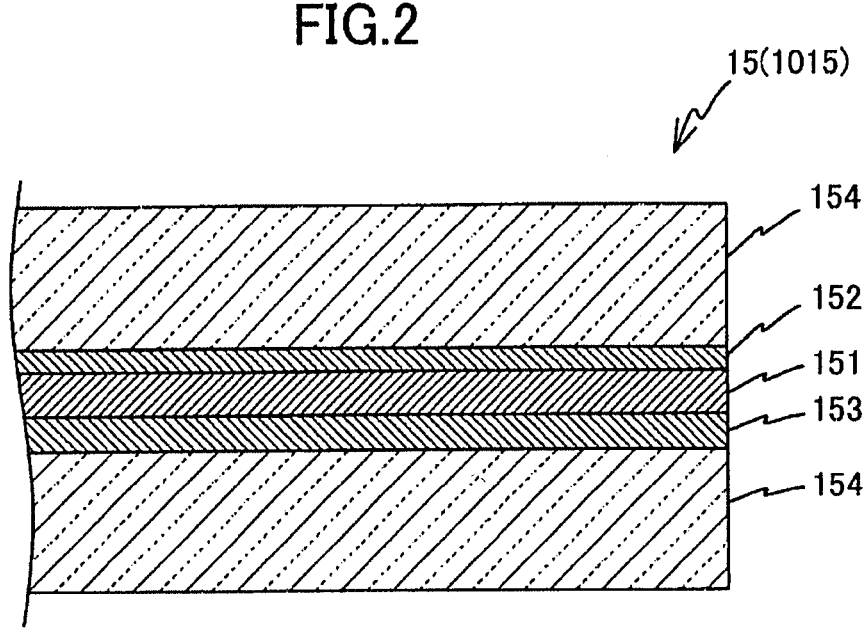
FIG. 2 is a schematic diagram for describing a super resolution optical disk according to an embodiment of the present invention.

In FIG. 35, the optical disk apparatus 1020 includes, for example, a spindle motor 1022 for rotating an optical disk 1015, an optical pickup apparatus 1023, a seek motor 1021 for driving the optical pickup apparatus 1023 in a radial direction, a laser control circuit 1024, a drive control circuit 1026, a reproduction signal processing circuit 1028, a buffer RAM 1034, a buffer manager 1037, an interface 1038, a flash memory 1039, a CPU 1040, and a RAM 1041. It is to be noted that the arrows illustrated in FIG. 35 indicate the flow of representative signals and data and do not indicate the entire connection relationship of each of the blocks. The optical disk 1015 according to an embodiment of the present invention is a super-resolution optical disk for enabling super-resolution reproduction. The optical disk 1015 has substantially the same configuration as that of the optical disk 15 shown in FIG. 2. The configuration of the optical disk 1015 includes a recording layer 151, a reflection layer 152, and a super-resolution layer 153 which are sandwiched by a pair of transparent substrates 154. The recording layer 151 is for having data recorded thereto. The reflection layer 152 is for reflecting a laser beam irradiated to the optical disk 15. The super-resolution layer 153 contains a material whose optical constant changes according to temperature.

The optical pickup apparatus 1023 is for irradiating a laser beam 23a (see FIG. 23a) to the optical disk 1015 and for receiving light reflected from the optical disk 1015. The optical pickup apparatus 1023 includes, for example, a light source 1231 for irradiating a laser beam having a wavelength corresponding to the optical disk 1015, an optical system 1232 including an objective lens 1232-1 for condensing the laser beam 23a from the light source 231 to the optical disk 1015 and guiding the light reflected from the optical disk 1015 to a predetermined area(s) via the objective lens 1232-1, a photodetector 1233 having a photodetecting area(s) (light receiving area(s)) positioned at the predetermined area(s) for receiving the reflected light, and a driving system 1234 for making fine adjustment of the drive of the objective lens 1232-1. Each light receiving area of the photodetector 1233 outputs a signal corresponding to the amount of light received (light reception amount) to a reproduction signal processing circuit 1028. The driving system 1234 includes a focusing actuator (not shown) for driving the objective lens 1232-1 in a focus direction and a tracking actuator (not shown) for driving the objective lens 1232-1 in a tracking direction. As one example, the wavelength of the laser beam emitted from the light source 1231 (hereinafter also referred to as "light source wavelength") is 635 nm, and the numerical aperture (NA) of the objective lens 1232-1 is 0.6. In this example, the diffraction limit is approximately 530 nm (laser beam wavelength/2 NA).

FIG. 3 is a graph showing an example of a relationship between carrier/noise ratio (CNR) and reproduction power (Pr) in a case where the optical pickup apparatus 1023 reproduces data from the optical disk 1015 having recording marks (pits) (recording mark length=200 nm) formed with a pitch of 400 nm. As shown in FIG. 3, CNR is over 30 dB when the reproduction power Pr is 2 mW or more, thus, showing that super-resolution reproduction can be performed. It is to be noted that the reproduction power for enabling super-resolution reproduction is hereinafter also referred to as "super-resolution reproduction power".

Figure 4:
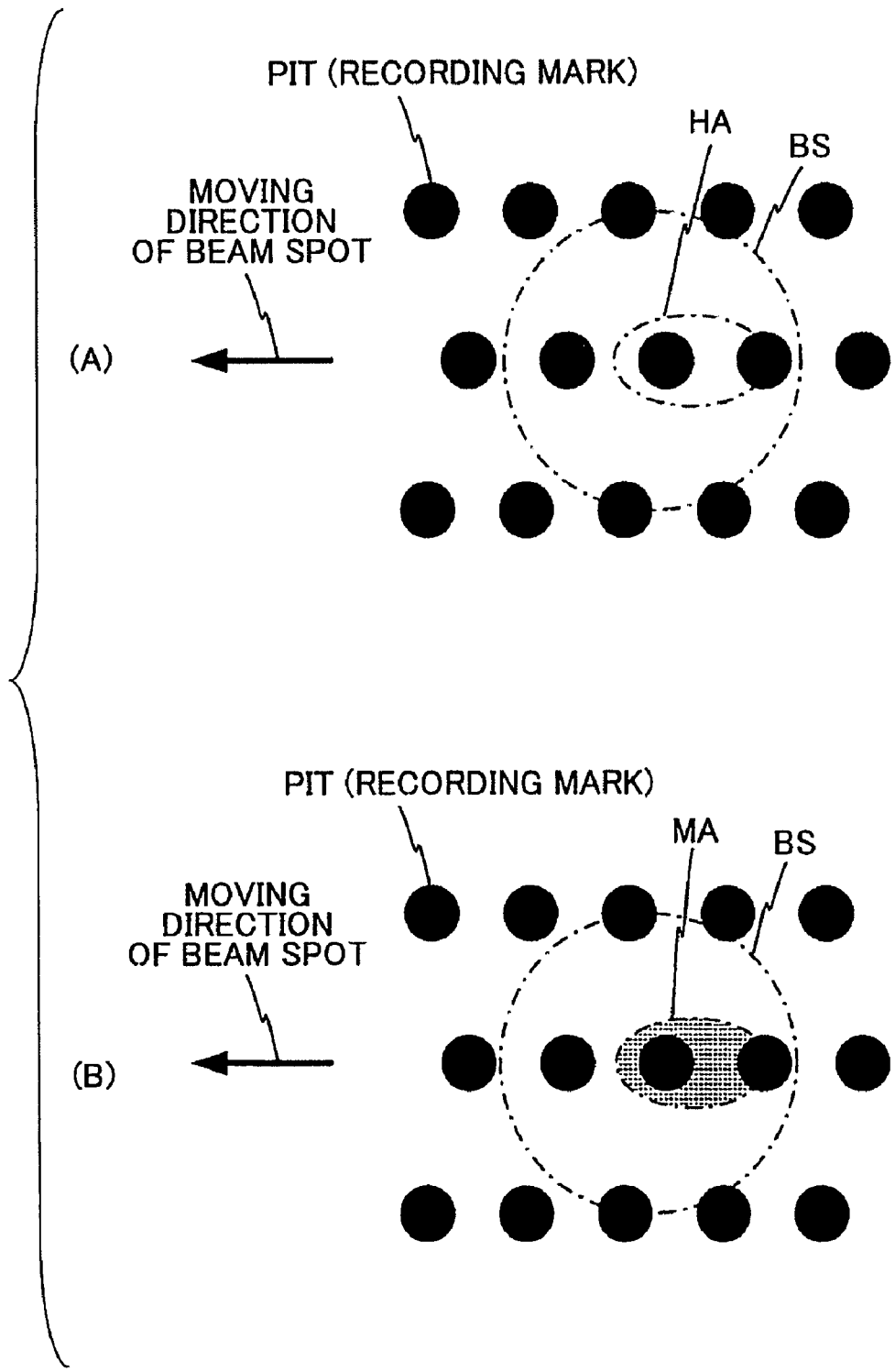
FIG. 4 is a schematic diagram for describing a fine aperture area and a fine mask area of an optical disk according to an embodiment of the present invention.

When a laser beam having super-resolution reproduction power is condensed to the optical disk 1015, the temperature rises at the area where the laser beam is condensed, to thereby form a fine aperture area HA or a fine mask area MA in the beam spot BS of the laser beam formed on the super-resolution layer 153, as shown in (A) and (B) of FIG. 4, respectively. Both the fine aperture area HA and the fine mask area MA have a tail part formed trailing in a direction opposite of the traveling direction of the beam spot BS of the laser beam. It is to be noted that the black dots illustrated in FIG. 4 indicate recording marks (pits) formed in the optical disk 1015. Furthermore, it is to be noted that whether a fine aperture area HA or a fine mask area MA is formed in the super-resolution layer 153 of the optical disk 1015 depends on, for example, the material of the super-resolution layer 153 or the configuration of the layers of the optical disk 1015.

Accordingly, in a case where a fine aperture area HA is formed, the amount of reflected light changes significantly depending on whether a recording mark(s) is situated in the fine aperture area HA. Furthermore, in a case where a fine mask area MA is formed, the amount of reflected light changes significantly depending on whether a recording mark (s) is masked by the fine mask area MA.

For example, as shown in (A) of FIG. 5, in a case where a fine mask area MA is formed, the optical constant of the super-resolution layer 153 changes at the area heated by irradiation of the laser beam 23a having AX as its optical axis. This results in formation of a mask area MA at the rear part of the beam spot of the laser beam 23a and reduction of reflectivity from the reflection layer 152 at the rear part of the beam spot (with respect to the beam spot moving direction). Accordingly, as shown in (B) of FIG. 5, from the aspect of light intensity distribution at the surface of the incident (ingoing) side of the super-resolution layer 153 (PL surface), the light incident to the PL surface forms a beam spot having a symmetrical shape. Meanwhile, the light reflected at the PL surface forms a beam spot having an asymmetrical shape (status). This causes phase distortion of a RF signal since data in the recording layer 151 are read out according to the asymmetrically shaped beam spot.

According to the above-described graph shown in FIG. 6 (graph for describing dependency of light intensity distribution of reflected light with respect to reproduction power), in a case where reproduction power Pr is raised to super-resolution power, the rear part of the beam spot becomes masked and the light intensity distribution of the reflected light is reduced at its rear portion, thus showing the light intensity distribution of the reflected light having a cut off area at its rear portion. In this example, the benchmark (origin) shown in FIG. 6 indicates the center position of the beam spot.

As shown in FIG. 6, in comparison with a beam spot formed on a recording layer of an optical disk in a case where the wavelength of the laser beam is reduced or where the numerical aperture (NA) of the objective lens, the shape of the beam spot formed on the recording layer 151 of the super-resolution optical disk 1015 has a feature of becoming sharper at the tip part of the light intensity distribution while the width of the hem part remain unchanged.

Figure 36A:
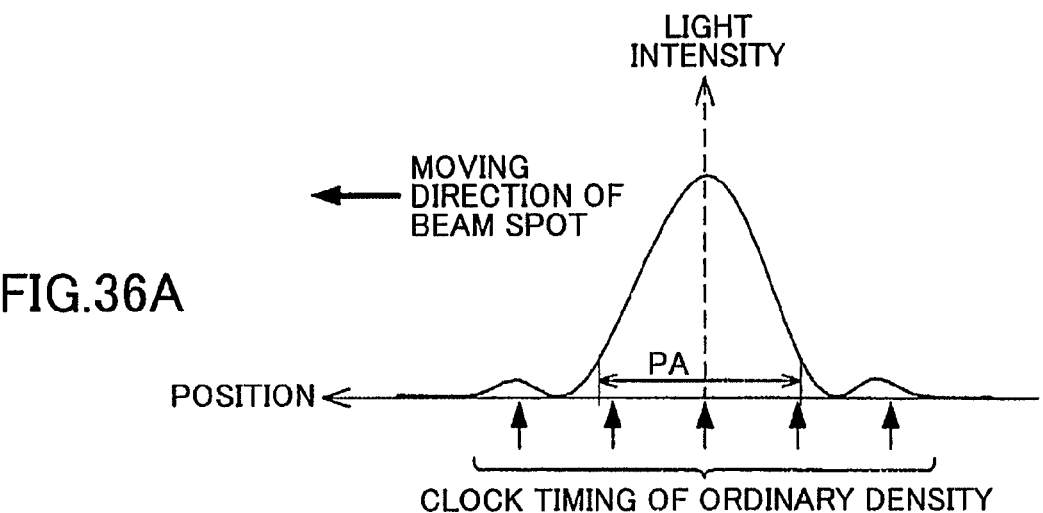
FIGS. 36A-36C are schematic diagrams for describing a relationship between a clock timing and light intensity of light reflected from an optical disk.
Figure 36B:
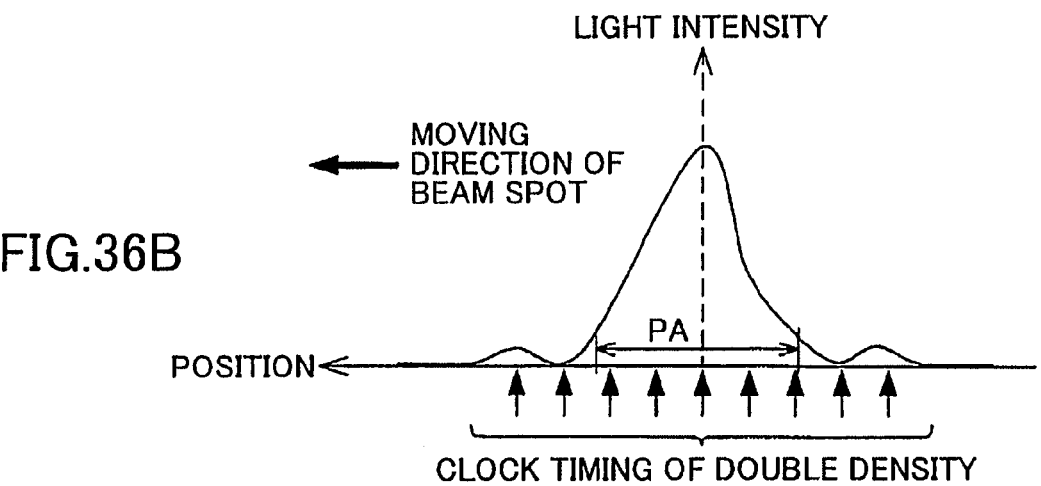
Figure 36C:
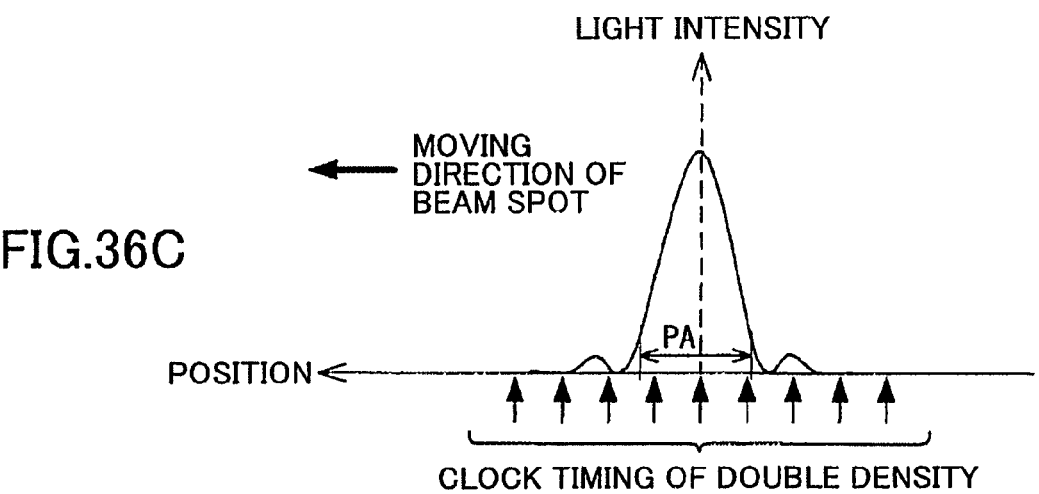

Accordingly, in comparison with a case of reducing the spot diameter of a beam spot by reducing the wavelength of the laser beam or increasing the numeric aperture (NA) of the objective lens, intersymbol interference in a wide range due to the width of the hem part of the beam spot of the laser beam is more likely to occur in a case where recording density is increased for a super-resolution optical disk. FIG. 36A is a graph for showing a relationship between a clock timing for reproducing data recorded to an optical disk (e.g, DVD) with a normal recording density and a light intensity of the light reflected from the optical disk. FIG. 36B is a graph for showing a relationship between a clock timing for reproducing data recorded to an optical disk with a recording density two times greater than a normal recording density and a light intensity of the light reflected from the optical disk. FIG. 36C is a graph for showing a relationship between a clock timing for reproducing data recorded to an optical disk with a recording density two times greater than a normal recording density in a case where a laser beam is condensed to an objective lens having high NA or where data are reproduced with a short wavelength laser beam and a light intensity of the light reflected from the optical disk.

In a case of reproducing data reproduced with a normal recording density, the range of the area having intersymbol interference of the beam spot (hereinafter also referred to as "intersymbol interference area") PA is equivalent to approximately 3 clocks (See FIG. 36A). In a case of reproducing data recorded with a recording density two times greater than a normal recording density, the range of the intersymbol interference area PA is equivalent to approximately 5 clocks (See FIG. 36B). In a case of reproducing data recorded with a recording density two times greater than a normal recording density where a laser beam is condensed to a high NA objective lens or where a laser beam with a short wavelength is used, the range of the intersymbol interference area PA is equivalent to approximately 3 clocks (See FIG. 36C). Accordingly, in a case of reproducing data recorded in a super-resolution optical disk with a recording density of, for example, two times greater than a normal recording density, the intersymbol interference area PA is long compared to the case shown in FIG. 36C. Therefore, the intersymbol interference is to be prevented for a long period (range).

As shown in FIG. 6, since the width of the hem part of the beam spot does not change for recording data to a super-resolution optical disk, the size of the beam spot of the laser beam cannot be easily reduced. Thus, in recording data to the super-resolution optical disk with high density, it is difficult to form high precision recording marks in the recording layer of the optical disk. Furthermore, recording error may occur due to, for example, thermal interference of neighboring or adjacent recording marks. This recording error leads to non-linear intersymbol interference and adversely affects reproduction signals.

Furthermore, with a super-resolution optical disk dedicated for reproduction (reproduction super-resolution optical disk) having a pit pattern including a pit part and a space part, the heat capacity of the pit part and the space part is different due to structural differences and the thermal distribution of the super-resolution layer 153 changes according to the pit pattern on which the beam spot is formed. Accordingly, the shape of the beam spot changes in correspondence with the pit pattern of the optical disk. This leads to non-linear intersymbol interference and adversely affects reproduction signals.

Hence, in order to reproduce data recorded in a super-resolution optical disk with a high recording density, it is desired to prevent non-linear intersymbol interference for a long period.

Returning to FIG. 35, the reproduction signal processing circuit 1028 includes, for example, an amplifier 1028a, a servo signal generation circuit 1028b, a wobble signal generation circuit 1028c, an RF signal generation circuit 1028d, and a decoder 1028e.

The amplifier 1028a is for converting plural photoelectric conversion signals from the photodetector 1233 of the optical pickup apparatus 1023 to voltage signals and amplifying the signals with a predetermined gain.

The servo signal generation circuit 1028b is for generating servo signals (focus error signal, tracking error signals) based on the signals output from the amplifier 1028a. The generated servo signals are output to the drive control circuit 1026.

The wobble signal generation circuit 1028c is for generating wobble signals based on the signals output from the amplifier 1028a.

The RF signal generation circuit 1028d is for generating RF signals based on the signals output from the amplifier 1028a.

The decoder 1028e is for extracting, for example, address data and synchronization signals from the wobble signals. The extracted address data are output to the CPU 1040 and the extracted synchronization signals are output to the drive control circuit 1026.

The decoder 1028e performs, for example, a decoding process and an error detection process on the RF signals. In a case where the decoder detects an error in the RF signals, the decoder 1028e performs an error correction process on the RF signals. Then, the processed RF signals are output from the decoder 1028 as reproduction data and stored in the buffer RAM 1034 via the buffer manager 1037.

Figure 37:
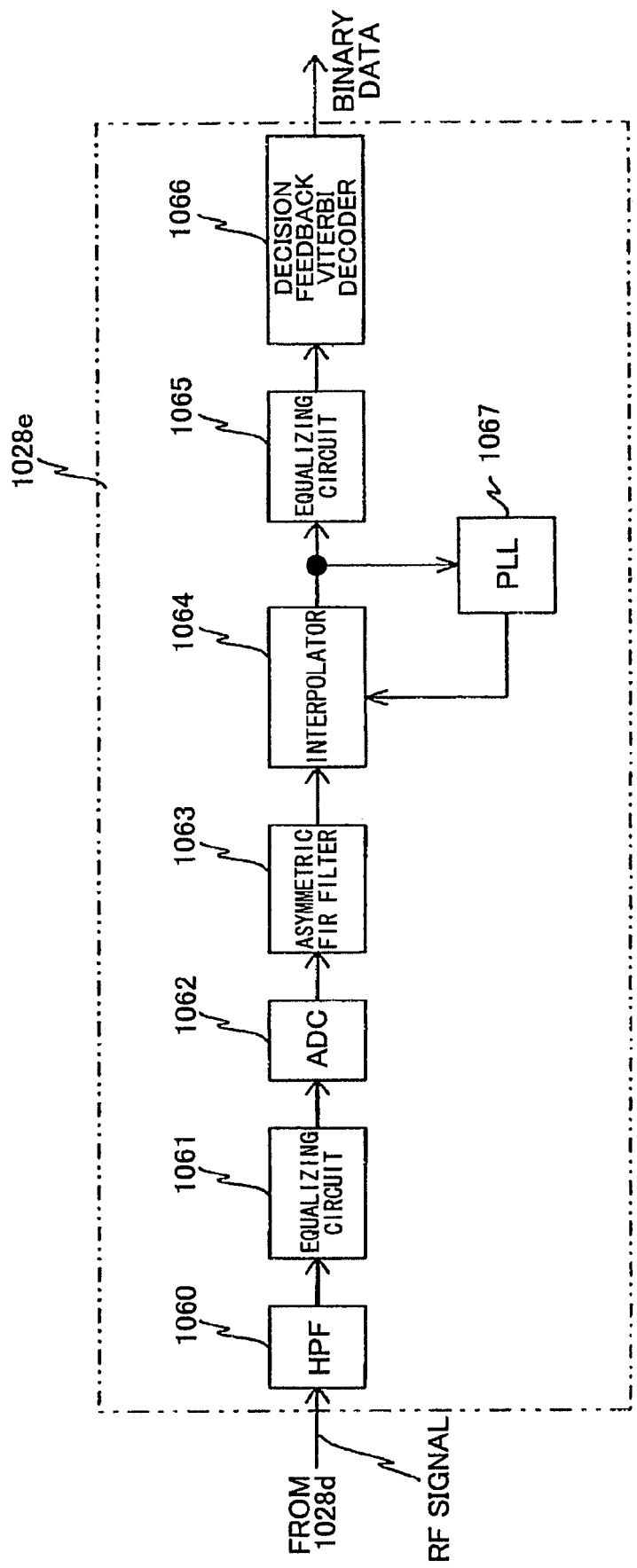
FIG. 37 is a block diagram showing a decoder according to another embodiment of the present invention.

FIG. 37 is a block diagram showing the decoder 1028e according to an embodiment of the present invention. As shown in FIG. 37, the decoder 1028e includes, for example, a high pass filter (HPF) 1060, an equalizing circuit 1061, an AD converter (ADC) 1062, an asymmetric FIR filter 1063, an interpolator 1064, another equalizing circuit 1065, a decision feedback type Viterbi decoder 1066, and a PLL 1067.

The HPF 1060 is for removing low frequency noise in the RF signal. The equalizing circuit 1061 that is provided after the HPF 1060 is for enhancing high pass components of the RF signal attenuated by the decrease of MTF (Modulation Transfer Function) of the optical system 1232 and reducing intersymbol interference. It is to be noted that the equalizing circuit 1061 also serves as a low pass filter (LPF) for cutting off high frequency components for preventing aliasing noise during AD conversion at the ADC 1062.

The ADC 1062 that is provided after the equalizing circuit 1061 is for converting the signal output from the equalizing circuit 1061 to a digital signal (AD conversion).

The asymmetric FIR filter 1063 is an FIR filter for performing a filtering process on the digital signal output from the ADC 1062 for correcting the phase distortion of the RF signal due to the asymmetric property of the beam spot formed on the super-resolution optical disk 1015. The asymmetric FIR filter 1063 is an FIR filter having asymmetric equalizer coefficients in which the origin is the center of its tap coefficients.

The interpolator 1064 is for performing an interpolation process on the signals output from the ADC 1062 or the signals output from the asymmetric FIR filter 1063, that is, interpolating a sample value of a clock timing according to sample values of two or more prior and subsequent timings (before and after).

The PLL 1067 is for reproducing clocks (hereinafter also referred to as "reproduction clocks") of signals recorded in the optical disk 1015 from the signals output from the interpolator 1064 and instructing the clock timing to the interpolator 1064. That is, the sampling operation synchronizing with the reproduction clocks is conducted by the combination of the interpolator 1064 and the PLL 1067. It is to be noted that the part for comparing the phase between the reproduction clock and the signal clock (hereinafter also referred to as "phase comparison part") of the PLL 1067 may compare the phase of the binarized signal by using a slicer. Furthermore, a method of detecting phase difference according to the difference between the level value of the reproduction signal and the level value of a target symbol having no phase error between the reproduction clock and the signal clock may also be used.

The equalizing circuit 1065 that is provided after the interpolator 1064 is for performing waveform equalization on the signals output from the interpolator 1064 so that the signals becomes a response signal corresponding to a desired PR (Partial Response) characteristic. The desired PR characteristic may be, for example, (1, 2, 2, 2, 1).

The decision feedback type Viterbi decoder 1066 that is provided after the equalizing circuit 1065 is for performing a decoding process using a maximum likelihood decoding method (referred to as a Viterbi decoding method) on the signal output from the equalizing circuit 1065, to thereby output binary data. That is, in this example, the equalizing circuit 1065 and the decision feedback type Viterbi decoder 1066 perform signal processing using PRML (Partial Response Maximum Likelihood) which is a combination of a partial response (PR) method and a maximum likelihood (ML) method.

Returning to FIG. 35, the drive control circuit 1026 generates drive signals for driving the driving system 1234 of the optical pickup apparatus 1024 according to the servo signals from the reproduction signal processing circuit 1028 for correcting the deviation of the position of the objective lens 1232-1. Thereby, tracking control and focus control is according to the drive signals. The drive control circuit 1026 also generates drive signals for driving the seek motor 1021 and drive signals for driving the spindle motor 1022 according to the instructions from the CPU 1040. The drive control circuit 1026 outputs corresponding drive signals to the seek motor 1021 and the spindle motor 1022.

The buffer RAM 1034 is for temporarily storing, for example, data reproduced from the optical disk 1015 (reproduction data). The input and output of data to and from the buffer RAM 1034 are managed by the buffer manager 1037.

The laser control circuit 1024 is for controlling the irradiation power of the light source 1231 in the optical pickup apparatus 1023.

The interface 1038 is an interface for performing two-way communications with respect to an upper level apparatus 1090 (e.g., personal computer). The interface 1038 includes standard interfaces such as ATAPI (AT Attachment Packet Interface), SCSI (Small Computer System Interface), and USB (Universal Serial Bus).

The flash memory 1039 is for storing, for example, various programs written in codes readable by the CPU 1040, data regarding the light emission characteristics of the light source 1231 of the optical pickup apparatus 1023 (light source characteristic data), and data regarding equalizing coefficient (equalizing coefficient data).

The CPU 1040 is for controlling operations (processes) of each of the above-described apparatuses, circuits, and parts in accordance with the program(s) stored in the flash memory 1039 and for storing various data (e.g., data used for performing the controls) in the RAM 1041 and the buffer RAM 1034.

<Detail Description of Decision Feedback Type Viterbi Decoder>

Next, the decision feedback type Viterbi decoder 1066 is described in detail. In this example, the decision feedback type Viterbi decoder 1066 is described where the PR class of the decision feedback type Viterbi decoder 1066 is PR (1, 2, 2, 2, 1) and the minimum reverse interval is 2T. However, the PR class of the decision feedback type Viterbi decoder 1066 is not limited to PR (1, 2, 2, 2, 1). For example, the PR class of the decision feedback type Viterbi decoder 1066 may be PR (1, 2, 2, 1) or PR (1, 1). Although the below-described provisional decision of the decision feedback type Viterbi decoder 1066 is performed by using a 3-bit bit array, the bit array is not limited to 3 bits. For example, a bit array of more than 3 bits may be used.

Figure 38:
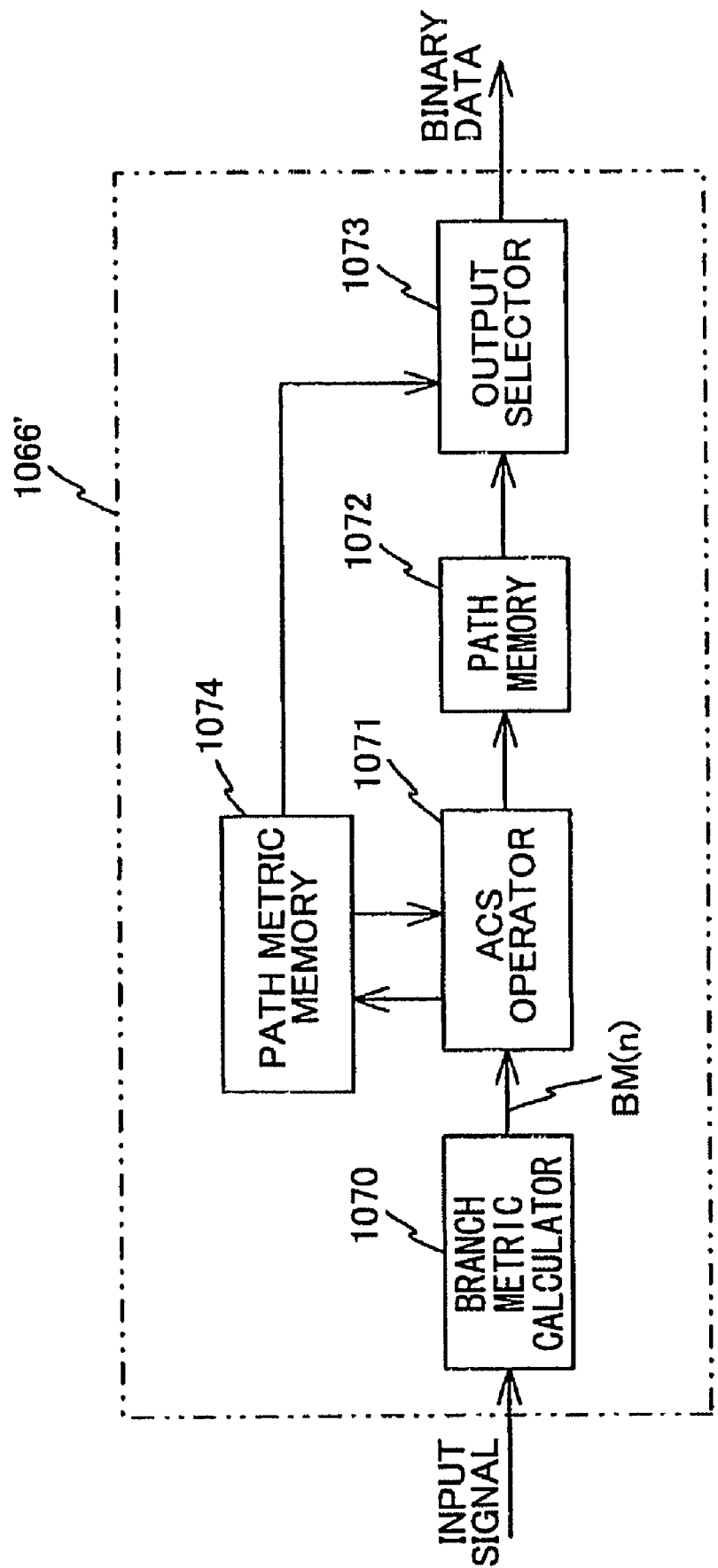
FIG. 38 is a block diagram showing a Viterbi decoder.
Figure 39:
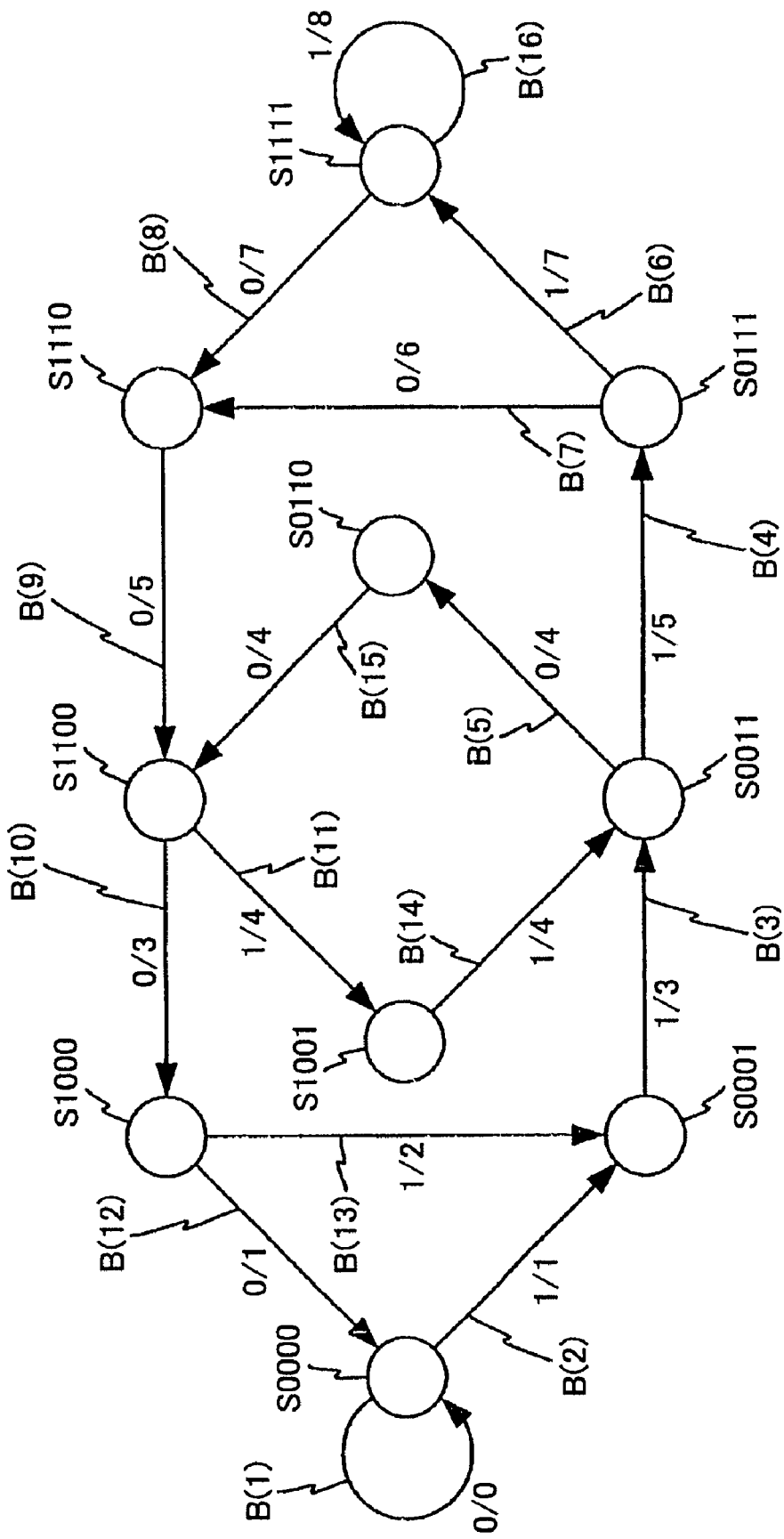
FIG. 39 is state transition diagram corresponding to a PR class PR(1, 2, 2, 2, 1) used in an optical disk apparatus according to another embodiment of the present invention.

Before describing the decision feedback type Viterbi decoder 1066 according to an embodiment of the present invention, an ordinary Viterbi decoder is described. FIG. 38 is a block diagram showing an exemplary configuration of an ordinary Viterbi decoder 1066'. As shown in FIG. 38, the Viterbi decoder 1066' includes a branch metric calculator 1070, an ACS (Add-Compare-Select) operator 1071, a path memory 1072, an output selector 1073, and a path metric memory 1074. Furthermore, since the PR class for the Viterbi decoder 1066' is (PR 1, 2, 2, 1), the state transition diagram of the Viterbi decoder 1066' is illustrated as FIG. 39 showing 10 states (statuses) S0000-S1111 expressed with 4-bit bit strings and 16 branches B (n) (n=1, 2, . . . , 16) corresponding to each state S0000-S1111. The state transition among the states S0000-1111 can be expressed with a Trellis diagram shown in FIG. 40.

The branch metric calculator 1070 is for calculating a Euclid distance between a target value of the branch(es) starting from the current time (time t-1 in FIG. 40) of each state to a predetermined time t of each state and an input signal (branch metric $BM_t$). More specifically, the target value for each branch B (n) is defined by a PR class and a bit string corresponding to each branch. Furthermore, the branch metric for each branch B(n) is expressed with the below-described Formula).

[Formula 1]

$$BM_t(n)=(PP(n)\times PR-RF)^2;$$

wherein "n" is an integer of 1 through 16, "PR" is a matrix $[12221]^T$, and "RF" is a value of an RF signal having its waveform equalized as an input signal with a predetermined a PR property. Furthermore, "PP (n) is a 5-bit bit string corresponding to each branch B (n). That is, PP (n) is a 5-bit bit string formed by adding one bit at the beginning of the 4-bit bit string (state prior to transition) of a corresponding branch B (n) shown in FIG. 39. For example, the bit string PP (5) corresponding to branch B (5) of FIG. 39 is [00110] and the bit string PP (6) corresponding to branch B (6) of FIG. 39 is [01111]. The branch metric calculator 1070 calculates 16 branch metrics $BM_t(n)$ based on the above-described Formula (1). It is to be noted that "×" in Formula (1) indicates multiplication of the matrix.

Returning to FIG. 38, the ACS (Add-Compare-Select) operator 1071 is for obtaining an added value PM'(n) by reading out path metrics $PM_{t-1}(0000)$-$PM_{t-1}(1111)$ corresponding to each state S0000-S1111 during time t-1 from the path metric memory 1074 and adding the read out path metric to a corresponding branch metric $BM_t(n)$ calculated (from time t-1 to time t) by the branch metric calculator 1070. For example, path metric $PM_{t-1}(0011)$ is added to branch metric $BM_t(5)$ or branch metric $BM_t(4)$, and path metric $PM_{t-1}(1110)$ is added to branch metric $BM_t(9)$. In other words, a path metric $PM_{t-1}$ of each state of a transition origin is added to a branch metric BM(n) corresponding to a branch B(n) indicative of transition.

Figure 40:
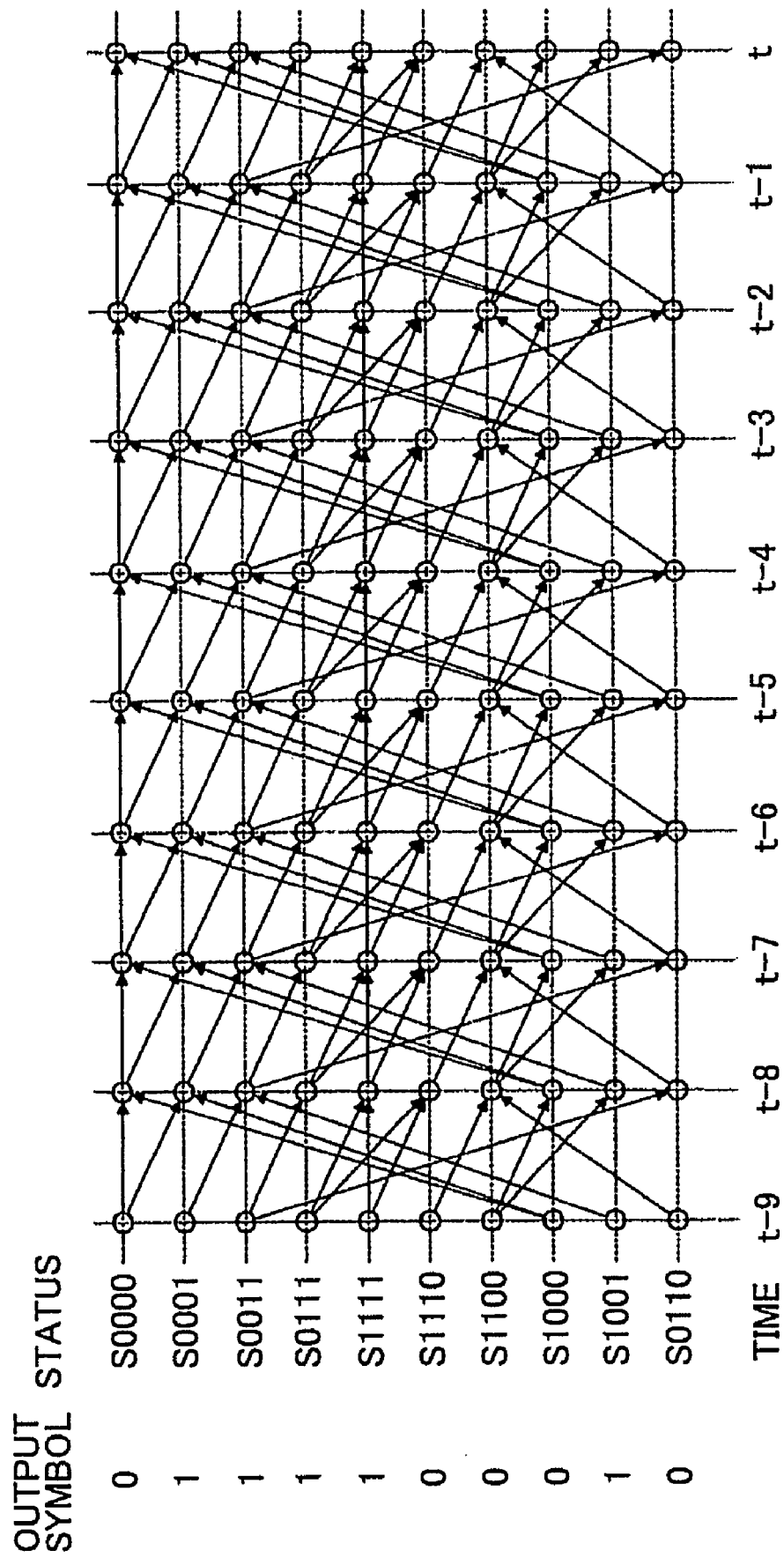
FIG. 40 is a Trellis diagram corresponding to the state transition diagram shown in FIG. 39.

In a case where there are two paths joining to each state S0000-S1111 during time t in the Trellis diagram shown in FIG. 40, the ACS operator 1071 compares the path metrics corresponding to the two paths for determining which is the survivor path of the state during time t. The ACS operator 1071 determines that the path corresponding to the smaller path metric is the survivor path. In a case where there is only a single path joining to each state S0000-S1111 during time t, the path is unconditionally determined as the survivor path of the state of time t. The determination result is stored in the path memory 1072. Accordingly, by having the determination results of the ACS operator 1071 successively recorded in the path memory 1072, the survivor paths of the past are stored (stocked) as history data in the path memory 1072. The ACS operator 1071, in parallel with the determination process, obtains an added value PM' (n) corresponding to the survivor path and updates the values of the path metrics PM (0000)-PM (1111) in the path metric memory 1074 by setting the obtained added value as the new path metric value for time t.

Figure 41:
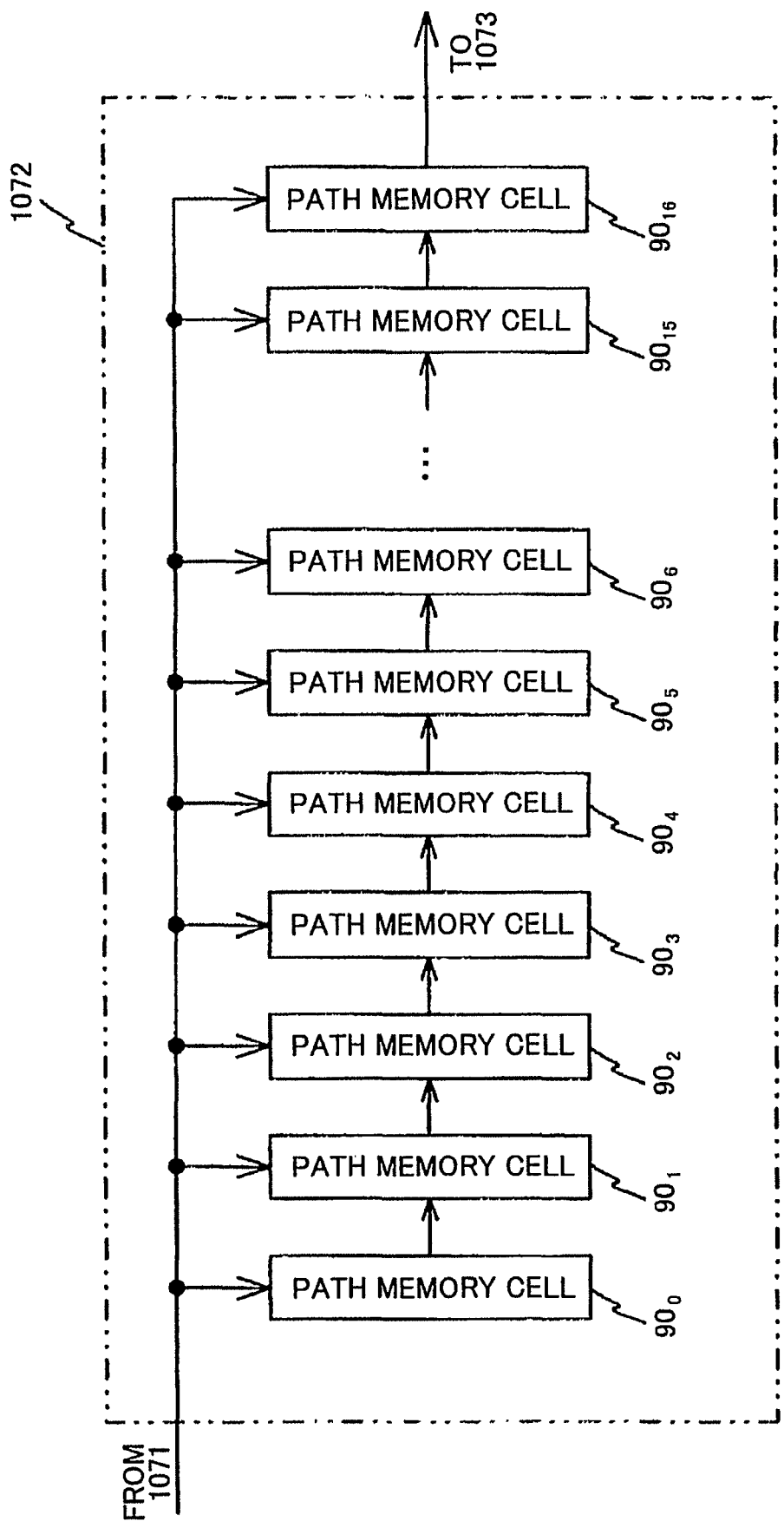
FIG. 41 is a block diagram showing a path memory.

FIG. 41 is a block diagram of a path memory 1072 according to an embodiment of the present invention. The path memory 1072 is provided with a predetermined number of shift registers. The number of the shift registers provided in the path memory 1072 is equal to the number of states determined according to the PR class. In this example, since the PR class is PR (1, 2, 2, 2, 1), path memory cells $90_0$-$90_{16}$ are provided with 10 shift registers. The shift registers of each path memory cell $90_0$-$90_{16}$ store the determination results of the ACS operator 1071 while making one shift to the next path memory cell per time (t). In this process, an estimation result corresponding to one time (t) previous state of a selected survivor path is copied in accordance with an estimation result output from the ACS operator 1071. Accordingly, in a subsequent path memory cell(s), the number of remaining survivor paths becomes lesser as the path selection is performed by the ACS operator 1071. Thus, the estimation result remaining in the shift register of the last path memory cell $90_{16}$ substantially become the same result. That is, path merging is completed.

Returning to FIG. 38, the output selector 1073 is for selecting a survivor path corresponding to a path metric having a minimum value, that is, a survivor path which is regarded to be surest from the path metric memory 1074. Then, the output selector 1073 obtains a value corresponding to the selected path from the output of the last path memory cell $90_{16}$ of the path memory 1072 and outputs the obtained value as binary data (decision data). It is to be noted that, in a case where the number of path memory cells in the path memory 1072 is sufficient and where the quality of the RF signal is satisfactory, the output selector 1073 may be omitted since the result remaining in the shift register of the last path memory cell in most cases is the same as the result to be output.

Figure 42:
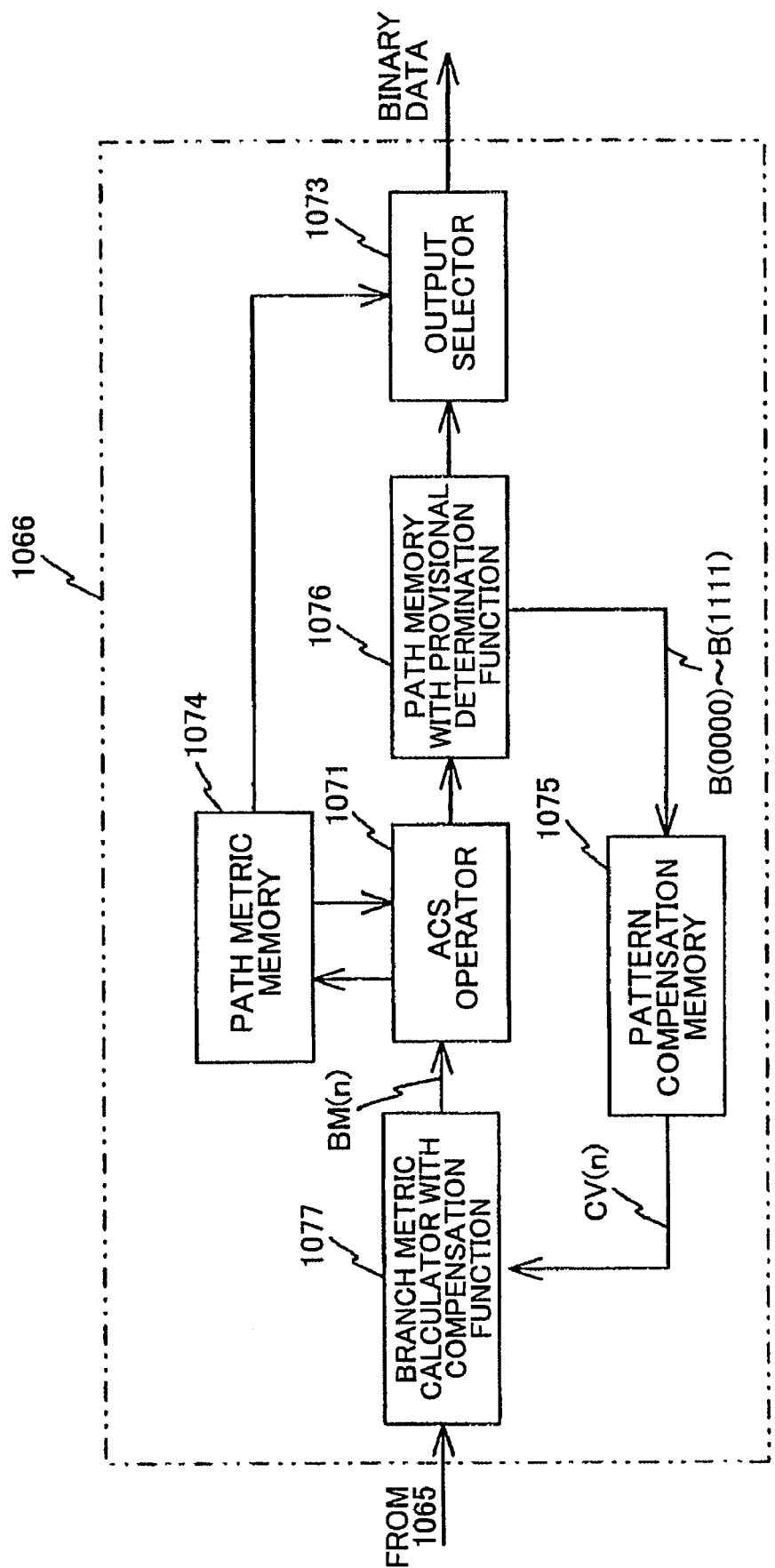
FIG. 42 is a block diagram showing a decision feedback type Viterbi decoder according to an embodiment of the present invention.

Next, the decision feedback type Viterbi decoder 1066 according to an embodiment of the present invention is described. FIG. 42 is a block diagram showing an exemplary configuration of the decision feedback type Viterbi decoder 1066. In comparison with the above-described normal Viterbi decoder 66', the decision feedback type Viterbi decoder 1066 uses a branch metric calculator with compensation function 1077 instead of the branch metric calculator 1070 and a path memory with a provisional decision function 1076 instead of the path memory 1072. Furthermore, the decision feedback type Viterbi decoder 1066 also includes a pattern compensation memory 1075.

Next, the decision feedback type Viterbi decoder 1066 is described by explaining mainly the differences with respect to the above-described ordinary Viterbi decoder 66'.

Figure 43:
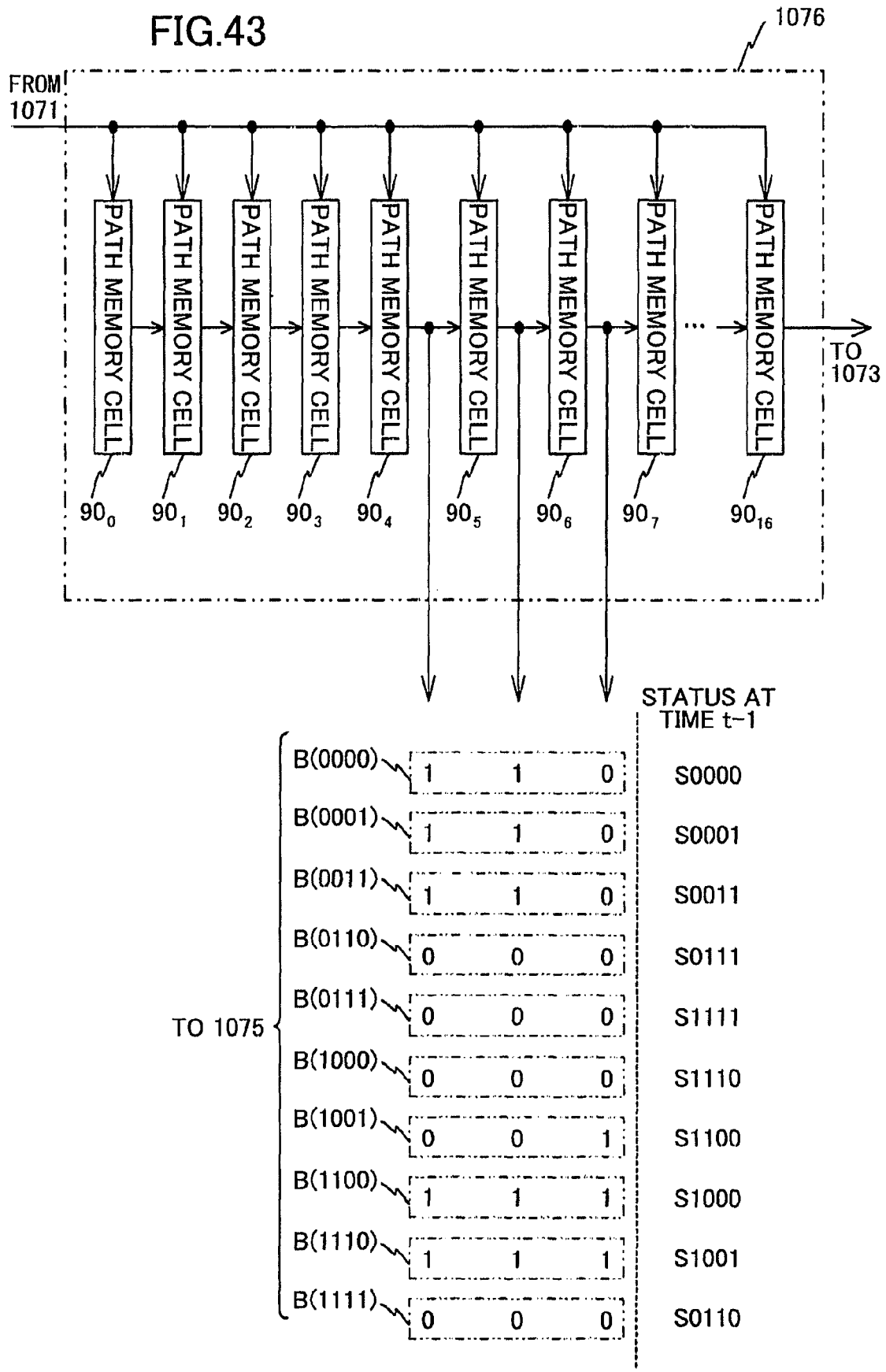
FIG. 43 is a block diagram showing a path memory with a provisional determination function according to an embodiment of the present invention.

FIG. 43 is a block diagram showing the path memory with a provisional decision function 1076 of the decision feedback type Viterbi decoder 1066 according to an embodiment of the present invention. The path memory with a provisional decision function 1076 outputs a provisional decision result corresponding to each state, based on the content of path memory cells $90_0$-$90_{16}$, to the pattern compensation memory 1075. The provisional decision result includes data of a bit immediately after a bit being subjected to a maximum likelihood estimation process. Therefore, such bit data can be used as data for determining a subsequent bit(s) in the maximum likelihood estimation process, to thereby enabling non-linear compensation for a greater range (long bit length) on a recording medium.

Figure 44:
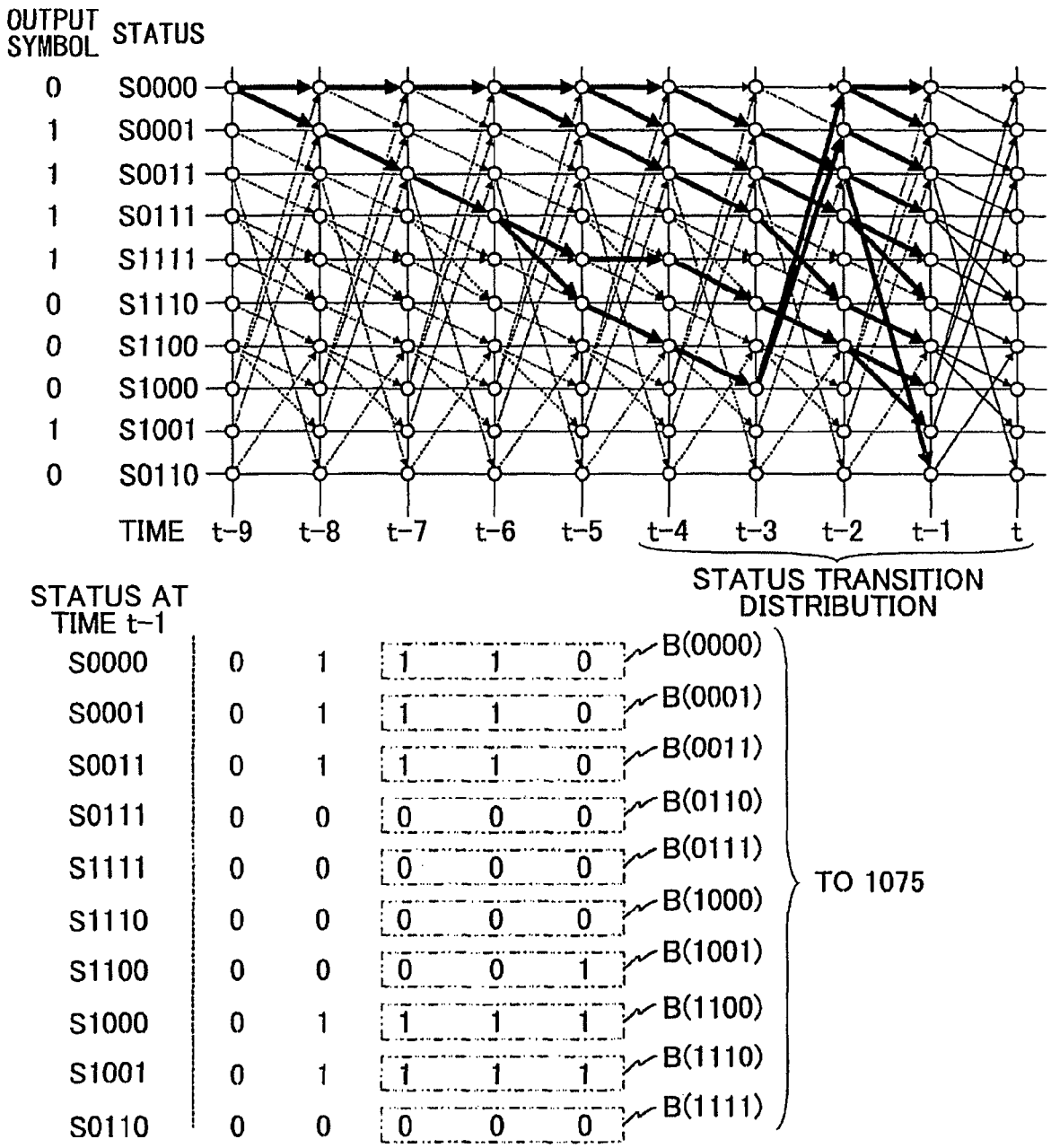
FIG. 44 is a schematic diagram for describing a method of obtaining a provisional determination result according to an embodiment of the present invention.

Next, a method of obtaining a provisional decision result according to an embodiment of the present invention is described with reference to FIG. 44. FIG. 44 is a schematic diagram for describing the method of obtaining a provisional decision result according to an embodiment of the present invention. In FIG. 44, the states (statuses) corresponding to time t1 to time t-4 is a state transition part during a maximum likelihood estimation process. Furthermore, the states (statuses) corresponding to time t-5 to time t-9 is a provisional decision result part. FIG. 44 shows that a single provisional decision bit string corresponding to each survivor path can be determined by tracing backwards the survivor paths (illustrated with dark thick arrows) from each state at time t-1. That is, a route tracing along the survivor paths from the states S0000-S1111 of time t-1 to the state S0000 of time t-9 (i.e. the time when path merging is completed) can be uniquely determined. Thus, the provisional decision bits from the states S0000-S1111 of time t-1 to the states S0000-S1111 of t-5 can be determined. Then, with reference to FIGS. 43 and 44, the path memory with a provisional decision function 1076 outputs the 3-bit bit strings B(0000)-B(1111) corresponding to the states S0000-S1111 of time t-5 to time t-7 as provisional decision bit strings to the pattern compensation memory 1075.

FIG. 45 is a block diagram showing the pattern compensation memory 1075 according to an embodiment of the present invention. The pattern compensation memory 1075 includes 16 B(N)/compensation value storage memories $51_1$-$51_{16}$ corresponding to each branch B(n). The provisional decision bit strings B(0000)-B(1111) from the path memory with a provisional decision function 1076 are input to corresponding B(N)/compensation value storage memories $51_1$-$51_{16}$. Then, compensation values CV(n) corresponding to the input provisional decision bit strings B(0000)-B(1111) are output from the B(N)/compensation value storage memories $51_1$-$51_{16}$. As one example, FIG. 46A shows a table showing a corresponding relationship between a provisional decision bit string B(0000) and a compensation value CV(1) stored in the B(1)/compensation storage memory $51_1$. FIG. 46B shows a table showing a corresponding relationship between a provisional decision bit string B(0110) and a compensation value CV(6) stored in the B(6)/compensation storage memory $51_6$. FIG. 46C shows a table showing a corresponding relationship between a provisional decision bit string B(1100) and a compensation value CV(12) stored in the B(12)/compensation storage memory $51_{12}$. In a case of deciding (determining) a survivor path with the Trellis diagram shown in FIG. 44, the bit string (0000) input to the B(1)/compensation value storage memory $51_1$ is (110). Therefore, 0.11 is decided (determined) as the compensation value CV(1) of the B(1)/compensation value storage memory $51_1$ according to the table shown in FIG. 46A. Likewise, the bit string (0110) input to the B(6)/ compensation value storage memory $51_6$ is (000). Therefore, −0.01 is decided (determined) as the compensation value CV(6) of the B(6)/compensation value storage memory $51_6$ according to the table shown in FIG. 46B. Likewise, the bit string (1100) input to the B(12)/compensation value storage memory $51_{12}$ is (111). Therefore, −0.08 is decided (determined) as the compensation value CV(12) of the B(12)/compensation value storage memory $51_{12}$ according to the table shown in FIG. 46C. Accordingly, the decided compensation values CV(1), CV(6), and CV(12) are output to the branch metric calculator with a compensation function 1077.

Returning to FIG. 42, the branch metric calculator with a compensation function 1077 obtains a target value by adding a compensation value CV(n) of each branch B(n) output from the pattern compensation memory 1075 with a linear intersymbol interference anticipation value having a bit length determined according to PR class and calculates (branch metric), for example, the Euclid distance between the target value and a value of a waveform equalized RF signal (input signal). The below-described Formula (2) is a branch metric formula used by the branch metric calculator with a compensation function 1077. The branch metric calculator with a compensation function 1077 uses the Formula (2) for obtaining each branch metric $BM_t(n)$. The Formula (2) is different from the above-described Formula (1) in that a term for a compensation value CV(n) corresponding to each branch B(n) is included in Formula (2).

[Formula 2]

$$BM_t(n)=(PP(n)\times PR+CV(n)-RF)^2 \quad (2)$$

When calculation of each branch metric $BM_t(n)$ using Formula (2) is completed, the decision feedback type Viterbi decoder 1066 generates a binary signal in the same manner as described with the normal Viterbi decoder 1066'.

With the above-described optical disk apparatus 1020 according to an embodiment of the present invention, the branch metrics BM(n) corresponding to each branch B(N) can be calculated by obtaining a target value by adding a compensation value CV(n) of each branch B(n) output from the pattern compensation memory 1075 with a linear intersymbol interference anticipation value having a bit length determined according to PR class and calculating, for example, the Euclid distance between the obtained target value and a value of a waveform equalized RF signal input from the equalizing circuit 1065. Accordingly, a non-linear component included in an RF signal can be compensated during a maximum likelihood estimation process. As a result, precise reproduction of data recorded in an optical disk 1015 having recording marks smaller than a diffraction limit can be achieved.

Furthermore, since the PR class in this embodiment of the present invention is PR (1, 2, 2, 2, 1), the calculation of branch metrics BM(n) with consideration of the compensation value CV(n) determined according to 3-bit bit arrays B(0000)-B(1111) corresponding to each branch B(n) is substantially equal to non-linear compensation bit number of 8 bits. Accordingly, substantially the same decoding performance attained by a decoder having circuits equivalent to 8 bits can be achieved with a decoder having circuits equivalent to 5 bits (3 bits of the provisional decision bit array not included). This reduces manufacturing cost for the optical disk apparatus 1020.

Figure 47A:
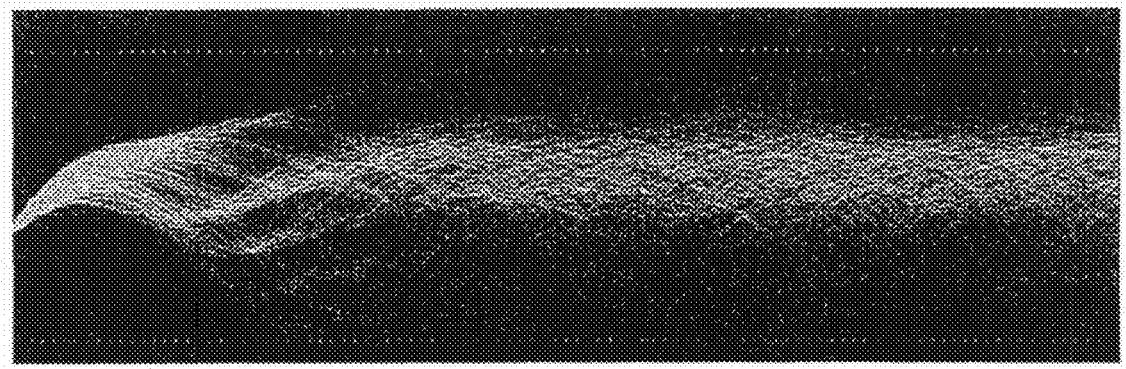
FIG. 47A is a schematic diagram showing an eye pattern of a signal output from an ADC according to an embodiment of the present invention.
Figure 47B:
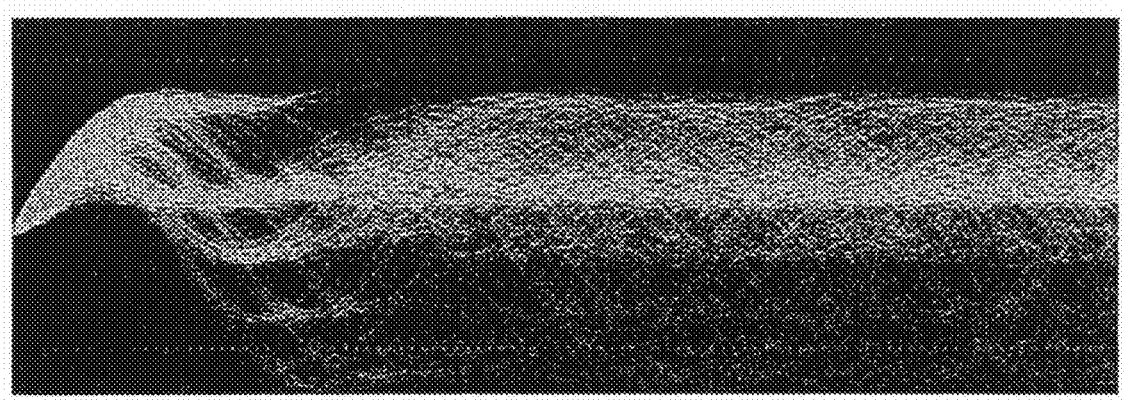
FIG. 47B is a schematic diagram showing an eye pattern of a signal output from an asymmetric FIR filter according to an embodiment of the present invention.
Figure 48A:
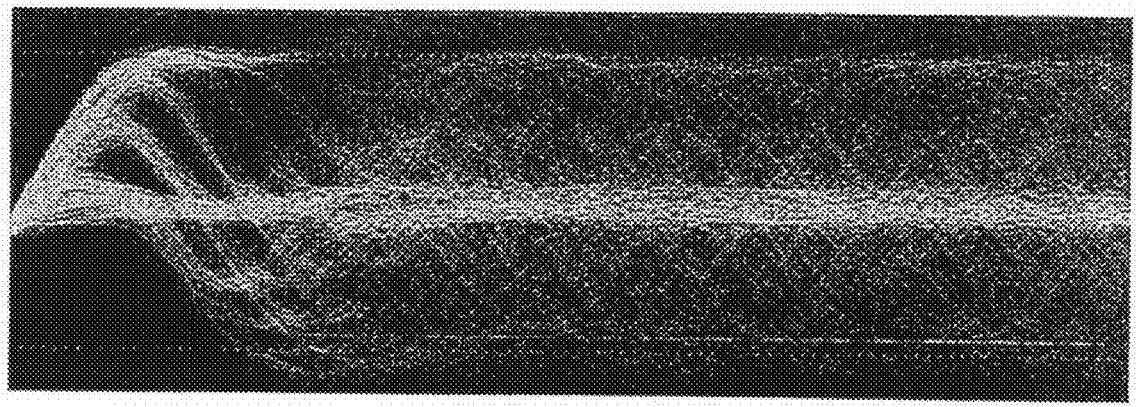
FIG. 48A is a schematic diagram showing an eye pattern of a signal output from a decision feedback type Viterbi decoder according to an embodiment of the present invention in a case where there is no determination feedback bits.
Figure 48B:
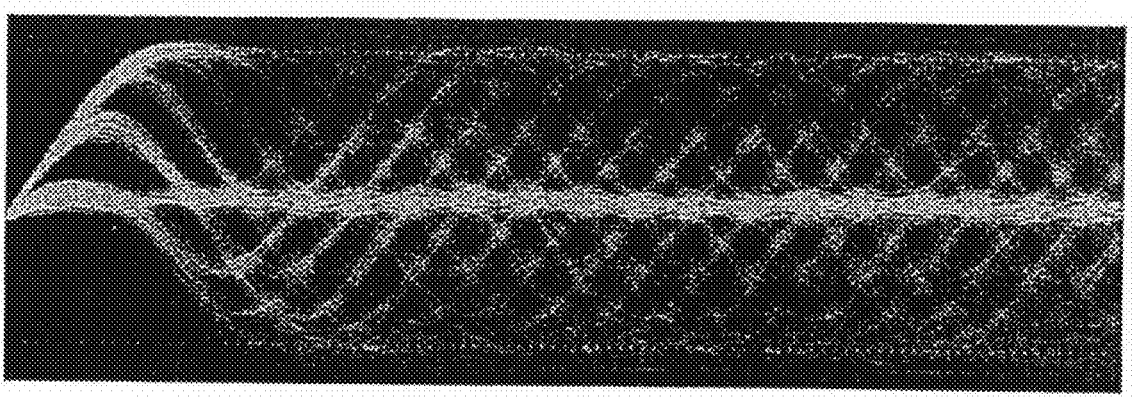
FIG. 48B is a schematic diagram showing an eye pattern of a signal output from a decision feedback type Viterbi decoder according to an embodiment of the present invention in a case where the determination feedback bits are 3 bits.

FIG. 47A is a diagram showing an eye pattern of a signal output from the ADC 1062 according to an embodiment of the present invention. FIG. 47B is a diagram showing an eye pattern of a signal output from the asymmetric FIR filter 1063 according to an embodiment of the present invention. FIG. 48A is a diagram showing an eye pattern of a signal output from a decision feedback type non-linear Viterbi decoder with compensation signal output 1069 (described in detail below) in a case without decision feedback bits (i.e. when the non-linear correction bit length is 5 bits). FIG. 48B is a diagram showing an eye pattern of a signal output from the decision feedback type non-linear Viterbi decoder with compensation signal output 1069 in a case where the decision feedback bits are 3 bits (i.e. when the non-linear correction bit length is 8 bits). In the eye pattern shown in FIG. 47A, the eye is not open at all. In the eye pattern shown in FIG. 47B, although the eye is slightly open, the opening is far from sufficient. In addition, the asymmetry in the eye pattern of FIG. 47B is large. In the eye pattern shown in FIG. 48A, although the eye is slightly open, the opening is insufficient. However, asymmetry is eliminated in the eye pattern of FIG. 48A. In the eye pattern of FIG. 48B, the eye is satisfactorily open. The eye pattern of FIG. 48B shows that sufficient non-linear compensation is achieved. As described above, non-linear compensation of a long range is desired in reproducing data from the optical disk 1015. An optimum method for achieving such long range non-linear compensation is decision feedback from the aspect of circuit scale. Although a method of eliminating non-linear intersymbol interference using a non-linear filter such as a Volterra filter may effectively reduce bit error rate with respect to a super resolution optical disk, using the decision feedback method according to an embodiment of the present invention is more suitable from the aspect of circuit scale.

Figure 49:
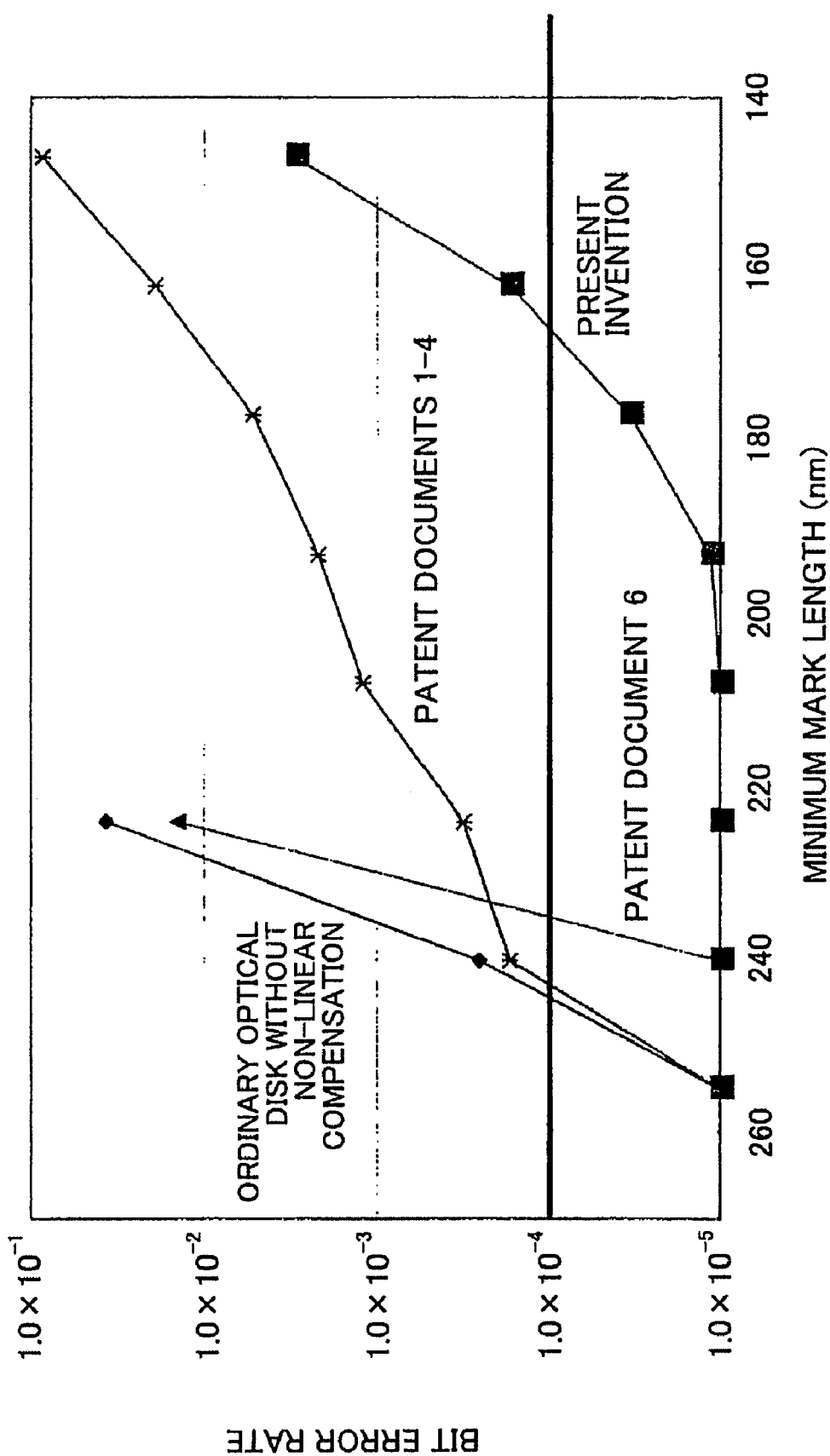
FIG. 49 is a graph for comparing an example of the present invention with other comparative examples.

FIG. 49 is a schematic diagram for comparing the performance (effect) between an example of the present invention and a comparative example. In a case where the bit error rate limit is $1\times10^{-4}$, the comparative examples of Patent Document 1-4 exhibits a considerably small data capacity increase effect of approximately 1%. Although the comparative example of Patent Document 6 exhibits data capacity increase of approximately 4%, such data capacity increase is insufficient. Meanwhile, an example of the present invention exhibits its shortened minimum mark length of 170 nm or less and a data capacity increase effect of 1.45 times or more (45% or more).

The below-described [Table 1] is a table showing a relationship between decision feedback bit number and bit error rate (BER) where the minimum recording mark length is approximately 162 nm. According to Table 1, the bit error rate is $2.01\times10^{-2}$ in a case where non-linear compensation is not conducted. The bit error rate becomes approximately half ($4.44\times10^{-3}$) in a case where non-linear compensation is conducted when there is no provisional decision bits. Furthermore, the bit error rate is $2.67\times10{-4}$ in a case where the provisional decision bits obtained with the above-described decision feedback method according an embodiment of the present invention, thereby showing that decision feedback method can reduce bit error rate of 1 digit or more. Furthermore, Table 1 shows that 8 bits is the sufficient non-linear compensation length considering that bit error rates having the same number of digits are obtained when the non-linear compensation length is 8 bits, 9 bits, and 10 bits.

TABLE 1

| NON-LINEAR BIT NUMBER | DETERMINATION FEEDBACK BIT NUMBER | BER |
|---|---|---|
| 0 | — | $2.01 \times 10^{-2}$ |
| 5 | 0 | $4.44 \times 10^{-3}$ |
| 6 | 1 | $3.98 \times 10^{-3}$ |
| 7 | 2 | $1.73 \times 10^{-3}$ |
| 8 | 3 | $2.67 \times 10^{-4}$ |
| 9 | 4 | $1.67 \times 10^{-4}$ |
| 10 | 5 | $1.67 \times 10^{-4}$ |

Figure 50:
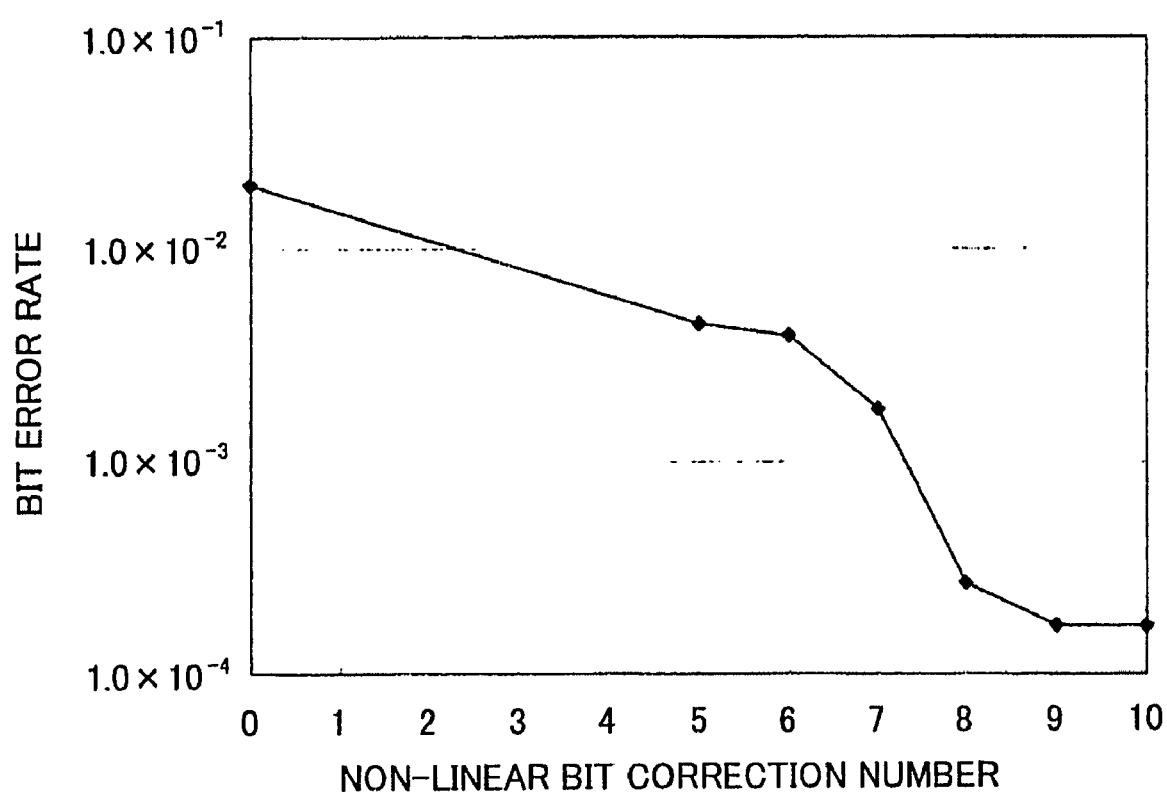
FIG. 50 is a graph showing a relationship between non-linear correction bit numbers and bit error rates in a case where the minimum recording mark length is 162 nm.

FIG. 50 is a graph showing a relationship between non-linear correction bit number and the bit error rate in a case where the minimum recording mark length is approximately 162 nm. FIG. 50 shows a significant improvement of bit error rate where the non-linear correction bit number is between 7 bits and 8 bits. Accordingly, FIG. 50 shows that at least 8 bits are desired as the non-linear correction bit number. In a case where the non-linear correction bit number is 8 bits or more, the bit error rate is a value applicable for practical use ($1\times10^{-4}$), thus showing that a compensation value corresponding to a bit pattern of 8 bits or more is sufficient.

Figure 51:
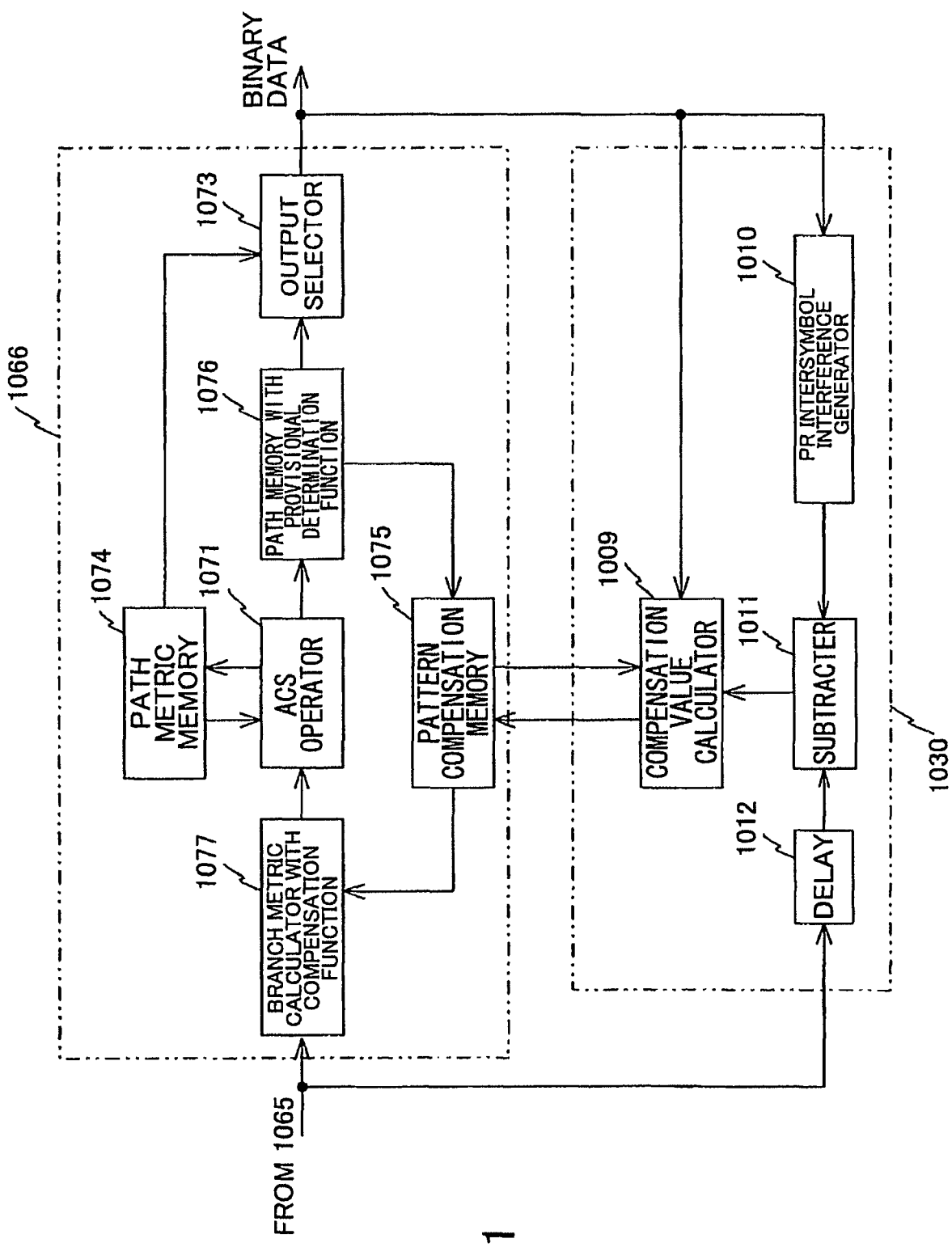
FIG. 51 is a schematic diagram for describing a compensation value training mechanism according to an embodiment of the present invention.

It is to be noted that, the decision feedback type Viterbi decoder 1066 according to an embodiment of the present invention may use a linear intersymbol interference estimation value obtained by calculating past determination results of the decision feedback type Viterbi decoder 1066 and an average value obtained by calculating the time average with respect to the error value of the actual signal. FIG. 51 is a block diagram showing a compensation value training mechanism 1030 together with the decision feedback type Viterbi decoder 1066.

The compensation value training mechanism 1030 according to an embodiment of the present invention includes, for example, a compensation value calculator 1009, a delay 1012 for delaying the input signal for a period equivalent to the decoding time of the decision feedback type Viterbi decoder 1066, and a PR intersymbol interference generator 1010 for applying intersymbol interference (corresponding to the PR class) to the binary signal output from the decision feedback type Viterbi decoder 1066. In the compensation value training mechanism 1030 according to an embodiment of the present invention, a binary signal output from the decision feedback type Viterbi decoder 1066 and an error value (non-linear component of input signal) obtained by subtracting the binary signal output from decision feedback type Viterbi decoder 1066 via the PR intersymbol interference generator 1010 from a signal output from the equalizing circuit 1065 via the delay 12 are input to the compensation value calculator 1009. Then, based on the binary signal obtained from the decision feedback type Viterbi decoder 1066 via the PR intersymbol interference generator 1010, the compensation value calculator 1009 reads out a compensation value of a bit pattern corresponding to a binary data string from the pattern compensation memory 1075 and obtains a difference between an input error value and the read out compensation value. Then, the compensation value calculator 1009 multiplies the obtained difference with a predetermined constant and adds the multiplied value to the compensation value, to thereby rewrite the value of the pattern compensation memory 1075. By repeating the above-described processes with the compensation training mechanism 1030, an optimum compensation value can be obtained. It is to be noted that in a case where the period for rewriting the compensation value is short (e.g., every 1 clock) that is, in a case where a compensation value rewriting frequency (reciprocal of the compensation value rewriting period) is long, interference may occur with respect to the feedback loop for obtaining the reproduction clock in the PLL 1067. Accordingly, from the aspect of attaining reproduction stability, the compensation value of rewriting frequency is desired to be no greater than an open loop crossover frequency of the feedback loop in the PLL 1067.

Figure 56:
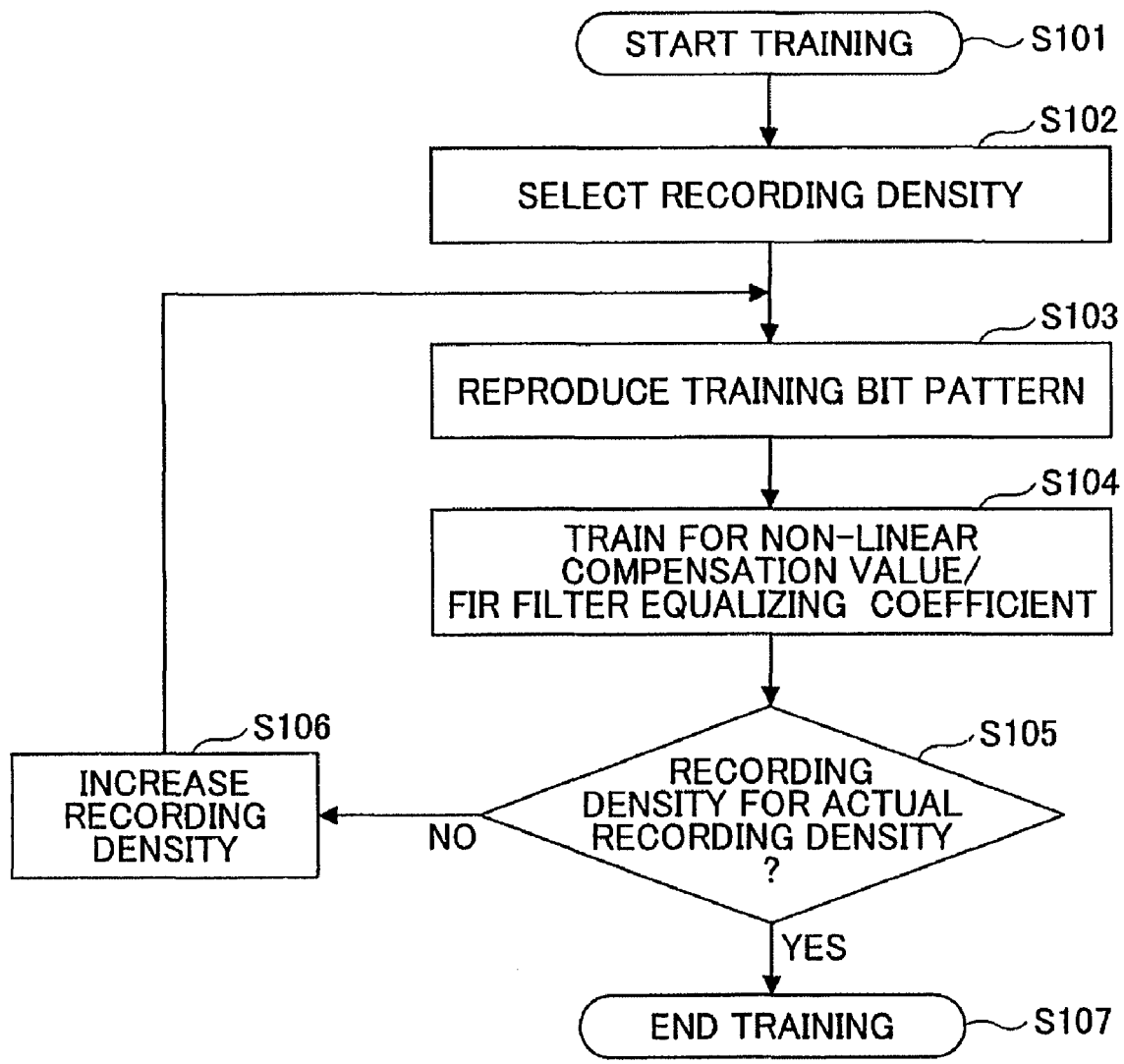
FIG. 56 is a flowchart showing a stepwise compensation value/waveform equalizing coefficient obtaining operation for obtaining compensation values and waveform equalizing coefficients step by step according to an embodiment of the present invention.

Furthermore, in a case of reproducing data recorded with high density from the start, suitable compensation data for performing non-linear correction or suitable waveform equalizing coefficient of the FIR filter 1063 may not be known at the start. In such case, the PLL 1067 may not be able to extract a reproduction clock from the RF signal. Thus, the recorded data cannot be reproduced. In order to prevent this from occurring, a training operation (learning operation) shown in FIG. 56 may be performed in which compensation values and waveform equalizing coefficients are learned and updated step by step from low recording density to high recording density. First, a compensation value and a waveform equalizing coefficient for low recording density are learned. Then, data for a higher recording density is reproduced so as to further learn the compensation value and update the waveform equalizing coefficient. As a result, the PLL 1067 will be able to extract a reproduction clock even for high density recorded data. Thus, the data can be accurately reproduced. More specifically, in the training operation shown in FIG. 27, a low recording density enough to allow the PLL 1067 to lock is selected (Step S102). Then, a bit pattern dedicated for training (learning) is reproduced (Step S103). Then, training of the value for compensating the non-linear component and the FIR filter equalizing coefficient are performed, in other words, compensation values and waveform equalizing coefficients are learned and updated (Step S104). Then, it is determined whether the current recording density is a recording density for performing actual recording of data (Step S105). In a case where the current recording density is not sufficient for performing data recording (No in Step S105), the recording density is increased (Step S106). In a case where data recording can be satisfactorily performed with the current recording density (Yes in Step S105), the training operation is finished (Step S107).

Figure 57:
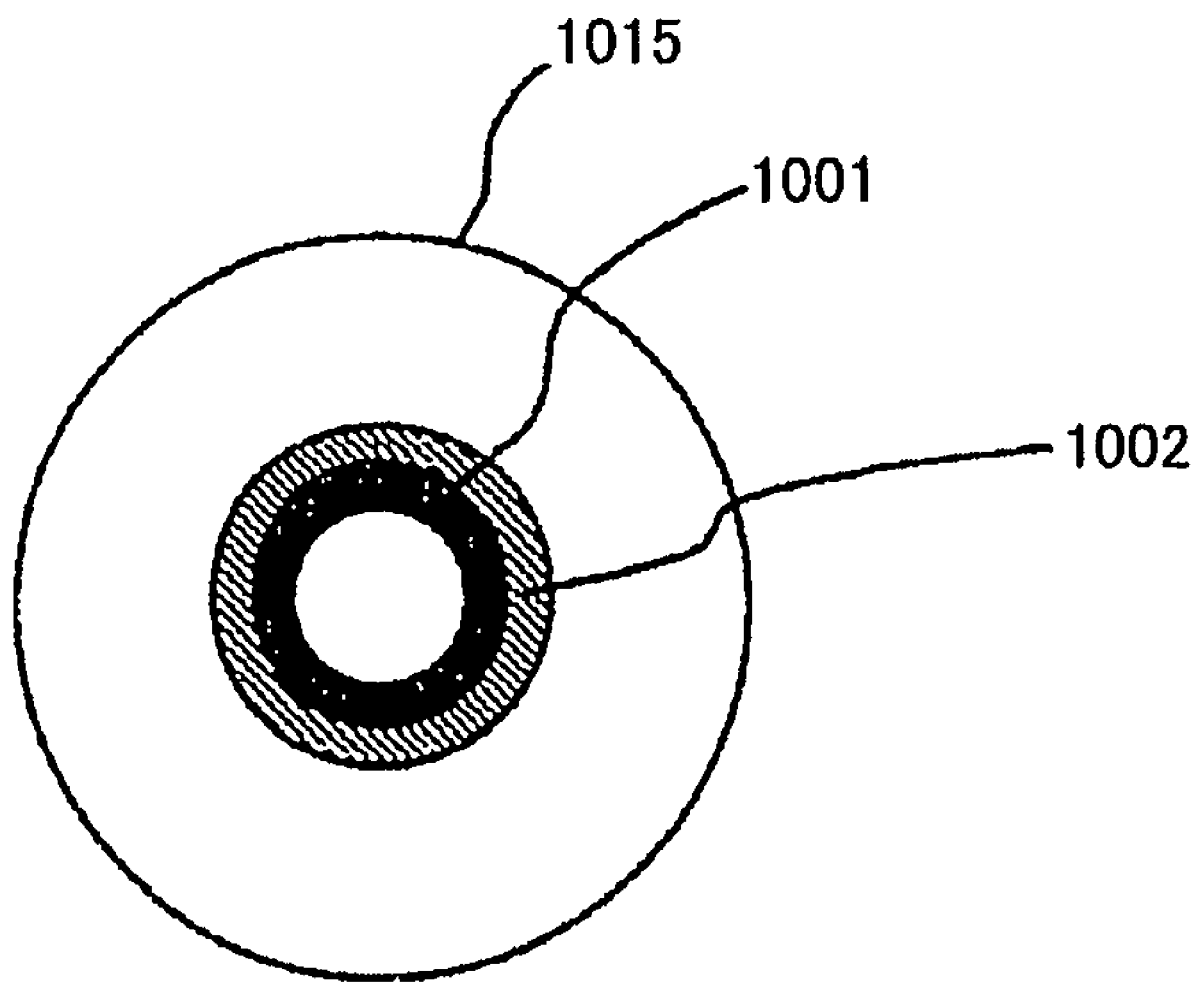
FIG. 57 is a schematic diagram for describing a training area of an optical disk according to an embodiment of the present invention.

The super-resolution optical disk 1015 according to an embodiment of the present invention may be formed with a compensation value training area including TOC (Table of Contents) data or predetermined bit pattern data (recorded in predetermined sections of the optical disk 1015). For example, by reproducing the bit pattern data recorded in the compensation value training area of the optical disk 1015, the bit pattern data can be used to obtain a compensation value as an alternative of using the output from the decision feedback type Viterbi decoder 1066. The compensation value training area may be provided in a TOC area 1001 situated at an inner peripheral part of a recording area 1002 of the optical disk 1015 as shown in FIG. 52A. Alternatively, the compensation value training area may be periodically arranged in the recording area 1002 as illustrated with black dots 1003 in FIG. 52B. Thereby, training (learning) of the compensation value can be conducted consistently without being affected by the error bits output from the decision feedback type Viterbi decoder 1066. Furthermore, the training area may be provided by recording predetermined bit patterns in a ROM beforehand during manufacture or by using bit patterns recorded beforehand in a rewritable type or a write-once type optical disk. Furthermore, an unrecorded training area may be prepared beforehand and have predetermined bit patterns recorded in the unrecorded training area. Furthermore, in preparing the training area, plural training areas may be prepared beforehand so that plural compensation values corresponding to plural recording densities can be learned by using the above-described learning operation. Thereby, even in reproducing data recorded with high density, the PLL 1067 can operate with improved stability and high density recorded data can be accurately reproduced. For example, the optical disk 1015 shown in FIG. 57 may have a training data area recorded with low density in a first TOC (Table OF Contents) area 1001 and another training data area recorded with high density in a second TOC area 1002.

Furthermore, the optical disk 1015 may have a suitable compensation value (i.e. compensation value suitable for the optical disk 1015) recorded thereto beforehand for allowing the suitable compensation value to be read out when reproducing the optical disk 1015 with the optical disk apparatus 1020. For example, in a case where wobble data, TOC data, or compensation value related data (hereinafter also referred to as "preparatory compensation value data") of the optical disk 1015 are recorded in the optical disk 1015 beforehand, the CPU 1040 may read out the preparatory compensation value data of the optical disk 1015 and store the preparatory compensation value data in the RAM 1041. Accordingly, the values of the pattern compensation memory 1075 may be set based on the preparatory compensation value data and other reproduction conditions.

Since the asymmetric property of the RF signal differs depending on changes in the shape of the fine aperture areas (HA)/fine mask areas (MA) and changes of temperature distribution of the super resolution layer according to various reproduction conditions (e.g., configuration of super-resolution layer, recording density, reproduction power, linear speed during reproduction, waveform of the light source), it is desired to have one or more parameters for applying an optimum preparatory compensation value. For example, by preparing various preparatory compensation value data (in this example, preparatory compensation value data corresponding to 4×speed reproduction), a compensation value can be estimated by using the preparatory compensation value data even where the user requests 16×speed reproduction.

Furthermore, the linear intersymbol interference estimation value calculated according to past determination results of the decision feedback type Viterbi decoder 1066 and the error value of the actual signal at that time exhibit a probability distribution for each bit pattern. Accordingly, a variance value VV(n) may be recorded together with a compensation value in the B(n)/compensation value storage memory $51_1$-$51_{16}$ so that branch metrics BM(n) can be calculated with the below Formula (3). It is to be noted that "k" is a constant number from 1 to 4. With this calculation method, maximum likelihood estimation can be conducted with consideration of variance value. Thus, the control of bit error can be further improved.

bit error rate reduction effect can be attained. Although considering the variance value has little effect, for example, in a case of merely using the decision feedback type non-linear Viterbi decoder shown in Patent Document 6 requiring no non-linear compensation of a long bit length, a significant effect can be attained when a super-resolution optical disk is used as the optical disk. The below described Table 2 shows the bit error rate (BER) reduction effect with/without consideration of variance values. As shown in Table 2, in a case the non-linear correction bit length is short, the bit error rate reduction effect is small (approximately 10%). However, by increasing the non-linear correction bit length, the bit error rate can be cut down to half or less.

TABLE 2

| NON-LINEAR BIT NUMBER | DETERMINATION FEEDBACK BIT NUMBER | WITHOUT CONSIDERING VARIANCE BER 1 | CONSIDERING VARIANCE BER 2 | BER REDUCTION EFFECT CONSIDERING VARIANCE (BER 1/BER 2) |
|---|---|---|---|---|
| 5 | 0 | $4.44 \times 10^{-3}$ | $3.90 \times 10^{-3}$ | 0.88 |
| 6 | 1 | $3.98 \times 10^{-3}$ | $3.14 \times 10^{-3}$ | 0.79 |
| 7 | 2 | $1.73 \times 10^{-3}$ | $1.13 \times 10^{-3}$ | 0.65 |
| 8 | 3 | $2.67 \times 10^{-4}$ | $1.89 \times 10^{-4}$ | 0.71 |
| 9 | 4 | $1.67 \times 10^{-4}$ | $6.70 \times 10^{-5}$ | 0.40 |
| 10 | 5 | $1.67 \times 10^{-4}$ | $6.70 \times 10^{-5}$ | 0.40 |

[Formula 3]

$$BM_t(n) = (PP(n) \times PR + CV(n) - RF)^2 / (VV(n))^k \quad (3)$$

In this calculation method, variance values VV(n) are recorded beforehand in the B(n)/compensation value storage memory $51_1$-$51_{16}$ along with compensation values (CV(n)). Then, in the same manner as outputting a corresponding compensation value CV(n), a corresponding variance value VV(n) is output to the branch metric calculator with a compensation function 1077 according to the provisional decision results (i.e. bit strings B(0000)-B(1111)) from the path memory with a provisional decision function 1076. Then, the branch metric calculator with a compensation function 1077 calculates a branch metric BM using the above-described Formula (3). FIG. 53 shows a table having an item "variance value VV(6)" added to the B(6)/compensation value storage memory $51_6$. As an alternative of the variance value, a deviation value may be recorded.

Furthermore, although a related art case (Japanese Laid-Open Patent Application No. 2005-223584) shows a similar calculation method, the decision feedback type Viterbi decoder 1066 exhibits a significant improvement in reduction of bit error rate owing to the reason below.

Figure 54:
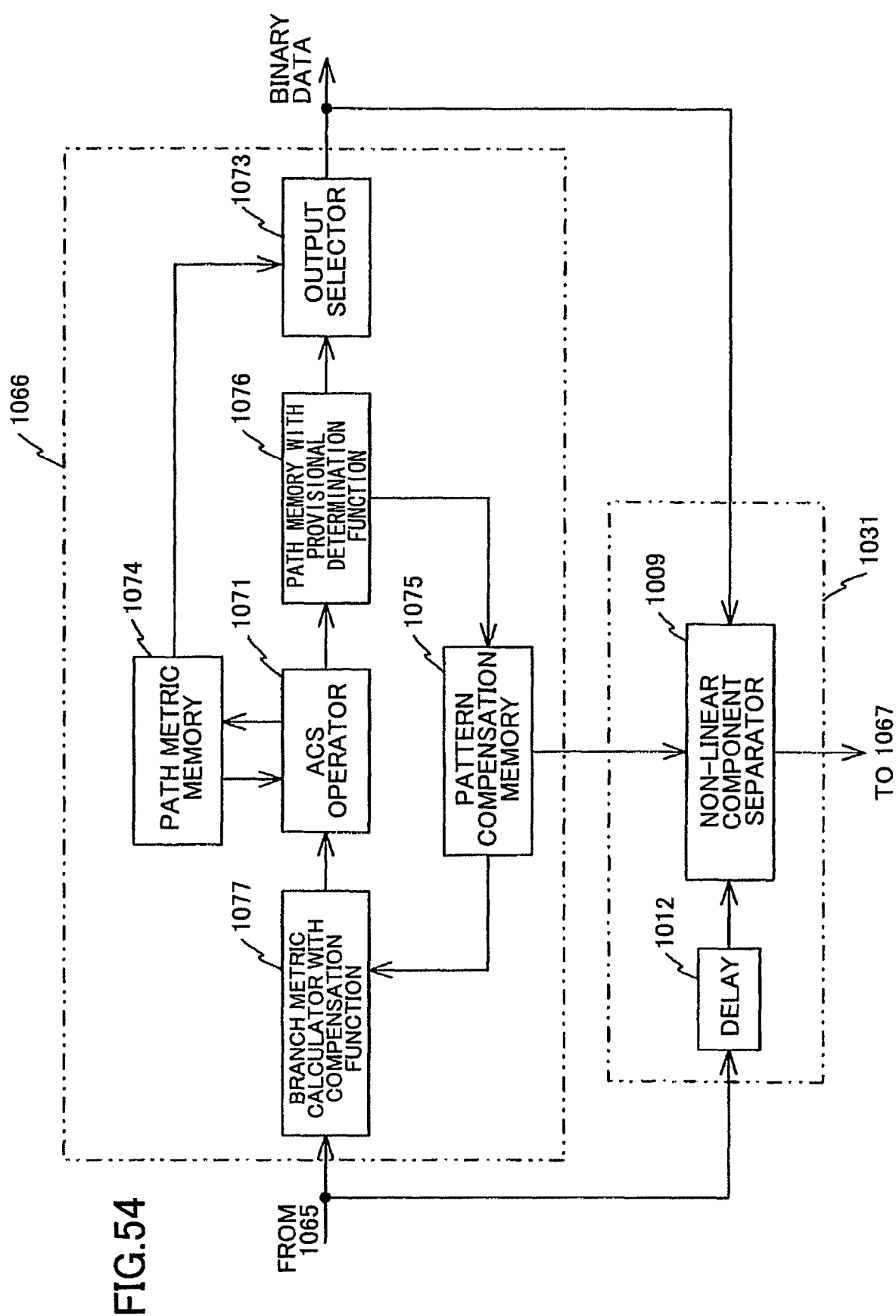
FIG. 54 is a block diagram showing a non-linear component correction signal output mechanism according to an embodiment of the present invention.

In a case where the non-linear compensation bit length is short, the probability distribution of the equivalent error value of the bit patterns are added together to become close to normal distribution according to a central limit theorem. However, with the decision feedback type Viterbi decoder 1066 according to an embodiment of the present invention, unique probability distributions for each bit pattern can be attained and distinct differences of variance values appear by increasing the compensation bit length. Accordingly, a high FIG. 54 is a block diagram showing a non-linear component correction signal output mechanism 1031 and the decision feedback type Viterbi decoder 1066 according to an embodiment of the present invention. Although a non-linear component is included in a signal input to the decision feedback type Viterbi decoder 1066, the non-linear component can be removed from the input signal by compensating for the non-linear component with a value stored in the pattern compensation memory 1075. In the non-linear component correction signal output mechanism 1031, a non-linear component compensator (non-linear component separator) 9 reads out a compensation value of a pattern corresponding to a binary data string from the pattern compensation memory 1075 and subtracts a compensation value from a delay signal (delayed for a period equivalent to the decoding time of the decision feedback type Viterbi decoder 1066) from output from the delay 1012, to thereby output a reproduction signal having its non-linear component compensated.

Figure 65:
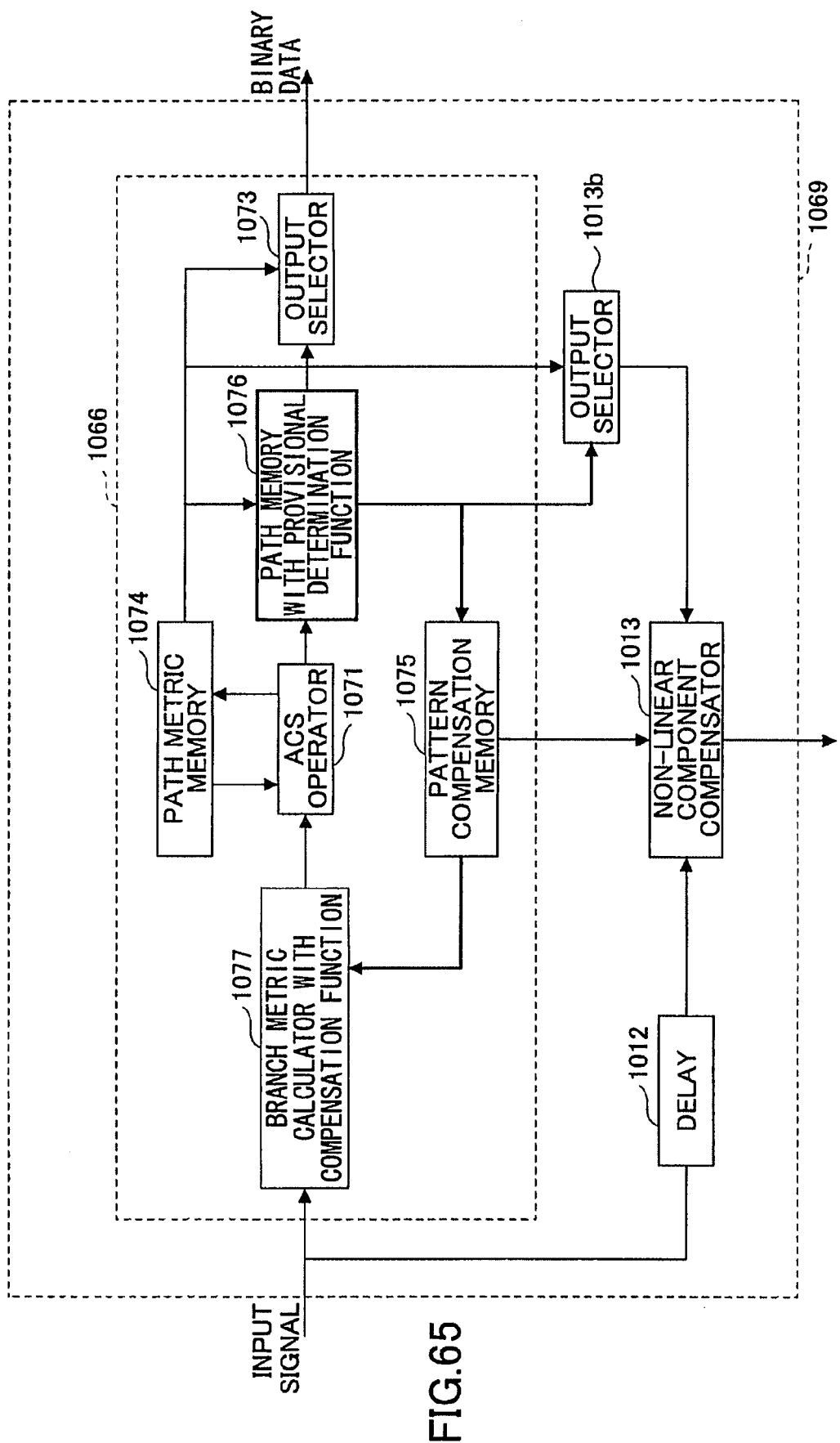
FIG. 65 is a block diagram showing a modified example of a non-linear component correction signal output mechanism according to an embodiment of the present invention.

FIG. 65 is a block diagram showing a modified example of the non-linear component correction signal output mechanism 1031 according to an embodiment of the present invention. In this example, the output selector 1013b, which has the same function as the output selector 1073, selects a single survivor path corresponding to the path having the least (minimum) path metric value (i.e. path of surest likelihood) from the path metric memory 1074. However, the output selector 1013b is different from the output selector 1073 in that the output selector 1073 outputs the determination value from the last path memory cell of the path memory 1076 (e.g., path memory cell $90_{16}$ in FIG. 43). Thus, as shown in the connections illustrated in FIG. 65, the binary value (provisional determination value) output from the output selector 1013b is a value corresponding to the path selected according to the provisional determination output of the path memory 1076 (e.g., path memory cell $90_4$). Although the determination result of the output selector 1073 may be more satisfactory compared to that of the output selector 1013b, the latency for outputting determination results in the decoder can be smaller by using the output selector 1013b. Thereby, the delay time in the PLL loop can be shortened. As a result, the performance of the PLL 1067 becomes stable.

Figure 55:
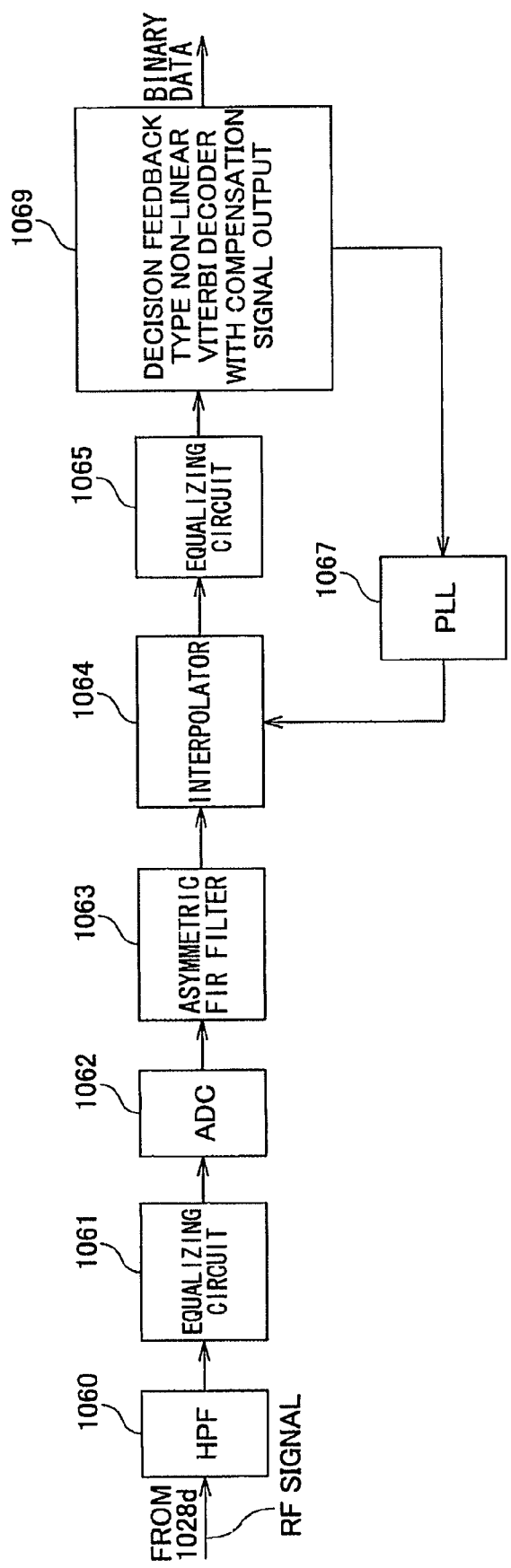
FIG. 55 is a block diagram showing a decoder according to another embodiment of the present invention.

With reference to FIG. 55, by outputting the compensated reproduction signal to the PLL 1067 (used for extracting a reproduction clock from a reproduction signal), the PLL 1067 can stably extract a reproduction clock. Thus, bit errors can be reduced. In addition, the eye pattern or jitter of the reproduction signal may be monitored so that the monitor result can be used as an index for evaluating reproduction signal quality.

Figure 58:
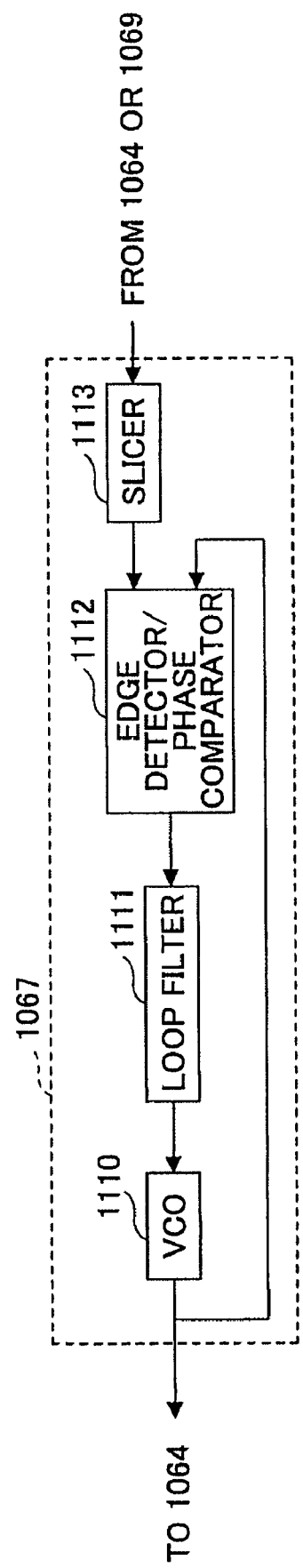
FIG. 58 is a block diagram showing a PLL 67 according to an embodiment of the present invention.

Next, the PLL 1067 according to an embodiment of the present invention is described in further detail. FIG. 58 is a block diagram showing a configuration of the PLL 1067 in detail. In the PLL 1067, an input signal is binarized with a suitable signal level by a slicer 1113. Then, the binarized signal is output to the edge detector/phase comparator 1112. In the edge detector/phase comparator 1112, the phase differences of the rise and drop for both the reference frequency signal from the VCO (Voltage Controlled Oscillator) and the output signal from the slicer are obtained. The loop filter 1111, which is for determining the time constant of the loop of the PLL 1067, includes, for example, an LPF (Low Pass Filter) or a lead/lag filter. Accordingly, reproduction clocks are extracted from the PLL 1067 having this configuration.

Since the PLL 1067 in this example uses a slicer and an edge detection phase comparator, the PLL 1067 tends to be unstable during reproduction of high density recorded data or during super resolution reproduction where the CN ratio of the minimum mark is small. This leads to an increase of bit error.

Figure 59:
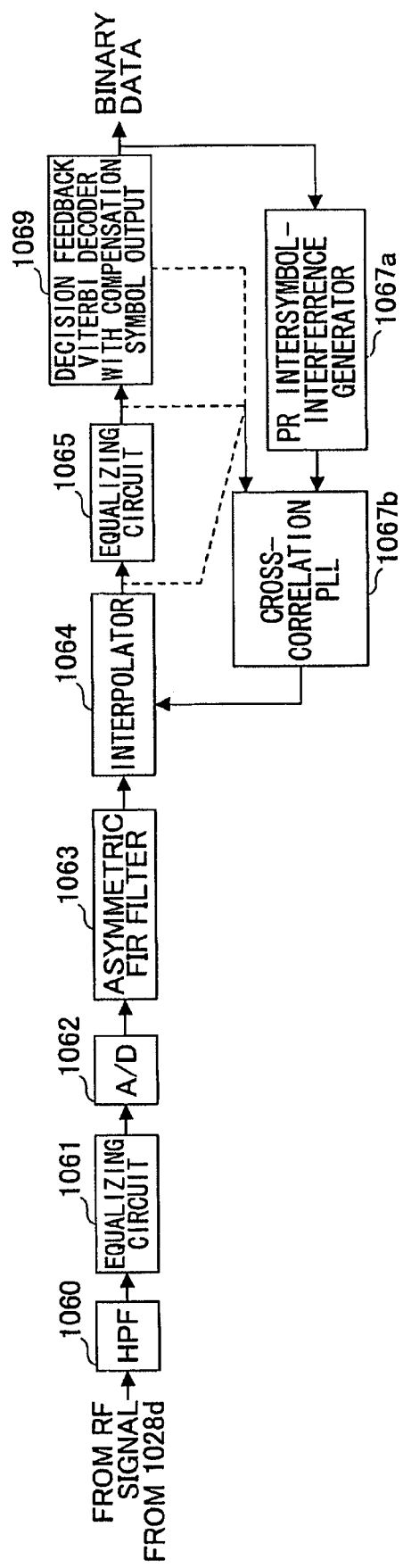
FIG. 59 is a block diagram showing a decoder 1028e using a cross-correlation PLL 67b according to an embodiment of the present invention.
Figure 60:
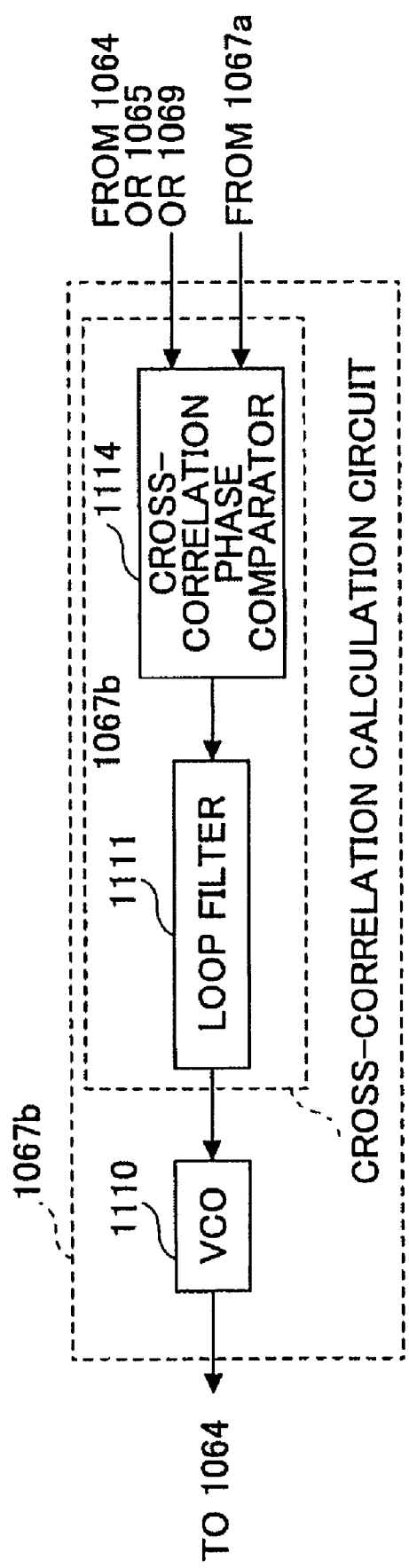
FIG. 60 is a block diagram showing a cross-correlation PLL 67b according to an embodiment of the present invention.
Figure 61:
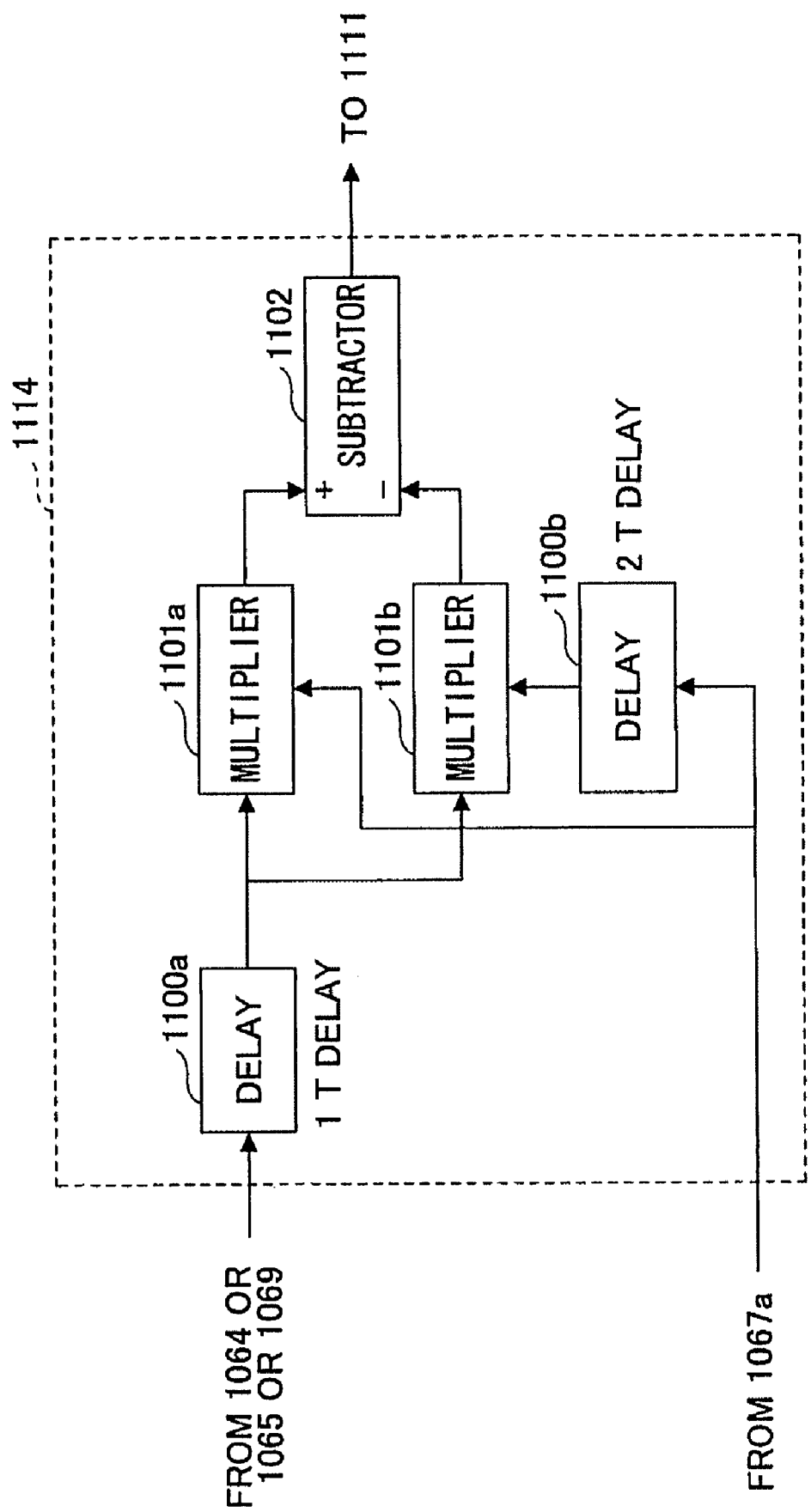
FIG. 61 is a block diagram showing a cross-correlation phase comparator according to an embodiment of the present invention.

Therefore, in this example, a cross-correlation PLL (clock extracting circuit) 1067*b* shown in FIG. 60 may be used as an alternative of the PLL 1067 for solving this problem. In addition, the configuration of the decoder 1028*e* shown in FIG. 55 is also changed to a configuration shown in FIG. 59.

Since the PR intersymbol interference generator 1067*a* has the same function as the PR intersymbol interference generator 1010 shown in FIG. 51, the output of the PR intersymbol interference generator 1010 may be used as an alternative of the PR intersymbol interference generator 1010. Although the PR class used for the PR intersymbol interference generator 1067*b* is preferred to be close to the PR class used for the equalizing circuit 1065, a PR class of, for example, PR (1), may be used for the simplifying the configuration of the PR intersymbol interference generator 1067*b*. That is, the PR intersymbol interference generator 1067*b* can sufficiently operate even where the PR intersymbol interference generator 1067*b* has such configuration allowing binary data as is (unprocessed binary data) to pass therethrough. Since a cross-correlation calculator is used afterwards, the DC (Direct Current) component of the signal is to be removed, that is, the binary signal of 1 or 0 is be processed to 1 or −1 in a case where PR (1) is used as the PR class.

Figure 63:
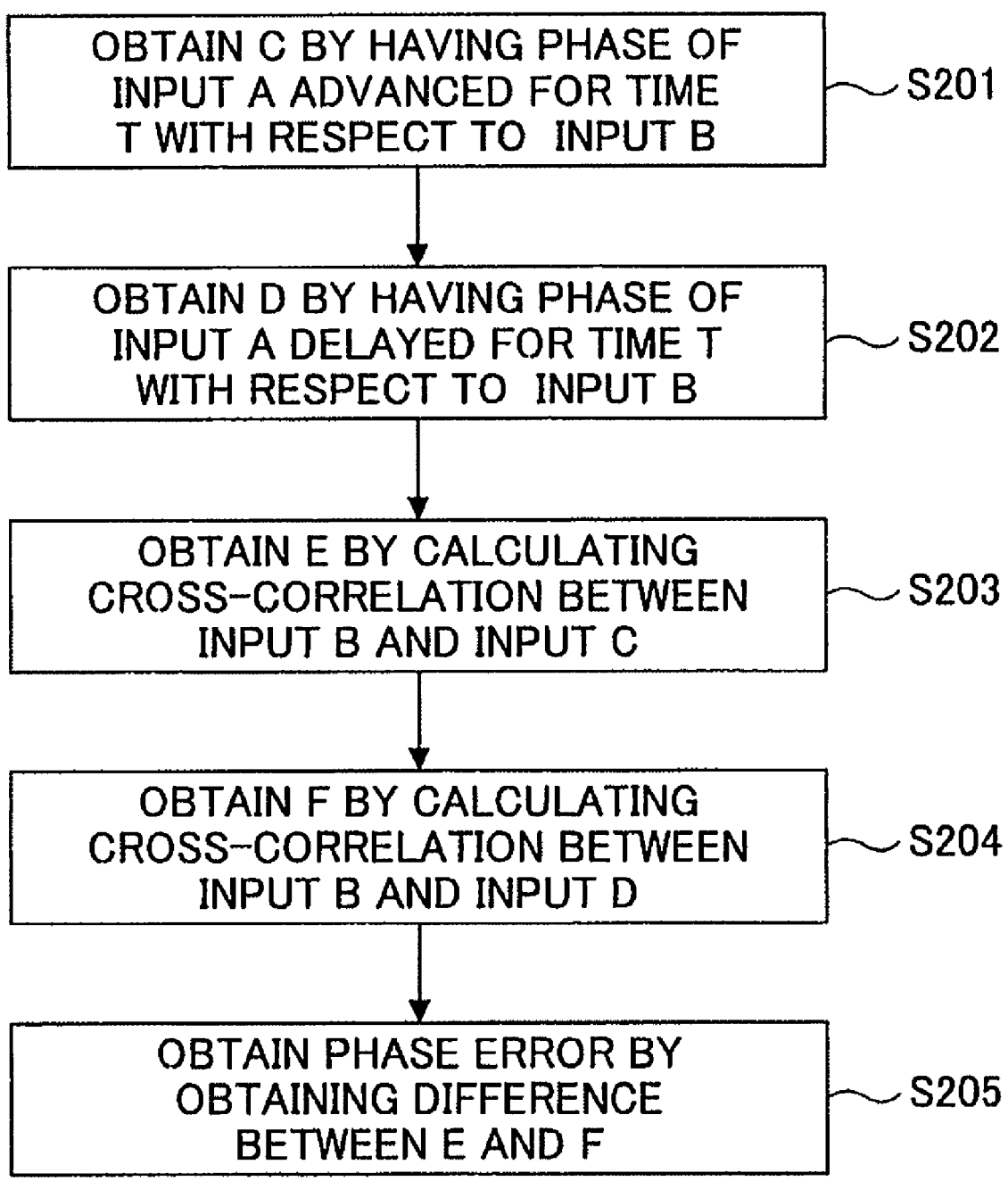
FIG. 63 is a flowchart showing an operation by the cross-correlation phase comparator according to an embodiment of the present invention.

Next, the cross-correlation PLL 1067*b* is described. The cross-correlation PLL 1067*b* includes a cross-correlation phase comparator 1114 for performing phase comparison between the output of the PR intersymbol interference generator 1067*a* and the output of the interpolator 1064, the equalizing circuit 1065, or the determination feedback type non-linear Viterbi decoder having a compensation signal output 1069. FIG. 63 is a block diagram showing the cross-correlation phase comparator 1114 according to an embodiment of the present invention. The symbol output from the PR intersymbol interference generator 1067*a* (hereinafter also referred to as "input A") is input to the multiplier 1101*a* and to the multiplier 1101*b* via the delay 1100*b* delaying the input A for two clocks (2 T). The symbol output from the interpolator 1064, the equalizing circuit 1065, or the determination feedback type non-linear Viterbi decoder having a compensation signal output 1069 (hereinafter also referred to as "input B") is input to the multiplier 1101*b* and to the multiplier 1101*a* via the delay 1100*a* delaying the input B for one clock (1 T). That is, the product between the 1T delayed input A and the input B and the product between the 1 T delayed input A and the 2T delayed input B are calculated, respectively. Then, the difference of the calculated results is obtained by a subtractor 1102. Considering that a low pass filter (LPF) 1111 is provided after the cross-correlation comparator 1114, the low pass filter 1111 serves to obtain the difference between the cross-correlation of the 1T delayed input A and the input B and the cross-correlation of the 1T delayed input A and the 2T delayed input B. In other words, the cross-correlation phase comparator 1114 and the loop filter 1111 together operate as two cross-correlation calculation circuits.

Next, a calculation formula for obtaining cross-correlation is described with reference to FIG. 62. In the formula shown in FIG. 62, "x" indicates input A, "y" indicates input B, "t" indicates time, and "R" indicates a cross-correlation value. Furthermore, in this formula, the loop filter 1111 serves as "Σ". In a case where there is no phase difference between input A and input B, the cross-correlation value becomes a maximum value. However, in a case a where the PLL is set to lock so that the cross-correlation value is maximum, a feedback loop cannot be obtained since the phase difference and the error signal become 0. Therefore, a phase error signal allowing the sign of the error amount to be recognized is required. By using the characteristic that the cross-correlation value is symmetric having the phase error amount of 0 as its center, phase comparison can be performed by obtaining the difference between the cross-correlation of the input T and the input B moved 1 T towards the positive side and the cross-correlation of the input A and the input B moved 1 T towards the negative side. Thereby, the required phase error signal can be obtained. In using the formula shown in FIG. 62, the phase difference signal can be expressed as "R(1)−R(−1) =phase difference signal". The operation of the above-described cross-correlation phase comparator 1114 is shown in FIG. 63.

Then, after the signal is output from the loop filter 1111, the VCO 1110 reproduces a signal having a frequency complying to the phase error amount, to thereby enable a reproduction clock of the RF signal to be extracted.

Although the output from the interpolator 1064, the equalizing circuit 1065, or the determination feedback type non-linear Viterbi decoder having a compensation signal output 1069 can be used as the input of the cross-correlation PLL 1067*b*, the phase comparison can be performed on a signal having its non-linear component removed by using the output of the determination feedback type non-linear Viterbi decoder having a compensation signal output 1069. This enables the PLL 1067*b* to operate more stably.

Although not shown in the drawings, a delay is provided in front of the cross-correlation PLL 1067*b* for matching the time of the output of the PR intersymbol interference generator 1067*a* and the output of the interpolator 1064, the equalizing circuit 1065, or the determination feedback type non-linear Viterbi decoder having a compensation signal output 1069.

As described above, in a case where the decoder shown in FIG. 59 uses the interpolator 1064 for adjusting the reproduction clock timing, the output of the interpolator 1064, the equalizing circuit 1065, or the determination feedback type non-linear Viterbi decoder having a compensation signal output 1069 may be used as the upper input to the PLL 1067*b*

(illustrated with dotted lines in FIG. 59). However, considering that the upper input to the PLL 1067b can be positioned after the adjustment of the reproduction clock timing and before the decoder, the upper input to the PLL 1067b may be provided anywhere as long as it is positioned after the ADC and before the decoder, for example, in a case where the decoder uses the ADC having the reproduction clock generated by the PLL as its reproduction clock for adjusting the reproduction clock timing.

Since the decoder 1069 in this example uses binarized determination results, the PLL 1067 cannot operate properly when the determination result is incorrect (error). Thus, the compensation value for correcting the non-linear component of the RF signal and the waveform equalizing coefficient of the equalizing circuit 1065 has a large effect in reducing the error rate of the decoder 1069. Therefore, in this example, the above-described training method of obtaining (learning) compensation values and waveform equalizing coefficients step by step from low recording density to high recording density or the method of setting the compensation value of rewriting frequency to a value no greater than an open loop cross-over frequency of the feedback loop in the PLL 1067 may be used for increasing reproduction stability.

Figure 64:
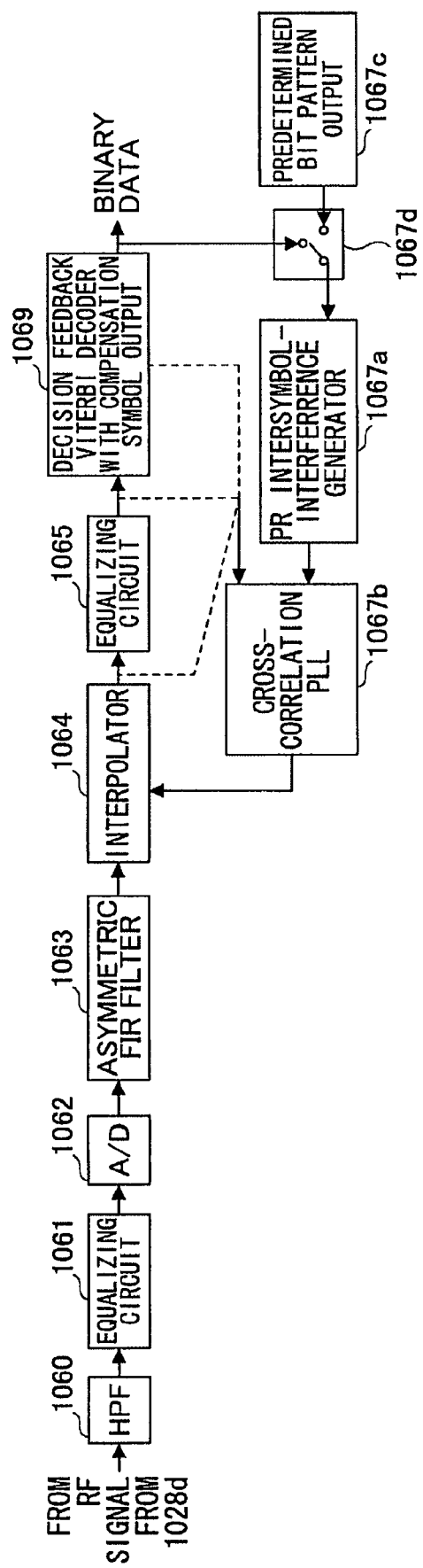
FIG. 64 is a block diagram showing a modified example of a decoder 1028e using a cross-correlation PLL according to an embodiment of the present invention.

Furthermore, in a case where the optical disk 1015 has a training area in which predetermined bit patterns are recorded, the predetermined bit patterns may be used as the input of the cross-correlation PLL 1067b as an alternative of the binarized determination results of the Viterbi decoder 1069, to thereby increase stability of the PLL 1067. In this case, the decoder 1028e has a configuration shown in FIG. 64. By using a switch 1067d, the output of the Viterbi decoder 1069 and the output from the predetermined bit pattern recorded in the training area of the optical disk 1015. Accordingly, since the compensation value for correcting non-linear components and the waveform equalizing coefficient of the equalizing circuit 1065 can be learned by reproducing the training area of the optical disk 1015, the performance of the PLL 1067 can be stabilized by using the predetermined bit patterns recorded beforehand in the training area. Thus, a suitable compensation value and waveform equalizing coefficient can be obtained.

Furthermore, the PR class of the PR intersymbol interference generator 1010 and the PR class of the FIR filter 1063 may be set with difference classes. For example, in a case where the PR intersymbol interference generator 1010 and the PR class of the FIR filter 1063 are set with the same PR class (1, 2, 2, 2, 1), there will be no 2T mark carriers. This makes it difficult for the PLL 1067 using a slicer to extract reproduction clocks. However, by setting the PR intersymbol interference generator 1010 and the FIR filter 1063 with different PR classes, for example, a PR class having 2T mark carrier PR (0, 1, 2, 1, 0) and PR (1, 1, 2, 1, 1), the signal transmitted to the PLL 1067 is equivalent to a signal of PR (0, 1, 2, 1, 0) or PR (1, 1, 2, 1, 1). Thereby, PLL 1067 can operate normally.

The bit length of the PR is not to be limited in particular by the bit length of ML. For example, in a case where ML has a bit length of 5 bits, the bit length of PR may be PR (1, 2, 3, 4, 4, 3, 2, 1), that is, PR may have a bit length (e.g., 8 bits) no less than the bit length of ML. In this case, branch metric may be calculated by using the below Formula (4). In Formula (4), "n" indicates an integer of 1 to 16, "PR" indicates a matrix [1 2 3 4 4]$^T$, "RF" indicates a value of an RF signal being waveform equalized with a PR characteristic, "PP(n)" indicates a 5-bit bit string corresponding to each branch B(n), and "CV(n)" indicates a compensation value corresponding to each branch B(n). In this example, 5 high order bits (same number of bits as ML bit length) are used as the PR characteristic for calculating branch metric. In this state, a pattern compensation value is trained. Accordingly, 3 low order bits are used for generating intersymbol interference with the pattern compensation value.

[Formula 4]

$$BM_t(n)=(PP(n)\times PR+CV(n)-RF)^2 \quad (4)$$

Furthermore, 3 low order bits of data of the PR characteristic may use the provisional decision result with the below Formula (5). In Formula (5), "n" indicates an integer of 1 to 16, "PR" indicates a matrix [1 2 3 4 4 3 2 1]$^T$, "RF" indicates a value of an RF signal being waveform equalized with a PR characteristic, the 5 high order bits of "PP(n)" indicate a 5-bit bit string corresponding to each branch B(n), the 3 low order bits of "PP(n)" indicate a 3-bit provisional decision bit string, and "CV(n)" indicates a compensation value corresponding to each branch B(n).

[Formula 5]

$$BM_t(n)=(PP(n)\times PR+CV(n)-RF)^2 \quad (5)$$

Accordingly, a long PR class more suitable for the super-resolution reproduction signal can be used, to further reduce bit error rate.

Although the optical disk apparatus 1020 according to the above-described embodiment of the present invention is described as only having a function of reproducing data from an optical disk, as long as the optical disk apparatus 1020 has the function of reproducing data from an optical disk, other optical disk apparatuses 1020 having a data recording function, a data erasing function, and/or a data reproducing function may also be used.

Although the optical pickup apparatus 1023 according to the above-described embodiment of the present invention is described as having a single light source 1231, the optical pickup apparatus 1023 may have, for example, plural light sources for irradiating laser beams having different wavelength.

[Section 3]

As described above, the partial response method is used to prevent deterioration of signal characteristics during an equalization decoding process by actively generating predetermined linear waveform interference. Recently, a PRML (Partial Response Maximum Likelihood) method, which is a combination of the partial response method and a ML (Maximum Likelihood) method, has been used for performing high precision signal processing.

Furthermore, as for a signal processing having PR characteristics for 5 bits, there is a signal processing apparatus having partial response characteristics that have a symmetric shape (hereinafter also referred to as "symmetric PR characteristic") where the origin (0) is the center (e.g., PR (a, a), PR (a, b, a), PR (a, b, b, a), PR (a, b, c, b, a), PR (a, b, b, b, a), PR (a, a, b, a, a) ("a", "b" "c" each being a given real number)). However, in performing the above-described super resolution reproduction, inconsistency occurs between the PR characteristics of the signal processing apparatus and the characteristics of an analog reproduction signal due to the fact that the data recorded in the super resolution optical disk is read out by irradiating an asymmetric beam spot to the optical disk.

It is to be noted that the symmetric PR characteristic is expressed as PR (PR1, PR2, PR3, . . . , PRn) in a case of a PR characteristic of n bits. In a case where "n" of the symmetric PR characteristic is an even number, the conditions of the following [Expression 1] are satisfied. In a case where "n" of the symmetric PR characteristic is an odd number, the conditions of the following [Expression 2] are satisfied. On the other hand, a partial response characteristic having a symmetric shape where the origin (0) is the center (hereinafter also referred to as "asymmetric PR characteristic") has a characteristic in which the conditions of the following [Expression 1] and [Expression 2] are not satisfied. Thus, bit error rate can be improved by having the optical disk apparatus 1020 apply, for example, a PR characteristic of PR (1, 1, 4, 4, 1) to the optical disk 1015.

$$PR_{\frac{n}{2}-k} = PR_{\frac{n}{2}+1+k} \left(k = 0 \sim \frac{n}{2}\right)$$ [Expression 1]

$$PR_{\frac{n-1}{2}-k} = PR_{\frac{n+1}{2}+1+k} \left(k = 0 \sim \frac{n-3}{2}\right)$$ [Expression 2]

Furthermore, it is also to be noted that, in selecting the PR characteristic of an equalizing circuit, it is preferred that the bit error rate (BER) of each bit during waveform equalization is a low value (i.e. the lower BER value the better).

Furthermore, it is also to be noted that, data related to PR characteristics suitable for an optical disk 2015 (hereinafter also referred to as "PR characteristic data") according to an embodiment of the present invention may be recorded beforehand in a predetermined area(s) of the optical disk 2015 for allowing the optical disk apparatus 20 or 1020 to read out and use the recorded PR characteristic data during a reproduction operation.

Figure 66A:
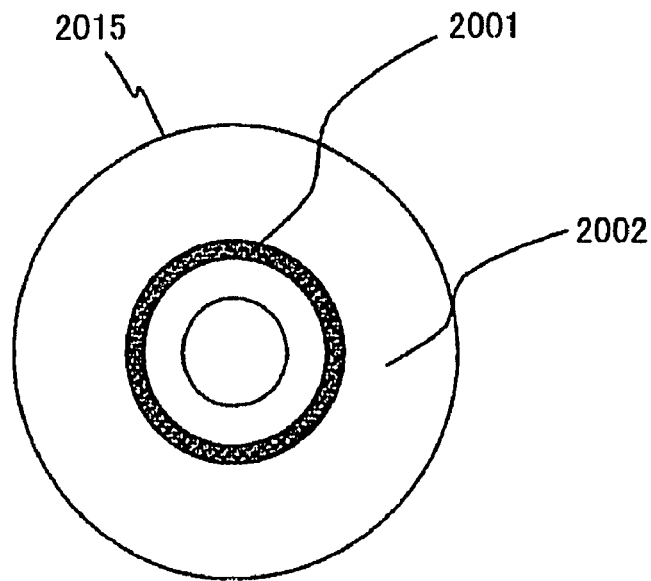
FIGS. 66A and 66B are schematic diagrams showing modified examples of an optical disk according to an embodiment of the present invention.
Figure 66B:
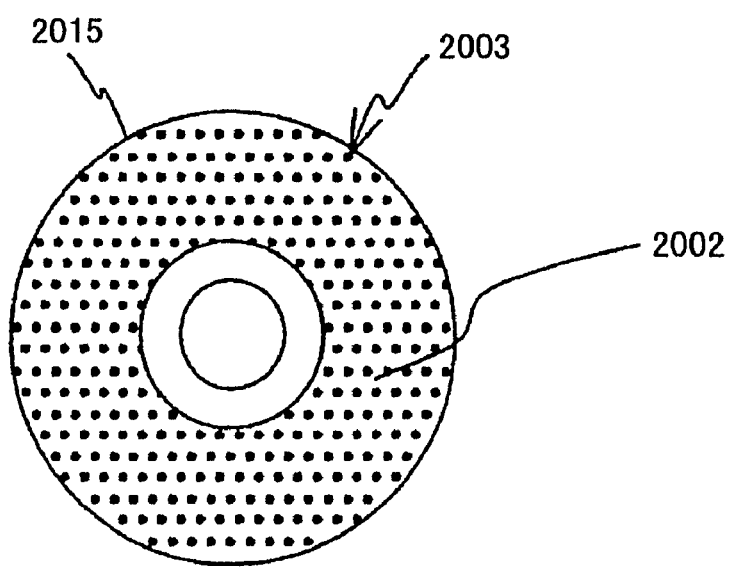

For example, in a case where the optical disk 2015 has an area including wobble data of the optical disk 2015 or where the optical disk 2015 has a TOC (Table of Contents) area including PR characteristic data at an inner peripheral part of the optical disk 2015 (See FIG. 66A), the CPU 40 (1040) may read out, for example, the wobble data or the PR characteristic data from the optical disk 2015 and store the read out data in the RAM 41 (1041). Accordingly, in a case where a reproduction request command from the upper level apparatus 90 (1090) is received, the PR characteristic can be set based on, for example, the PR characteristic data and the reproduction conditions stored in the RAM 41 (1041). Alternatively, the areas in which the PR characteristic data are recorded may be periodically arranged in the recording area 2002 as illustrated with black dots 2003 in FIG. 66B.

Since the asymmetric property of the RF signal differs depending on changes in the shape of the fine aperture areas (HA)/fine mask areas (MA) and changes of temperature distribution of the super resolution layer according to various reproduction conditions (e.g., configuration of super-resolution layer, recording density, reproduction power, linear speed during reproduction, waveform of the light source), it is desired to have one or more parameters for applying an optimum PR characteristic.

<Description of Effect in Relation with PR Characteristics>

Figure 67A:
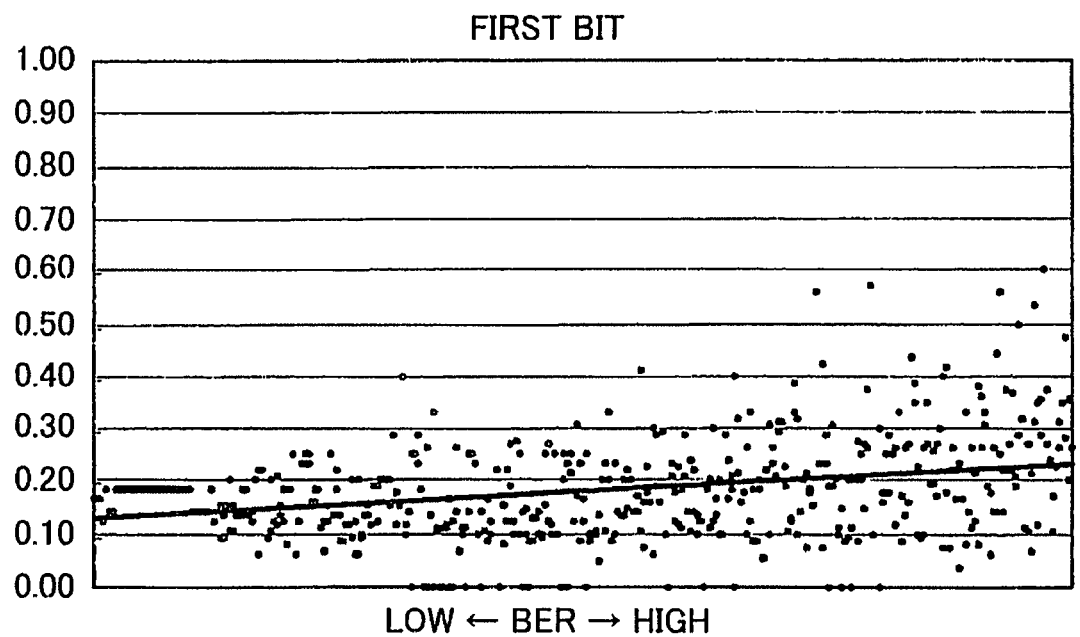
FIGS. 67A-67E are graphs for showing a correlation between a bit error rate and a PR characteristic according to an embodiment of the present invention.
Figure 67B:
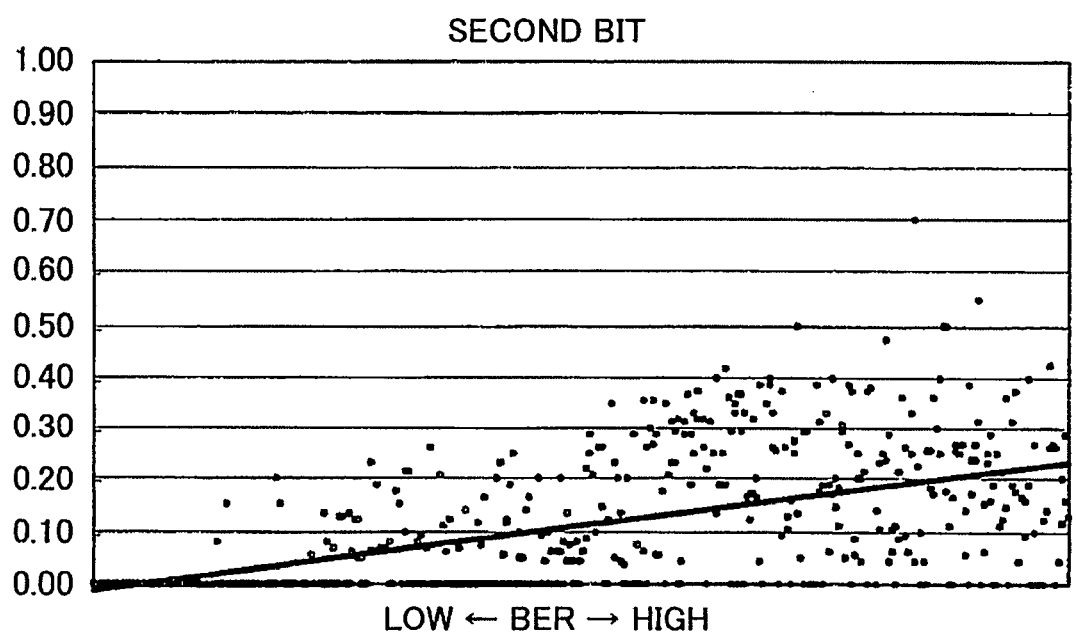
Figure 67C:
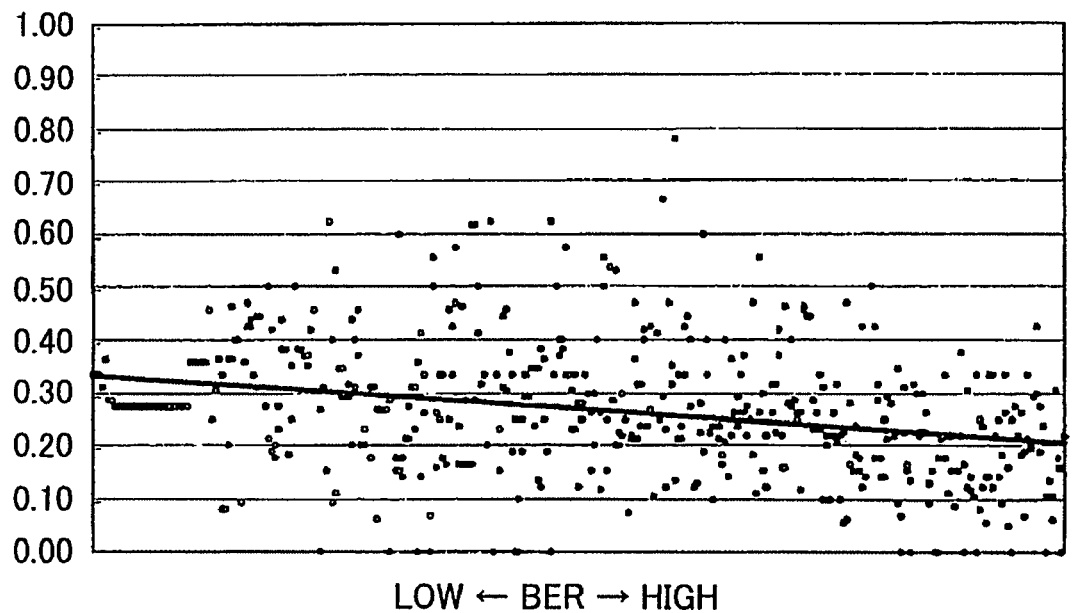
Figure 67D:
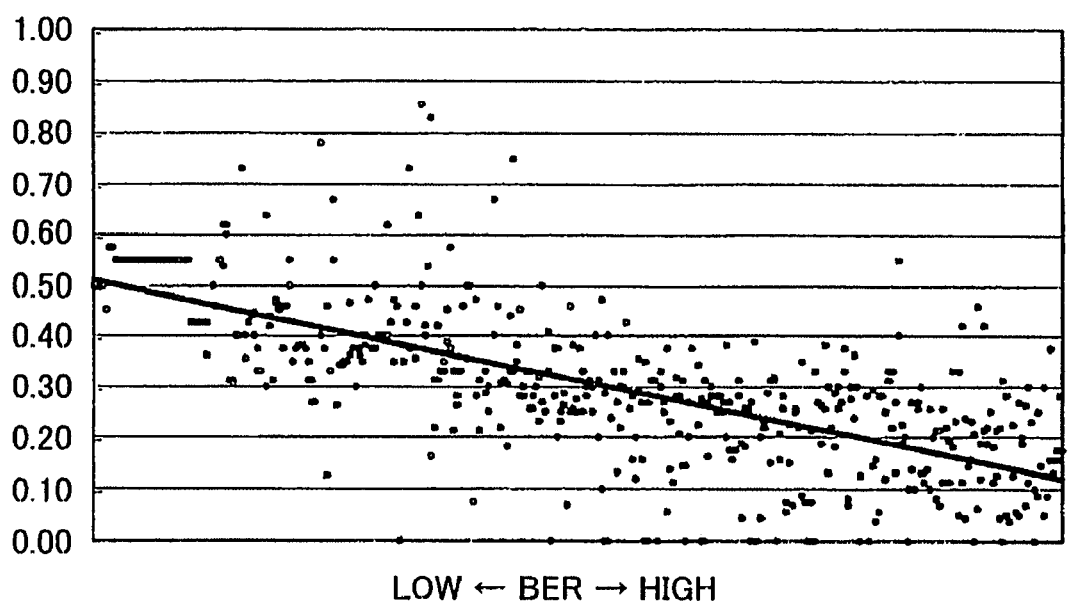
Figure 67E:
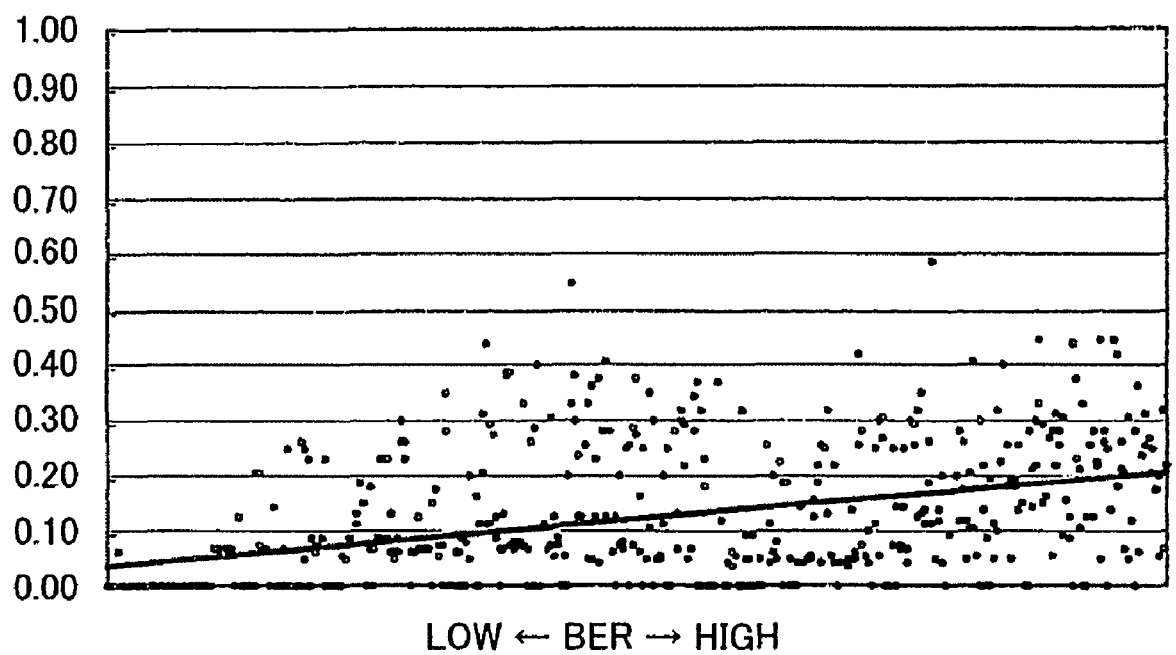

FIGS. 67A-67E are graphs for describing PR characteristics for each bit with respect to bit error rate (BER) according to an experiment of observing changes of bit error rate (BER) by randomly changing the PR characteristics of a 5 bit PR characteristic with respect to reproduction signals output from a super resolution optical disk. In this experiment, the super resolution optical disk has recording marks with a minimum recording mark length of 147 nm. More specifically, the PR characteristic in each graph of FIGS. 67A-67E shows the normalized results of the sum of the factor values of the PR characteristic. That is, in a case where a PR characteristic is expressed as PR ($a_1, a_2, a_3, a_4, a_5$), FIG. 67A shows a correlation between a value corresponding to the first bit $a_1/(a_1+a_2+a_3+a_4+a_5)$ and a bit error rate, FIG. 67B shows a correlation between a value corresponding to the second bit $a_2/(a_1+a_2+a_3+a_4+a_5)$, FIG. 67C shows a correlation between a value corresponding to the third bit $a_3/(a_1+a_2+a_3+a_4+a_5)$, FIG. 67D shows a correlation between a value corresponding to the fourth bit $a_4/(a_1+a_2+a_3+a_4+a_5)$, and FIG. 67E shows a correlation between a value corresponding to the fifth bit $a_5/(a_1+a_2+a_3+a_4+a_5)$. It is to be noted that the straight line shown in each graph of FIGS. 67A-67E is obtained by first order approximation of each of the observation points.

As described above, in selecting the PR characteristic of an equalizing circuit, it is preferred that the bit error rate (BER) of each bit during waveform equalization is a low value (i.e. the lower BER value the better). The following [Table 3] shows the value of each bit $a_i/(a_1+a_2+a_3+a_4+a_5)$ in a case of observing the values of the approximation lines $a_i/(a_1+a_2+a_3+a_4+a_5)$ (i=1–5) situated near the vertical axis where bit error rate (BER) is low.

For example, in comparing the second bit and the fourth bit, it can be understood that there is a significant difference (approximately 0.5) between the value $a_2/(a_1+a_2+a_3+a_4+a_5)$ and the value $a_4/(a_1+a_2+a_3+a_4+a_5)$. This shows that the reproduction signal from the super resolution optical disk corresponds to an asymmetric PR characteristic with respect to the second and fourth bit.

TABLE 3

| BIT | $a_i/(a_1 + a_2 + a_3 + a_4 + a_5)$ |
|---|---|
| FIRST BIT | 0.10~0.15 |
| SECOND BIT | −0.03~0.02 |
| THIRD BIT | 0.32~0.37 |
| FOURTH BIT | 0.48~0.53 |
| FIFTH BIT | 0.01~0.06 |

The following [Table 4] shows the values of the bit error rates of two symmetric PR characteristics exhibiting a low bit error rate (BER) when performing super resolution reproduction of data from a super resolution optical disk and the values of the bit error rates (BER) of seven asymmetric PR characteristics. As shown in [Table 4], the bit error rate value for the symmetric PR characteristic PR (1, 2, 2, 2, 1) is approximately ½ of the bit error rate value for the asymmetric PR characteristic PR (2, 0, 5, 8, 1). Furthermore, the other asymmetric PR characteristics also show that their bit error rate value is one digit less than that of the symmetric PR characteristic. This shows that bit error rate can be significantly reduced by using an asymmetric PR characteristic for performing waveform equalization on reproduction signals in a case of performing super resolution reproduction on a super resolution optical disk. Since the above-described optical disk apparatus 20, 1020 uses an asymmetric PR characteristic of PR (1, 1, 4, 4, 1) for performing waveform equalization, bit error rate can be significantly reduced compared to, for example, a case of performing waveform equalization with a symmetric PR characteristic of PR (1, 2, 2, 2, 1).

TABLE 4

| PR CHARACTERISTIC | BIT ERROR RATE (BER) |
|---|---|
| PR (1, 2, 2, 2, 1) | $4.2 \times 10^{-3}$ |
| PR (3, 1, 8, 1, 3) | $3.5 \times 10^{-3}$ |
| PR (3, 0, 8, 1, 1) | $8.2 \times 10^{-4}$ |
| PR (2, 0, 5, 1, 0) | $8.2 \times 10^{-4}$ |

TABLE 4-continued

| PR CHARACTERISTIC | BIT ERROR RATE (BER) |
|---|---|
| PR (2, 0, 4, 6, 0) | $6.5 \times 10^{-4}$ |
| PR (2, 0, 5, 8, 1) | $6.0 \times 10^{-4}$ |
| PR (2, 0, 5, 5, 1) | $7.7 \times 10^{-4}$ |
| PR (1, 0, 2, 4, 0) | $7.1 \times 10^{-4}$ |
| PR (2, 0, 4, 5, 0) | $8.8 \times 10^{-4}$ |

It is to be noted that, although the above-described optical disk apparatus 20, 1020 uses a PR characteristic of PR (1, 1, 4, 4, 1) for performing waveform equalization on a reproduction signal, other PR characteristics may also be used. For example, the PR characteristic may be any one of PR (3, 0, 8, 1, 1), PR (2, 0, 5, 1, 0), PR (2, 0, 8, 3, 1), PR (1, 0, 0.5, 2, 1), PR (2, 0, 5, 5, 1), PR (2, 0, 8, 4, 1), PR (2, 0, 4, 6, 0), PR (2, 0, 5, 8, 1), PR (1, 0, 2, 4, 0), PR (2, 0, 4, 5, 0) and PR (3, 1, 8, 1, 1). In other words, various PR characteristics may be used for performing waveform equalization on the reproduction signal as long as the PR characteristic does not satisfy the conditions of the above-described [Expression 3] and [Expression 4].

Accordingly, an embodiment of the present invention provides a data reproduction apparatus capable of accurately reproducing data from an optical disk having recording marks that are smaller than a diffraction limit. Furthermore, another embodiment of the present invention provides an optical disk enabling data to be accurately reproduced from an optical disk having recording marks that are smaller than a diffraction limit. Furthermore, another embodiment of the present invention provides a data reproduction method capable of accurately reproducing data from an optical disk having recording marks that are smaller than a diffraction limit.

Further, the present invention is not limited to these embodiments, but variations and modifications may be made without departing from the scope of the present invention.

The present application is based on Japanese Priority Application Nos. 2006-068595, 2006-118438, 2006-108184, 2006-149448, 2006-198865, and 2006-339587 filed on Mar. 14, 2006, Apr. 21, 2006, Apr. 11, 2006, May 30, 2006, Jul. 21, 2006, and Dec. 18, 2006, respectively, with the Japanese Patent Office, the entire contents of which are hereby incorporated by reference.

What is claimed is:

1. A data reproduction apparatus for reproducing recorded data from an optical disk by using a PRML method, the recorded data of the optical disk being recorded in recording marks arranged with a pitch less than a diffraction limit, the data reproduction apparatus comprising:
an optical head including a light source, an optical system having an objective lens for condensing light emitted from the light source to the optical disk, and a photodetector for receiving light reflected from the optical disk;
a signal generation circuit for generating an RF signal from a signal output from the photodetector;
a waveform equalizer for equalizing a waveform of the RF signal to a waveform having a predetermined partial response characteristic of the PRML method;
a pattern compensation memory for storing a plurality of compensation values corresponding to bit patterns of the recording marks;
a path memory for storing past determination results corresponding to a plurality of states according to the PRML method; and
a branch metric calculator for calculating likelihood of the equalized RF signal by using one of the plural compensation values in accordance with the past determination results stored in the path memory; and
wherein said path memory is arranged to output a provisional decision result to said pattern compensation memory, such that the provisional decision result is used in the calculation of a branch metric by the branch metric calculator.

2. The data reproduction apparatus as claimed in claim 1, wherein the compensation value stored in the pattern compensation memory includes an average of the waveform equalization error amount of the bit pattern of the RF signal.

3. The data reproduction apparatus as claimed in claim 1, wherein the compensation value includes an average of a waveform equalization error amount between a target reproduction signal and the waveform equalized RF signal corresponding to each bit pattern, wherein the target reproduction signal is calculated by convolution between another partial response characteristic different from the predetermined partial response characteristic and recording bit data.

4. The data reproduction apparatus as claimed in claim 3, wherein the compensation value stored in the pattern compensation memory further includes a variance value of the waveform equalization error amount of the bit pattern of the RF signal.

5. The data reproduction apparatus as claimed in claim 1, wherein the compensation value stored in the pattern compensation memory corresponds to a bit pattern of 8 bits or more.

6. The data reproduction apparatus as claimed in claim 1, further comprising: a clock extracting circuit for extracting a reproduction clock; wherein the clock extracting circuit includes a cross-correlation calculation circuit for comparing phase between the RF signal read out from the optical disk and a signal obtained by decoding the RF signal with the PRML method.

7. The data reproduction apparatus as claimed in claim 6, wherein the clock extracting circuit includes a first cross-correlation calculation circuit for calculating cross-correlation between the read out RF signal and a first delayed signal generated by delaying the decoded signal for one period, a second cross-correlation calculation circuit for calculating cross-correlation between the read out RF signal and a second delayed signal generated by delaying the decoded signal for two periods, and a subtractor for obtaining the difference between the output of the first and second cross-correlation calculation circuits, wherein the two periods of the second delayed signal is longer than the period of the first delayed signal.

8. The data reproduction apparatus as claimed in claim 1, wherein the clock extracting circuit is configured to extract the reproduction clock by using predetermined bit patterns recorded in the optical disk.

9. The data reproduction apparatus as claimed in claim 1, further comprising: a delay for delaying the RF signal for a period equivalent to a time required for decoding the RF signal with the PRML method; and a non-linear component compensator for compensating for a non-linear component of the RF signal based on the difference between a value of the delayed RF signal and the compensation value stored in the pattern compensation memory.

10. The data reproduction apparatus as claimed in claim 9, wherein the non-linear component compensator including an output selector for performing provisional determination by using the past determination results corresponding to the plural states stored in the path memory.

11. The data reproduction apparatus as claimed in claim 9, further comprising: a clock extracting circuit for extracting a reproduction clock from a signal output from the non-linear component compensator.

12. The data reproduction apparatus as claimed in claim 1, wherein the optical disk has compensation value data recorded therein, wherein the pattern compensation memory sets the compensation value based on the compensation value data recorded in the optical disk and at least one of recording density, reproduction power, linear speed during reproduction, and waveform of the light source.

13. The data reproduction apparatus as claimed in claim 1, wherein a bit length of the partial response characteristic is longer than a bit length of the state for conducting maximum likelihood estimation.

14. A data recording/reproduction apparatus for recording and reproducing data with respect to an optical disk, the data recording/reproduction apparatus comprising: the data reproduction apparatus as claimed in claim 1; and a data recording apparatus for recording data to the optical disk with recording marks arranged with a pitch less than a diffraction limit.

* * * * *